(12) United States Patent
Simaan et al.

(10) Patent No.: US 10,967,504 B2
(45) Date of Patent: Apr. 6, 2021

(54) CONTINUUM ROBOTS WITH MULTI-SCALE MOTION THROUGH EQUILIBRIUM MODULATION

(71) Applicant: Vanderbilt University, Nashville, TN (US)

(72) Inventors: Nabil Simaan, Nashville, TN (US); Giuseppe Del Giudice, Nashville, TN (US); Long Wang, Nashville, TN (US); Karen M. Joos, Nashville, TN (US); Jin-Hui Shen, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 0 days.

(21) Appl. No.: 16/647,278

(22) PCT Filed: Sep. 13, 2018

(86) PCT No.: PCT/US2018/050948
§ 371 (c)(1),
(2) Date: Mar. 13, 2020

(87) PCT Pub. No.: WO2019/055701
PCT Pub. Date: Mar. 21, 2019

(65) Prior Publication Data
US 2020/0230808 A1    Jul. 23, 2020

Related U.S. Application Data

(60) Provisional application No. 62/557,969, filed on Sep. 13, 2017.

(51) Int. Cl.
*B25J 9/16* (2006.01)
*B25J 9/06* (2006.01)
(Continued)

(52) U.S. Cl.
CPC ............. *B25J 9/065* (2013.01); *B25J 9/0009* (2013.01); *B25J 9/104* (2013.01); *B25J 9/123* (2013.01);
(Continued)

(58) Field of Classification Search
CPC . B25J 9/0009; B25J 9/065; B25J 9/104; B25J 9/123; B25J 9/161; B25J 9/1625; B25J 9/1635; B25J 18/06
See application file for complete search history.

(56) References Cited

U.S. PATENT DOCUMENTS 2,286,571 A    6/1942  Pollard
2,988,237 A    6/1961  Devol
(Continued)

FOREIGN PATENT DOCUMENTS

EP          2335558       6/2011
WO     WO2001010292       2/2001
(Continued)

OTHER PUBLICATIONS

International Search Report and Written Opinion; PCT/US2018/050948; dated Nov. 20, 2018; 7 pages.
(Continued)

*Primary Examiner* — Dale Moyer
(74) *Attorney, Agent, or Firm* — Michael Best & Friedrich LLP

(57) ABSTRACT

A robotic system, such as a continuum robot, that includes at least one hollow tube backbone and an equilibrium modulation wire at least partially positioned within the backbone. The robotic system is configured to adjust a position of an end effector by bending the hollow tube and to further adjust the position of the robotic device by adjusting a linear insertion position of the equilibrium modulation wire inside the hollow tube, wherein adjusting
(Continued)

the linear insertion position of the equilibrium modulation wire changes a flexural rigidity of the hollow tube resulting in a change in the resulting bending angle of the robotic device.

17 Claims, 14 Drawing Sheets

(51) Int. Cl.
  *B25J 9/00* (2006.01)
  *B25J 9/12* (2006.01)
  *B25J 18/06* (2006.01)
  *B25J 9/10* (2006.01)

(52) U.S. Cl.
  CPC ............ *B25J 9/161* (2013.01); *B25J 9/1625* (2013.01); *B25J 9/1635* (2013.01); *B25J 18/06* (2013.01)

(56) References Cited

U.S. PATENT DOCUMENTS

| | | |
|---|---|---|
| 3,580,099 A | 5/1971 | Mosher |
| 3,727,531 A | 4/1973 | Baab |
| 3,802,743 A | 4/1974 | Hermanns |
| 4,744,264 A | 5/1988 | Milenkovic |
| 4,795,296 A | 1/1989 | Jau |
| 4,802,461 A | 2/1989 | Cho |
| 4,838,859 A | 6/1989 | Strassmann |
| 4,998,527 A | 3/1991 | Meyer |
| 5,007,907 A | 4/1991 | Nishigaki et al. |
| 5,046,375 A | 9/1991 | Salisbury, Jr. |
| 5,133,713 A | 7/1992 | Huang et al. |
| 5,201,731 A | 4/1993 | Hakky |
| 5,231,989 A | 8/1993 | Middleman et al. |
| 5,307,804 A | 5/1994 | Bonnet |
| 5,337,732 A | 8/1994 | Grundfest et al. |
| 5,345,937 A | 9/1994 | Middleman et al. |
| 5,386,741 A | 2/1995 | Rennex |
| 5,397,323 A | 3/1995 | Taylor |
| 5,410,638 A | 4/1995 | Colgate |
| 5,480,406 A | 1/1996 | Nolan et al. |
| 5,662,587 A | 9/1997 | Grundfest et al. |
| 5,749,828 A | 5/1998 | Solomon et al. |
| 5,906,591 A | 5/1999 | Dario et al. |
| 6,113,593 A | 9/2000 | Tu et al. |
| 6,197,017 B1 | 3/2001 | Brock et al. |
| 6,309,346 B1 | 10/2001 | Farhadi |
| 6,312,435 B1 | 11/2001 | Wallace et al. |
| 6,533,720 B1 | 3/2003 | Dhindsa |
| 6,554,844 B2 | 4/2003 | Lee et al. |
| 6,669,711 B1 | 12/2003 | Noda |
| 6,676,684 B1 | 1/2004 | Morley |
| 6,692,485 B1 | 2/2004 | Brock |
| 6,817,974 B2 | 11/2004 | Cooper et al. |
| 6,824,544 B2 | 11/2004 | Boebel et al. |
| 6,837,892 B2 | 1/2005 | Shoham |
| 6,843,793 B2 | 1/2005 | Brock et al. |
| 6,858,005 B2 | 2/2005 | Ohline et al. |
| 6,860,878 B2 | 3/2005 | Brock |
| 6,949,106 B2 | 9/2005 | Brock et al. |
| 6,971,989 B2 | 12/2005 | Yossepowitch |
| 7,021,173 B2 | 4/2006 | Stoianovici et al. |
| 7,099,745 B2 | 8/2006 | Ebert |
| 7,147,650 B2 | 12/2006 | Lee |
| 7,214,230 B2 | 5/2007 | Brock et al. |
| 7,235,089 B1 | 6/2007 | McGuckin, Jr. |
| 7,316,681 B2 | 1/2008 | Madhani et al. |
| 7,391,173 B2 | 6/2008 | Schena |
| 7,682,319 B2 | 3/2010 | Martin et al. |
| 7,699,835 B2 | 4/2010 | Lee et al. |
| 7,787,681 B2 | 8/2010 | Zhang et al. |
| 7,794,393 B2 | 9/2010 | Larsen |
| 7,822,249 B2 | 10/2010 | Garty et al. |
| 7,837,615 B2 | 11/2010 | Le et al. |
| 7,854,738 B2 | 12/2010 | Lee et al. |
| 7,887,549 B2 | 2/2011 | Wenderow et al. |
| 7,959,557 B2 | 6/2011 | Weitzner et al. |
| 8,025,635 B2 | 9/2011 | Eaton et al. |
| 8,062,214 B2 | 11/2011 | Shener et al. |
| 8,088,101 B2 | 1/2012 | Chang et al. |
| 8,114,062 B2 | 2/2012 | Muni et al. |
| 8,116,886 B2 | 2/2012 | Simaan et al. |
| 8,172,828 B2 | 5/2012 | Chang et al. |
| 8,303,576 B2 | 11/2012 | Brock |
| 8,311,626 B2 | 11/2012 | Hlavka et al. |
| 8,337,521 B2 | 12/2012 | Cooper et al. |
| 8,343,141 B2 | 1/2013 | Madhani et al. |
| 8,365,633 B2 | 2/2013 | Simaan et al. |
| 8,372,019 B2 | 2/2013 | Goldenberg et al. |
| 8,377,077 B2 | 2/2013 | Reis |
| 8,409,234 B2 | 4/2013 | Stahler et al. |
| 8,414,505 B1 | 4/2013 | Weitzner et al. |
| 8,414,598 B2 | 4/2013 | Brock et al. |
| 8,425,408 B2 | 4/2013 | Boulais et al. |
| 8,444,549 B2 | 5/2013 | Viola et al. |
| 8,460,236 B2 | 6/2013 | Roelle et al. |
| 8,480,618 B2 | 7/2013 | Wenderow et al. |
| 8,486,053 B2 | 7/2013 | Niemeyer |
| 8,498,691 B2 | 7/2013 | Moll et al. |
| 8,504,201 B2 | 8/2013 | Moll et al. |
| 8,545,551 B2 | 10/2013 | Loulmet |
| 8,551,115 B2 | 10/2013 | Steger et al. |
| 8,585,731 B2 | 11/2013 | Abbate et al. |
| 8,655,431 B2 | 2/2014 | Joos et al. |
| 8,864,757 B2 | 10/2014 | Klimovitch et al. |
| 9,333,650 B2 | 5/2016 | Bajo et al. |
| 9,549,720 B2 | 1/2017 | Simaan et al. |
| 9,591,964 B2 | 3/2017 | Choset et al. |
| 2001/0031983 A1 | 10/2001 | Brock et al. |
| 2002/0032365 A1 | 3/2002 | Hasegawa et al. |
| 2002/0120252 A1 | 8/2002 | Brock et al. |
| 2003/0120305 A1 | 6/2003 | Jud et al. |
| 2003/0135204 A1 | 7/2003 | Lee et al. |
| 2003/0181785 A1 | 9/2003 | Viebach et al. |
| 2004/0116906 A1 | 6/2004 | Lipow |
| 2004/0176751 A1 | 9/2004 | Weitzner et al. |
| 2005/0043718 A1 | 2/2005 | Madhani et al. |
| 2005/0054900 A1 | 3/2005 | Mawn et al. |
| 2005/0059960 A1* | 3/2005 | Sinnaan Nabil ....... A61B 34/30 606/1 |
| 2005/0228440 A1 | 10/2005 | Brock et al. |
| 2006/0036182 A1 | 2/2006 | Daniels et al. |
| 2006/0047302 A1 | 3/2006 | Ortiz et al. |
| 2006/0058861 A1 | 3/2006 | Gibson et al. |
| 2006/0079884 A1 | 4/2006 | Manzo et al. |
| 2006/0089535 A1 | 4/2006 | Raz et al. |
| 2006/0156851 A1 | 7/2006 | Jacobsen et al. |
| 2006/0241414 A1 | 10/2006 | Nowlin et al. |
| 2006/0258938 A1 | 11/2006 | Hoffman et al. |
| 2007/0197939 A1 | 8/2007 | Wallace et al. |
| 2007/0225787 A1 | 9/2007 | Simaan et al. |
| 2007/0255109 A1 | 11/2007 | Stein et al. |
| 2008/0009838 A1 | 1/2008 | Schena et al. |
| 2008/0033240 A1 | 2/2008 | Hoffman et al. |
| 2008/0065105 A1 | 3/2008 | Larkin et al. |
| 2008/0065108 A1 | 3/2008 | Diolaiti |
| 2008/0071288 A1 | 3/2008 | Larkin et al. |
| 2008/0114492 A1 | 5/2008 | Miegel et al. |
| 2008/0179301 A1 | 7/2008 | Garty et al. |
| 2008/0181473 A1 | 7/2008 | Garty et al. |
| 2008/0188800 A1 | 8/2008 | Bencini et al. |
| 2008/0243063 A1 | 10/2008 | Camarillo |
| 2008/0243064 A1 | 10/2008 | Stahler et al. |
| 2008/0243106 A1 | 10/2008 | Coe et al. |
| 2008/0245173 A1 | 10/2008 | Schwerin et al. |
| 2008/0249536 A1 | 10/2008 | Stahler et al. |
| 2008/0262513 A1 | 10/2008 | Stahler et al. |
| 2008/0302200 A1 | 12/2008 | Tobey |
| 2009/0054222 A1 | 2/2009 | Zhang et al. |
| 2009/0076476 A1 | 3/2009 | Barbagli et al. |
| 2009/0076521 A1 | 3/2009 | Hansen |
| 2009/0088774 A1 | 4/2009 | Swarup et al. |

(56) References Cited

U.S. PATENT DOCUMENTS

| | | |
|---|---|---|
| 2009/0099420 A1 | 4/2009 | Woodley et al. |
| 2009/0171151 A1 | 7/2009 | Choset et al. |
| 2009/0216083 A1 | 8/2009 | Durant et al. |
| 2009/0275818 A1 | 11/2009 | Rau et al. |
| 2009/0275857 A1 | 11/2009 | Cabiri et al. |
| 2010/0010504 A1 | 1/2010 | Simaan et al. |
| 2010/0011900 A1 | 1/2010 | Burbank |
| 2010/0016852 A1 | 1/2010 | Manzo et al. |
| 2010/0030377 A1 | 2/2010 | Unsworth |
| 2010/0069719 A1 | 3/2010 | Wehrheim |
| 2010/0076269 A1 | 3/2010 | Makower |
| 2010/0079308 A1 | 4/2010 | Fabre et al. |
| 2010/0099951 A1 | 4/2010 | Laby et al. |
| 2010/0125165 A1 | 5/2010 | Torii |
| 2010/0152899 A1 | 6/2010 | Chang et al. |
| 2010/0210391 A1 | 8/2010 | Dinger |
| 2010/0256558 A1 | 10/2010 | Olson et al. |
| 2010/0331857 A1 | 12/2010 | Doyle et al. |
| 2010/0331858 A1 | 12/2010 | Simaan et al. |
| 2011/0015649 A1 | 1/2011 | Anvari et al. |
| 2011/0066160 A1 | 3/2011 | Simaan et al. |
| 2011/0071541 A1 | 3/2011 | Prisco et al. |
| 2011/0071542 A1 | 3/2011 | Prisco et al. |
| 2011/0071544 A1 | 3/2011 | Steger et al. |
| 2011/0125165 A1 | 5/2011 | Simaan et al. |
| 2011/0160569 A1 | 6/2011 | Cohen et al. |
| 2011/0184241 A1 | 7/2011 | Zubiagte et al. |
| 2011/0196419 A1 | 8/2011 | Cooper |
| 2011/0213346 A1 | 9/2011 | Morley et al. |
| 2011/0230894 A1 | 9/2011 | Simaan et al. |
| 2011/0306929 A1 | 12/2011 | Levesque et al. |
| 2011/0313243 A1 | 12/2011 | Zubiate et al. |
| 2011/0319910 A1 | 12/2011 | Roelle et al. |
| 2012/0067158 A1* | 3/2012 | Kell .................. B25J 18/06 74/490.04 |
| 2012/0071822 A1 | 3/2012 | Romo et al. |
| 2012/0109274 A1 | 5/2012 | Simaan et al. |
| 2012/0123395 A1 | 5/2012 | Stoy et al. |
| 2012/0241576 A1 | 9/2012 | Yu |
| 2012/0253131 A1 | 10/2012 | Malkowski et al. |
| 2012/0289946 A1 | 11/2012 | Steger |
| 2013/0012928 A1 | 1/2013 | Cooper et al. |
| 2013/0023859 A1 | 1/2013 | Malkowski |
| 2013/0090763 A1* | 4/2013 | Simaan .................. A61B 5/11 700/258 |
| 2013/0096540 A1 | 4/2013 | Cooper et al. |
| 2013/0110131 A1 | 5/2013 | Madhani et al. |
| 2013/0131868 A1 | 5/2013 | Rucker et al. |
| 2013/0165869 A1 | 6/2013 | Blumenkranz et al. |
| 2013/0165945 A9 | 6/2013 | Roelle et al. |
| 2013/0178838 A1 | 7/2013 | Malkowski |
| 2013/0190741 A1 | 7/2013 | Moll et al. |
| 2013/0197539 A1 | 8/2013 | Simaan et al. |
| 2013/0218141 A1 | 8/2013 | Hinman et al. |
| 2013/0231529 A1 | 9/2013 | John et al. |
| 2013/0269109 A1 | 10/2013 | Yu |
| 2013/0274715 A1 | 10/2013 | Chan et al. |
| 2013/0289581 A1 | 10/2013 | Yeung et al. |
| 2013/0300537 A1 | 11/2013 | Bajo et al. |
| 2013/0303945 A1 | 11/2013 | Blumenkranz et al. |
| 2013/0306112 A1 | 11/2013 | Blumenkranz |
| 2013/0338433 A1 | 12/2013 | Goldman et al. |
| 2014/0058406 A1 | 2/2014 | Tsekos |
| 2014/0090506 A1 | 4/2014 | Tobey |
| 2014/0221826 A1 | 8/2014 | Joos et al. |
| 2014/0260755 A1* | 9/2014 | Dong .................. B25J 9/06 74/490.04 |
| 2014/0316434 A1 | 10/2014 | Simaan et al. |
| 2014/0330432 A1 | 11/2014 | Simann et al. |
| 2015/0073434 A1 | 3/2015 | Simaan et al. |
| 2016/0279789 A1* | 9/2016 | Axinte .................. B25J 9/104 |
| 2017/0182659 A1 | 6/2017 | Goldman et al. |
| 2018/0257235 A1* | 9/2018 | Alatorre Troncoso .. B25J 9/065 |
| 2018/0264643 A1* | 9/2018 | Rabani .................. G01L 5/0076 |
| 2019/0054638 A1* | 2/2019 | Norton .................. B25J 9/1045 |

FOREIGN PATENT DOCUMENTS

| | | |
|---|---|---|
| WO | WO2005009482 | 2/2005 |
| WO | WO2005112834 | 12/2005 |
| WO | WO2008036304 | 3/2008 |
| WO | WO2009094670 | 7/2009 |
| WO | WO2009097461 | 8/2009 |
| WO | WO2009097539 | 8/2009 |
| WO | WO2009124287 | 10/2009 |
| WO | WO2009140688 | 11/2009 |
| WO | WO2010042611 | 4/2010 |
| WO | WO2011063511 | 6/2011 |
| WO | WO2012015816 | 2/2012 |
| WO | WO2012049623 | 4/2012 |
| WO | WO2013106664 | 7/2013 |
| WO | WO2013043804 | 9/2013 |
| WO | WO2013158974 | 10/2013 |
| WO | WO2013158978 | 10/2013 |
| WO | WO2013158983 | 10/2013 |
| WO | WO2013166293 | 11/2013 |

OTHER PUBLICATIONS

Abbott et al., "Haptic virtual fixtures for robot-assisted manipulation," Robotics Research 28, Aug. 2007, 49-64.

Abbott et al., "Stable Forbidden-Region Virtual Fixtures for Bilateral Telemanipulation," vol. 128, No. 1, pp. 53-64, 2006.

Abiko et al., "On-line parameter identification of a payload handled by flexible based manipulator," in 2004 IEEE/RSJ International Conference on Intelligent Robots and Systems (IROS) (IEEE Cat. No. 04CH37566), 2004, vol. 3, pp. 2930-2935.

Adami et al., "Primary and secondary prevention in the reduction of cancer morbidity and mortality," European Journal of Cancer, 2001, vol. 37, pp. 118-127.

Adunka et al., "Development and Evaluation of an Improved Cochlear Implant Electrode Design for Electric Acoustic Stimulation," Laryngoscope, 2004, vol. 114, pp. 1237-1241.

Adunka et al., "Preservation of basal inner ear structures in cochlear implantation," ORL J Otorhinolaryngol Relat Spec, 2004, vol. 66, pp. 306-312.

Agarwal et al., "Retinal imaging using a 25-gauge OCT endoprobe through vitreous and vitreous substitutes," in Association for Research in Vision and Ophthalmology (ARVO) Annual Meeting, 2013.

Agrawal et al., "Control of Cable Actuated Devices using Smooth Backlash Inverse," In 2010 IEEE International Conference on Robotics and Automation, Anchorage, AK, 2010, pp. 1074-1079.

Almony et al., "Techniques, rationale, and outcomes of internal limiting membrane peeling," Retina, 2012, 32(5):877-91.

Anderson et al., "Tensor-arm Manipulator Design," ASME J. Mech. Eng., 1967, vol. 89, No. 8, p. 54.

Angeles, "Automatic Computation of the Screw Parameters of Rigid-Body Motions. Part II: Infinitesimally-Separated Positions," Journal of Dynamic Systems, Measurement, and Control 108, Mar. 1986, 32-38.

Anon, "Going Where Others Have Not Gone Before: The Revolutionary Spine Robot Has Now Entered the Very Competitive Spray Painting Market," Industrial Robot, vol. 12, pp. 36-37, 1985.

Anonymous, "Argon laser photocoagulation for macular edema in branch vein occlusion. The Branch Vein Occlusion Study Group," Am J Ophthalmol, 1984, vol. 98, pp. 271-282.

Aoki et al., "Development of Slime Robot Using Bridle Bellows," J. Robot. Mechatron., vol. 16, No. 3, pp. 286-292, 2004.

Aramaki et al., "Tube type micro manipulator using shape memory alloy (SMA)," in Proc. IEEE 6th Int. Symp. Micro Mach. Human Science, Nagoya, Japan, 1995, pp. 115-120.

Asai et al., "Micro-Neurosurgical System in the Deep Surgical Field," in MICCAI 2004 (7th International Conference on Medical Image Computing and Computer-Assisted Intervention), 2004, pp. 33-40.

Ascari et al., "A New Active Microendoscope for Exploring the Sub-arachnoid Space in the Spinal Cord," International Conference on Robotics and Automation, 2003, pp. 2657-2662.

(56) References Cited

OTHER PUBLICATIONS

Babbar et al., "Robot-assisted urologic surgery in 2010—Advancements and future outlook," Urol. Ann., 2011, vol. 3, No. 1, pp. 1-7.
Bailly et al., "Modeling and control of a hybrid continuum active catheter for aortic aneurysm treatment," in Proceedings of the 2005 IEEE International Conference on Robotics and Automation, IEEE, 2005, pp. 924-929.
Bajo et al., "A Pilot Ex-Vivo Evaluation of a Telerobotic System for Transurethral Intervention and Surveillance," In Hamlyn Symposium on Medical Robotics, 2012.
Bajo et al., "Configuration and Joint Feedback for Enhanced Performance of Multi-Segment Continuum Robots," in IEEE International Conference on Robotics and Automation, 2011, pp. 2905-2912.
Bajo et al., "Constrained Motion Control of Multisegment Continuum Robots for Transurethral Bladder Resection and Surveillance," In Accepted for publication in IEEE International Conference on Robotics and Automation (ICRA'2013).
Bajo et al., "Finding lost wrenches: Using continuum robots for contact detection and estimation of contact location," Robotics and Automation (ICRA), 2010 IEEE International Conference on DOI: 10.1109/ROBOT.2010.5509569; Publication Year: 2010, pp. 3666-3673.
Bajo et al., "Integration and Preliminary Evaluation of an Insertable Robotic Effectors Platform for Single Port Access Surgery," In International Conference on Robotics and Automation (ICRA'2012), pp. 3381-3387.
Bajo et al., "Kinematics-Based Detection and Localization of Contacts Along Multisegment Continuum Robots," IEEE Transactions on Robotics 28,2 (Apr. 2012), 291-302.
Bajo et al., "Robotic-Assisted Micro-Surgery of the Throat: the Trans-Nasal Approach," In Accepted for publication in IEEE International Conference on Robotics and Automation (ICRA'2013).
Bajo et al., "Robotic-Assisted Micro-Surgery of the Throat: the Trans-Nasal Approach," in IEEE International Conference on Robotics and Automation, 2013, pp. 232-238.
Bajo, "Control, Sensing, and Telemanipulation of Surgical Continuum Robots," Vanderbilt University, 2013, 217 pages.
Baki et al., "Miniature tri-axial force sensor for feedback in minimally invasive surgery," In 2012 4th IEEE RAS & EMBS International Conference on Biomedical Robotics and Biomechatronics (BioRob) (Roma, Italy, Jun. 2012), IEEE, pp. 805-810.
Ballay et al., "Steady-state response audiometry in a group of patients with steeply sloping sensorineural hearing loss," Laryngoscope, 2005, vol. 115, pp. 1243-1246.
Barreto et al., "Automatic camera calibration applied to medical endoscopy," in BMVC 2009—20th British Machine Vision Conference, 2009, pp. 1-10.
Battmer et al., "Evaluation of the neural response telemetry (NRT) capabilities of the nucleus research platform 8: initial results from the NRT trial," Int J Audiol, vol. 43, pp. 10-15, 2004.
Benway et al., "Robot-Assisted Partial Nephrectomy: An International Experience," European Urology, 2010, vol. 57, pp. 815-820.
Bhattacharyya et al., "Characterization of Constraints in Flexible Unknown Environments," In Accepted for publication in IEEE International Conference on Robotics and Automation (ICRA2013).
Bhattacharyya, "Motion Planning and Constraint Exploration for Robotics Surgery," Master Thesis, Vanderbilt University, Nashville, TN. 2011.
Birkfellner et al., "Calibration of tracking systems in a surgical environment," IEEE Transactions on Medical Imaging 17, 5 (Oct. 1998), 737-42.
Bokelberg et al., "Spatial Motion—I: Points of inflection and the differential geometry of screws," Mechanism and Machine Theory 27, 1 (1992), 1-15.
Bookstein, "Principal warps: thin-plate splines and the decomposition of deformations," IEEE Trans. Pattern Anal. Mach. Intell., 1989, vol. 11, 567-585.

Box et al., "Robot-Assisted NOTES Nephrectomy: Initial Report," Journal of Endourology, 2008, vol. 22, pp. 503-506.
Box et al., "Robotic radical prostatectomy: long-term outcomes," Current Opinion in Urology, 2008, vol. 18, pp. 173-179.
Braganza et al., "A Neural Network Controller for Continuum Robots," IEEE Trans. Robot., 2007, vol. 23, No. 6, pp. 1270-1277.
Brandt et al., "A Compact Robot for Image Guided Orthopedic Surgery: Concept and preliminary Results," in Lecture Notes in Computer Science (LNCS) vol. 1205, J. Troccaz, E. Grimson, and R. Mosges, Eds.: Springer, 1997, 767-776.
Brandt et al., "CRIGOS: A compact robot for image-guided orthopedic surgery," IEEE Transactions on Information Technology in Biomedicine, 1999, vol. 3, pp. 252-260.
Brown et al., "A novel GJB2 (connexin 26) mutation, F142L, in a patient with unusual mucocutaneous findings and deafness," J Invest Dermatol, 2003, vol. 121, pp. 1221-1223.
Burgner et al., "A Bimanual Teleoperated System for Endonasal Skull Base Surgery," In 2011 IEEE International Conference on Intelligent Robots and Systems (San Francisco, CA, Sep. 2011), IEEE, pp. 2517-2523.
Burgner et al., "A Telerobotic system for transnasal surgery," IEEE/ASME Transactions on Mechatronics, 2014, vol. 19, No. 3, pp. 996-1006.
Burgner-Kahrs et al., "Continuum robots for medical applications: A survey," IEEE Transactions on Robotics, 2015, vol. 31, No. 6, pp. 1261-1280.
Buss et al., "Selectively Damped Least Squares for Inverse Kinematics," 2005, vol. 10, No. 3, pp. 37-49.
Cahill et al., "The effect of arteriovenous sheathotomy on cystoid macular oedema secondary to branch retinal vein occlusion," Br J Ophthalmol, 2003, vol. 87, pp. 1329-1332.
Cahill et al., "Intraperitoneal virtual biopsy by fibered optical coherence tomography (OCT) at natural orifice transluminal endoscopic surgery (NOTES)," J. Gastrointest. Surg., 2010, vol. 14, No. 4, pp. 732-738.
Camarillo et al., "Configuration Tracking for Continuum Manipulators with Coupled Tendon Drive," IEEE Transactions on Robotics 25, 4 (Aug. 2009), 798-808.
Camarillo et al., "Mechanics Modeling of Tendon-Driven Continuum Manipulators," IEEE Transaction on Robotics 24,6 (2008), 1262-1273.
Camarillo et al., "Vision based 3-D shape sensing of flexible manipulators," In 2008 IEEE International Conference on Robotics and Automation (Pasadena, CA, 2008), pp. 2940-2947.
Cannon et al., "Port Placement Planning in Robot-Assisted Coronary Attery Bypass," IEEE Transactions on Robotics and Automation, 2003, vol. 19, pp. 912-917.
Carpentier et al., "Residual internal limiting membrane after epiretinal membrane peeling: results of the Pan-American Collaborative Retina Study Group," Retina, 2013, pp. 2026-2031.
Cassilly et al., "Optimizing motion scaling and magnification in robotic surgery," Surgery, 2004, vol. 136, No. 2, pp. 291-294.
Cauberg et al., "How to improve the effectiveness of transurethral resection in nonmuscle invasive bladder cancer?" Current Opinion in Urology 2 19, 5 (2009), 504-510.
Cavusoglu et al., "Robotics for Telesurgery: Second Generation Berkley/UCSF Laprascopic Telesurgical Workstation and Looking towards the Future Applications," in 39th Allerton Conference on Communication, Control and Computing Monticello, Italy, 2001.
Chan et al., "A Weighted Least-Norm Solution Based Scheme for Avoiding Joint Limits for Redundant Joint Manipulators," IEEE Transaction on Robotics and Automation 11,2 (1995), 286-292.
Chang et al., "LIBSVM: A Library for Support Vector Machines," 2001. [Online]. Available: http://www.csie.ntu.edu.tw/ cjlin/libsvm.
Chatzilias et al., "Robotic control in hand-assisted laparoscopic nephrectomy in humans—A pilot study," in Conference Proceedings—26th Annual International Conference of the IEEE Engineering in Medicine and Biology Society, EMBC 2004, Sep. 1, 2004-Sep. 5, 2004, San Francisco, CA, United states, 2004, pp. 2742-2745.
Chen et al., "Development of a Robotically-based Automated Biodosimetry Tool for Highthroughput Radiological Triage," accepted in International Journal of Biomechatronics and Biomedical Robotics (IJBBR), vol. 1, No. 2 pp. 115-125, 2010.

(56) References Cited

OTHER PUBLICATIONS

Chen et al., "Evaluation of trajectories and contact pressures for the straight nucleus cochlear implant electrode array—a two dimensional application of finite element analysis," Medical Engineering & Physics, 2003, vol. 25, pp. 141-147.

Chen et al., "Identification of the Flexible Actuator of a Clonoscope," IEEE/RSJ International Conference on Intelligent Robots and Systems, 2003, pp. 3355-3360.

Chen et al., "Linkage of otosclerosis to a third locus (OTSC3) on human chromosome 6p21.3-22.3," J Med Genet, 2002, vol. 39, pp. 473-477.

Chen et al., "Sensor-based guidance control of a continuum robot for a semi-autonomous colonoscopy," Robot. Autonom. Syst., 2009, vol. 57, No. 6-7, pp. 712-722.

Chen et al., "Treatment of fingertip degloving injury using the bilaterally innervated sensory cross-finger flap," Ann. Plast. Surg.,2014, vol. 73, pp. 645-651.

Cheung et al., "Minimally invasive cystectomy approaches in the treatment of bladder cancer," Expert Rev. Anticancer Ther., 2012, vol. 12, No. 6, pp. 733-741.

Chiaverini et al., "Review of the damped least-squares inverse kinematics with experiments on an industrial robot manipulator," IEEE Trans. Control Syst. Technol., 1994, vol. 2, No. 2, pp. 123-134.

Chirikjian et al., "A Geometric Approach to Hyper-Redundant Manipulator Obstacle Avoidance," ASME Journal of Mechanical Design, 1992, vol. vol. 114, pp. 580-585.

Chirikjian et al., "A Hyper-Redundant Manipulator," IEEE Robotics and Automation Magazine, pp. pp. 22-29, 1994.

Chirikjian et al., "A Modal Approach to Hyper-Redundant Manipulator Kinematics," IEEE Transactions on Robotics and Automation, vol. 10, pp. 343-354, 1994.

Chirikjian et al., "An obstacle avoidance algorithm for hyper-redundant manipulators," In Proceedings, IEEE International Conference on Robotics and Automation (1990), IEEE Comput. Soc. Press, pp. 625-631.

Chirikjian et al., "Design and Experiments with a 30 DOF Robot," IEEE International Conference on Robotics and Automation, 1993, pp. 113-119.

Chirikjian et al., "Kinematically Optimal Hyper-Redundant Manipulator Configurations," IEEE Transactions on Robotics and Automation, 1995, vol. 11, pp. 794-806.

Chirikjian, "General Methods for Computing Hyper-Redundant Manipulator Inverse Kinematics," IEEE/RSJ International conference on Intelligent Robots and Systems (IROS), 1993, pp. 1067-1073.

Cho et al., "Macro-micro manipulation with visual tracking and its application to wheel assembly," Int. J. Control. Autom. Syst., 2005, vol. 3, No. 3, pp. 461-468.

Chung et al., "Arteriovenous crossing sheathotomy versus intravitreal triamcinolone acetonide injection for treatment of macular edema associated with branch retinal vein occlusion," Graefes Arch Clin Exp Ophthalmol, 2008, vol. 246, pp. 967-974.

Cianchetti et al., "Stiff-flop surgical manipulator: Mechanical design and experimental characterization of the single module," in 2013 IEEE/RSJ International Conference on Intelligent Robots and Systems, IEEE, 2013, pp. 3576-3581.

Cohen et al., "Improved and Simplified Methods for Specifying Positions of the Electrode bands of a Cochlear Implant Array," The American Journal of Otology, 1996, vol. 17, pp. 859-865.

Cohen et al., "Surgical technique for the Nucleus Contour cochlear implant," Ear Hear, 2002, vol. 23, pp. 59S-66S.

Coman et al., "Prospective evaluation of the clinical utility of endoscopic submucosal dissection (ESD) in patients with barretts esophagus: A western center experience," Endoscopy International Open, 2016, E715-E721.

Compare et al., "Screening for and surveillance of gastric cancer," World journal of gastroenterology: WJG, 2014, vol. 20, No. 38, p. 13681-13691.

Conrad et al., "Robotic Calibration Issues: Accuracy, Repeatability and Calibration," in 8th Mediterranean Conference on Control & Automation, 2000, pp. 17-19.

Coscas et al., "Management of retinal vein occlusion—consensus document," 11 Ophthalmologica, 2011, vol. 226, pp. 4-28.

Creighton et al., "Safe Superconducting Current Discharge for the Magnetic Stereotaxis System," IEEE Transactions on Magnetics, 1999. vol. 35, pp. 4285-4290.

Croom et al., "Visual Sensing of Continuum Robot Shape Using Self-Organizing Maps," in 2010 IEEE International Conference on Robotics and Automation (Anchorage, AK, 2010), pp. 4591-4596.

Dahiya et al., "Tactile Sensing From Humans to Humanoids," IEEE Trans. Robot., 2010, vol. 26, No. 1, pp. 1-20.

Dandurand, "The Rigidity of Compound Spatial Grid," Structural Topology, 1984, vol. 10, pp. 41-56.

Dario et al., "A Miniature Steerable End-Effector for Application in an Integrated System for Computer-Assisted Arthroscopy," IEEE International Conference on Robotics and Automation, 1997, pp. 1573-1579.

Dario et al., "Development and In Vitro Testing of a Miniature Robotic System for Comuter-Assisted Clonoscopy," 1999, vol. 4, pp. 1-14.

Dario et al., "Robotics as a future and emerging technology: Biomimetics, cybernetics, and neuro-robotics in European projects," IEEE Robotics and Automation Magazine, 2005, vol. 12, pp. 29-45.

Dasgupta et al., "The Stewart Platforms Manipulator: A Review," In Mechanism and Machine Theory, 2000, vol. 35, pp. 15-40.

D'Attansio et al., "A Semi-Automatic Handheld Mechatronic Endoscope with Collision-Avoidance Capabilities," IEEE International Conference on Robotics & Automation, 2000, pp. 1586-1591.

Davies et al., "Robotic control in knee joint replacement surgery," Proceedings of the Institution of Mechanical Engineers, Part H: Journal of Engineering in Medicine, 2007, vol. 221, pp. 71-80.

De Luca et al., "Collision Detection and Safe Reaction with the DLR-III Lightweight Manipulator Arm," In 2006 IEEE/RSJ International Conference on Intelligent Robots and Systems (Beijing, China, 2006), pp. 1623-1630.

De Luca et al., "Modeling of Robots in Contact with a Dynamic Environment," IEEE Transaction on Robotics and Automation 10,4 (1994), 542-548.

Debus et al., "Contact State Estimation using Multiple Model Estimation and Hidden Markov Models," The International Journal of Robotics Research 23, 4-5 (2004), 399-413.

Degani et al., "Highly Articulated Robotic Probe for Minimally Invasive Surgery," In 2006 IEEE International Conference on Robotics and Automation (Orlando, FL, USA, 2006), pp. 4167-4172.

Deklaj et al., "Laparoscopic radical versus laparoscopic partial nephrectomy for clinical T1bN0M0 renal tumors: comparison of perioperative, pathological, and functional outcomes," Journal of endourology / Endourological Society, 2010, vol. 24, pp. 1603-1607.

Del Giudice et al., "Design considerations for continuum robot actuation units enabling dexterous transurethral bladder cancer resection," in ASME 2016 International Design Engineering Technical Conferences and Computers and Information in Engineering Conference. American Society of Mechanical Engineers, 2016, pp. V05AT07A030-1-V05AT07A030-10.

Della Santa et al., "Steerable Microcatheters Actuated by Embedded Conducting Polymer Structures," Journal of Intelligent Material Systems and Structures, 1996, vol. 7, pp. 292-300.

Deo et al., "Robot subtask performance with singularity robustness using optimal damped least-squares," in Proceedings 1992 IEEE International Conference on Robotics and Automation, 1993, pp. 434-441.

Dhi Ng Ra et al., A Gröbner-Sylvester Hybrid Method for Closed-Form Displacement Analysis of Mechanisms, ASME Journal of Mechanical Design, 2000, vol. 122, pp. 431-438.

Dietmaier, The Stewart-Gough Platform of General Geometry Can Have 40 Real Postures, in Advances in Robot Kinematics—Analysis and Control (ARK—1998): Kluwer Academic Publishers, 1998, pp. 7-16.

(56) References Cited

OTHER PUBLICATIONS

Dimaio, "da Vinci and Beyond," In 2010 IEEE International Conference on Robotics and Automation Workshop on Medical Cyber-Physical Systems (Anchorage, AK, 2010).
Ding et al., "Design and Coordination Kinematics of an Insertable Robotic Effectors Platform for Single-Port Access Surgery," IEEE/ASME Transactions on Mechatronics (2012), 1-13.
Ding et al., "Design, Simulation and Evaluation of Kinematic Alternatives for Insertable Robotic Effectors Platforms in Single Port Access Surgery," In 2010 IEEE International Conference on Robotics and Automation (Anchorage, AK, 2010), pp. 1053-1058.
Dogangil et al., "A review of medical robotics for minimally invasive soft tissue surgery," Proceedings of the Institution of Mechanical Engineers, Part H: Journal of Engineering in Medicine, 2010, vol. 224, pp. 653-679.
Dupont et al., Design and Control of Concentric-Tube Robots, IEEE Transaction on Robotics 26, 2 (2010), 209-225.
Eberman et al., "Determination of Manipulator Contact Information from Joint Torque Measurements," In Experimental Robotics I, vol. 139. Springer, 1990, pp. 463-473.
Ebert-Uphoff et al., "Inverse Kinematics of Discretely Actuated Hyper-Redundant Manipulators Using Workspace Densities," IEEE Int. Conf. on Robotics and Automation, 1996, pp. 139-145.
Egeland, "Task-space tracking with redundant manipulators," IEEE J. Robot. Autom., 1987, vol. 3, No. 5, pp. 471-475.
Entsfellner et al., "Micro-Macro Telemanipulator for Middle-Ear Microsurgery," in Robotics; Proceedings of ROBOTIK 2012; 7th German Conference on, 2012, pp. 395-398.
Eshraghi et al., "Comparative Study of Cochlear Damage with Three Perimodiolar Electride Designs," The Laryngeoscope, 2003, vol. 113, pp. 415-419.
Fadda et al., "Computer Assisted Planning for Total Knee Arthoplasty," in Lecture Notes in Computer Science (LNCS) vol. 1205, J. Troccaz, E. Grimson, and R. Mosges, Eds.: Springer, 1997, 619-628.
Falkenhahn et al., "Dynamic modeling of bellows-actuated continuum robots using the euler-lagrange formalism," IEEE Transactions on Robotics, 2015, vol. 31, No. 6, pp. 1483-1496.
Farah et al., "Dyes in ocular surgery: principles for use in chromovitrectomy," Am J Ophthalmol, 2009, vol. 148, pp. 332-40.
Faugere et al., "Combinatorial Classes of Parallel Manipulators," Mechanism and Machine Theory, 1995, vol. 6, pp. 765-776.
Featherstone et al., "A General Contact Model for Dynamically-Decoupled Force/Motion Control," In 1999 IEEE International Conference on Robotics and Automation (1999), No. May, pp. 3281-3286.
Featherstone, "Modeling and Control of Contact Between Constrained Rigid Bodies," IEEE Transaction on Robotics and Automation 20, 1 (2004), 82-92.
Ficarra et al., "Evidence from robot-assisted laparoscopic radical prostatectomy: a systematic review," Eur. Urol., 2007, vol. 51, No. 1, discussion 56, pp. 45-56.
Fichter, "A Stewart Platform-Based Manipulator: General Theory and Practical Construction," Int. J. Robotics Research, 1986, vol. 5, pp. 157-182.
Fine et al., "A novel dual-arm dexterous ophthalmic microsurgical robot: applications for retinal vascular cannulation and stent deployment," In American Society of Retinal Specialists, Retina congress 2009, New York, NY, Sep. 4-Oct. 4.
Fine et al., "Could Robots Ever Do Retina Surgery?" Review of Ophthalmology, vol. 17, No. 5, Issue: May 1, 2010.
Fishman et al., "Flouroscopically Assisted Cochlear Implantation," Otology & Neurotology, 2003, vol. 24, pp. 882-886.
Fitts, "The information capacity of the human motor system in controlling the amplitude of movement," J. Exp. Psychol., 1954, vol. 47, No. 6, p. 381-391.
Frangieh et al., "Histopathologic study of nine branch retinal vein occlusions," Arch Ophthalmol., 1982, vol. 100, pp. 1132-1140.
Fras et al., "New stiff-flop module construction idea for improved actuation and sensing," in 2015 IEEE International Conference on Robotics and Automation (ICRA), IEEE, 2015, pp. 2901-2906.
Freschi et al., "Technical review of the da Vinci surgical telemanipulator," Int. J. Med. Robot., 2013, 9: 396-406.
Fritzsche et al., "Resectoscope with an easy to use twist mechanism for improved handling," Current Directions in Biomedical Engineering, 2016, 2(1):379-382.
Gagarina et al., "Modeling and experimental analysis of a new bellow type actuators for active catheter end-effector," in Robot and Hu-man Interactive Communication, 2001. Proceedings. 10th IEEE International Workshop on, IEEE, 2001, pp. 612-617.
Gantz et al., "Preservation of hearing in cochlear implant surgery: advantages of combined electrical and acoustical speech processing," Laryngoscope, 2005, vol. 115, pp. 796-802.
Gaponov et al., Twisted string actuation systems: a study of the mathematical model and a comparison of twisted strings. IEEE/ASME Transactions on Mechatronics, 19(4), pp. 1331-1342.
Garbin et al., "Design of a Disposable Endoscope with Intrinsic Pneumatic Actuation," 2017, Hamlyn Symposium, London, Jun. 25-28.
Garbin et al., "Evaluation of a novel disposable upper endoscope for unsedated bedside (non-endoscopy unit based) assessment of the upper gastrointestinal (UGI) tract," DDW 2017, May 6-9, Gastrointestinal Endoscopy, 2017, vol. 85, No. 5S, Su1180.
Garbin et al., "Toward a low-cost soft robotic manipulator based on fluid-actuated bellows for gastric cancer screening," 2017, Hamlyn Symposium London, Jun. 25-28, 2017, 8 pages.
Garty et al., "Development of an ultrahigh-throughput robotically-based biodosimetry workstation using in-situ assays," In 13th International Congress of Radiation Research, San Francisco, California, Jul. 8-12, 2007.
Gharib, "A new design for variable diameter orifice mechanism," in ASME 2012 International Mechanical Engineering Congress and Exposition. American Society of Mechanical Engineers, 2012, pp. 1551-1552.
Ghazvini, "Reducing the Inverse Kinematics of Manipulators to the Solution of a Generalized Eigenproblem," in Computational Kinematics: Kluwer Academic Publishers, 1993, pp. 15-26.
Godage et al., "Shape Function-Based Kinematics and Dynamics for Variable Length Continuum Robotic Arms," 2011 IEEE International Conference on Robotics and Automation (May 9-13, 2011).
Goldman et al., "Algorithms for Autonomous Exploration and Estimation in Compliant Environments," Robotica, 31(1), 71-88, 2013.
Goldman et al., "Compliant Motion Control for Continuum Robots with Intrinsic Actuation Sensing," in IEEE International Conference on Robotics and Automation, 2011, pp. 1126-1132.
Goldman et al., "Compliant Motion Control for Multi-segment Continuum Robots With Actuation Force Sensing," IEEE Transaction on Robotics, 2014, vol. 30, No. 4, pp. 890-902.
Goldman et al., "Design and Performance Evaluation of a Minimally Invasive Telerobotic Platform for Transurethral Surveillance and Intervention," IEEE Transactions on Biomedical Engineering, 60(4), 918-925, 2013.
Goldman et al., "Rapidly Deployable Telerobotic Slave for Transurethral Exploration and Intervention," In presented in the 2011 Annual Engineering and Urology Society annual meeting, May 14, 2011, Washington, DC.
Goldman, "Analysis, Algorithms, and Control for Intelligent Surgical Exploration and Intervention," Phd Thesis, Columbia University (graduated with distinction) 2011.
Gong et al., "Four-arm robotic partial nephrectomy for complex renal cell carcinoma," World journal of urology, 2010, vol. 28, pp. 111-115.
Gosselin et al., "Singularity Analysis of Closed-Loop Kinematic Chains," IEEE Transactions on Robotics and Automation, 1990, vol. 6, pp. 281-290.
Gough et al., "Universal Tyre Test Machine," Proceedings, Ninth International Technical Congress F.I.S.I.T.A., 1962, pp. 117-137.
Grace, "Kinematic Design of an Opthalmic Surgery Robot and Feature Extracting Bilateral Manipulation," in Mechanical Engineering: Northwestern University, 1995, Dissertation, 95 pages.

(56) References Cited

OTHER PUBLICATIONS

Gravagne et al., "Good Vibrations: A Vibration Damping Setpoint Controller for Continuum Robots," Proceedings of the 2001 IEEE International Conference on Robotics & Automation (May 21-26, 2001).
Gravagne et al., "Kinematic Transformations for Remotely-Actuated Planar Continuum Robots," In 2000 IEEE International Conference on Robotics & Automation (San Francisco, 2000), No. April, pp. 19-26.
Gravagne et al., "Manipulability, Force, and Compliance Analysis for Planar Continuum Manipulators," IEEE Transactions on Robotics and Automation, vol. 18, No. 3 (Jun. 2002).
Gravagne et al., "Large deflection dynamics and control for planar continuum robots," IEEE/ASME Trans. Mechatronics, 2003, vol. 8, No. 2, pp. 299-307.
Gstoettner et al., "Hearing preservation in cochlear implantation for electric acoustic stimulation," Acta Otolaryngol, 2004, vol. 124, pp. 348-352.
Guo et al., "Micro Active Guide Wire Catheter System—Characteristic Evaluation, Electrical Model and Operability Evaluation of Micro Active Catheter," IEEE International Conference on Robotics and Automation (ICRA'96), 1996, pp. 2226-2231.
Guo et al., "Micro Active Guide Wire Catheter System—Characteristic Evaluation, Electrical Model and Operability Evaluation of Micro Active Catheter," Sixth Int'l Symposium on Micro Machine and Human Science (MHS'95), 1995, pp. 131-136.
Guo et al., "Micro Active Guide Wire Catheter System," IEEE International Conference on Robotics and Automation, 1995, pp. 172-177.
Guo et al., "Micro Catheter System with Active Guide Wire—Structure, Experimental Results and Characteristic Evaluation of Active Guide Wire Catheter Using ICPF Actuator," Proc. 5th Int'l Symp. on Micro Machine and Human Science (MHS'94), 1994, pp. 191-197.
Gupta et al., "Current and evolving uses of optical coherence tomography in the genitourinary tract," Curr. Urol. Rep., 2015, 16:15, 7 pages.
Guthart et al., "The IntuitiveTM Telesurgery System: Overview and Application," In 2000 IEEE International Conference on Robotics and Automation (2000), pp. 618-621.
Haber et al., "Novel robotic da Vinci instruments for laparoendoscopic single-site surgery," Urology, 2010, vol. 76, pp. 1279-1282.
Haddadin et al., Collision Detection and Reaction: A Contribution to Safe Physical Human-Robot Interaction. In 2008 IEEE/RSJ International Conference on Intelligent Robots and Systems (Nice, France, 2008), pp. 3356-3363.
Haga et al., "Small Diameter Active Catheter Using Shape Memory Alloys," Proc. of IEEE Micro Electro Mechanical Systems, 1998, pp. 419-424.
Hale, "Medical Applications of magnet Devices," IEEE Transactions on Magnetics, 1975, vol. 11, pp. 1405-1407.
Hamid et al., "Design and Synthesis of Wire-Actuated Universal-Joint Wrists for Surgical Application," In 2009 IEEE International Conference on Robotics and Automation, pp. 1807-1831. Kobe, Japan.
Hannan et al., "Analysis and initial experiments for a novel elephant's trunk robot," IEEE/RSJ International Conference on Intelligent Robots and Systems (IROS 2000), 2000, pp. 330-337.
Hannan et al., "Kinematics and the Implementation of an Elephant's Trunk Manipulator and Other Continuum Style Robots," Journal of Robotic Systems 20, 2 (2003), 45-63.
Hannan et al., "The 'elephant trunk' manipulator, design and implementation," proceedings of IEEE/ASME International conference on Advanced Intelligent Mechatronics, 2001, vol. 1, pp. 14-19.
Haritoglou et al., "Five-year follow-up of macular hole surgery with peeling of the internal limiting membrane: update of a prospective study," Retina, 2006, vol. 26(6), pp. 618-622.
Harris et al., "Experiences with Robotic Systems for Knee Surgery," vol. 1205, J. Troccaz, E. Grimson, and R. Mosges, Eds. Springer, 1997, pp. 757-766.

Hassan et al., "Active-braid, a bioinspired continuum manipulator," IEEE Robotics and Automation Letters, 2017, vol. 2, No. 4, pp. 2104-2110.
Hayward, "Fast Collision Detection Scheme by Recursive Decomposition of a Manipulator Workspace," Proceedings IEEE International Conference on Robotics and Automation, vol. 3 (1986).
Heimann et al., "Primary vitrectomy for rhegmatogenous retinal detachment: an analysis of 512 cases," Graefes Arch Clin Exp Ophthalmol., 2006, vol. 244, pp. 69-78.
Hendrick et al., "A multi-arm hand-held robotic system for transurethral laser Prostate surgery," in 2014 IEEE International Conference on Robotics and Automation (ICRA), 2014, pp. 2850-2855.
Henrich et al., "Quantification of Contrast Recognizability During Brilliant Blue G (BBG) and Indocyanine Green (ICG) Assisted Chromovitrectomy," Invest Ophthalmol Vis Sci., 2011, 52(7): 4345-4349.
Herrell et al., "Toward Image-Guided Robotic Surgery: System Validation," J Urol. Feb. 2009; 181(2): 783-9 Discussion 789-90. Epub Dec. 16, 2008.
Hillel et al., "Applications of Robotics for Laryngeal Surgery," Otolaryngologic Clinics of North America, Nasir Bhatti & Ralph P. Tufano Eds., vol. 41, Issue 4, pp. 781-791, doi:0.1016/j.otc.2008.01.021, Aug. 2008.
Hirai et al., "Modeling of Deformable Thin Parts for their Manipulation," IEEE International Conference on Robotics and Automation, 1994, pp. 2955-2960.
Hirai et al., "Towards a Task Planning for Deformable object Manipulation—Formulation and Computation of Linear Object Deformation," IEEE International Conference on Robotics and Automation, 1995, pp. 80-85.
Hirose et al., "Coupled Tendon-Driven Multijoint Manipulator," IEEE Int. Conf. Robotics & Automation, 1991, pp. 1268-1275.
Hirose et al., "The Development of Soft Gripper for the Versatile Robot Hand," Mechanism and Machine Theory, 1987, vol. 13, pp. 351-359.
Hirose et al., "Tensor Actuated Elastic Manipulator," in Proceedings of the Sixth World Congress on Theory of Machines and Mechanisms, 1983, pp. 978-981.
Ho et al., "Robot Assisted Knee Surgery," IEEE Engineering in Medicine and Biology Magazine 14, 3 (1995), 292-299.
Hockstein et al., "Robotic microlaryngeal surgery: a technical feasibility study using the daVinci surgical robot and an airway mannequin," The Laryngoscope, 2005, vol. 115, No. 5, pp. 780-785.
Hodac et al., "Decoupled macro/micro-manipulator for fast and precise assembly operations: design and experiments," in Proc. SPIE 3834, Microrobotics and Microassembly, 1999, pp. 122-130.
Hodges et al., "Conservation of residual hearing with cochlear implantation," Am J Otol, 1997, vol. 18, pp. 179-183.
Hogan, "Impedance Control: an Approach to Manipulation: Part I Theory," Journal of Dynamic Systems, Measurement, and Control 107, 1 (1985), 1.
Hongo et al., "NeuRobot: Telecontrolled Micromanipulator System for Minimally Invasive Microneurosurgery—Preliminary Results," Neurosurgery, 2002, vol. 51, pp. 985-988.
Howell, "Compliant Mechanisms," Wiley-Interscience, 2001.
Hunt, "Structural Kinematics of In-Parallel-Actuated Robot arms," Journal of Mechanisms, Transmissions, and Automation in Design, 1983, vol. 105, pp. 705-712.
Husty, "An Algorithm for Solving the Direct Kinematics of General Stewart-Gough Platforms," Mechanism and Machine Theory, 1996, vol. 31, pp. 365-380.
Huttenbrink et al., "Movements of Cochlear Implant Electrodes Inside the Cochlea during Insertion: An X-ray Microscopy Study," Otology & Neurotology, 2002, vol. 23, pp. 187-191.
Hwang et al., "Combined arteriovenous sheathotomy and intraoperative intravitreal triamcinolone acetonide for branch retinal vein occlusion," Br J Ophthalmol, 2010, vol. 94, pp. 1483-1489.
Hyun-Soo Yoon et al., "A 4-DOF flexible continuum robot using a spring backbone," in Proc. IEEE Int. Conf. Mechatron. Autom., Changchun, China, 2009, pp. 1249-1254.
Ikits et al., "An Improved Calibration Framework for Electromagnetic Tracking Devices," In 2001 IEEE Virtual Reality (Yokohama, Japan, 2001), IEEE Comput. Soc, pp. 63-70.

(56) References Cited

OTHER PUBLICATIONS

Ikuta et al. "Development of remote micro-surgery robot and new surgical procedure for Jeep and narrow space," In 2003 IEEE International Conference on Robotics and Automation (Taipei, Taiwan, 2003), vol. 1, IEEE, pp. 1103-1108.

Ikuta et al., "Multi-degree of freedom hydraulic pressure driven safety active catheter," in Proc. IEEE Int. Conf. Robot. Autom., Orlando, FL, 2006, pp. 4161-4166.

Ikuta et al., "Remote Microsurgery System for Deep and Narrow Space Development of New Surgical Procedure and Micro-robotic Tool Sophisticated Medical Treatment and Cases," in Medical Image Computing and Computer-Assisted Intervention, Tokyo, Japan, 2002, pp. 163-172.

Immega et al., "The KSI Tentacle Manipulator," IEEE Int. Conf. on Robotics and Automation, 1995, pp. 3149-3154.

Innocenti, "Forward Kinematics in Polynomial Form of the General Stewart Platform," ASME J. of Mechanical Design, 2001, vol. 123, pp. 254-260.

International Search Report and Written Opinion for Application No. PCT/US2017/064271 dated Feb. 9, 2018 (7 pages).

International Search Report and Written Opinion for Application No. PCT/US2018/050948 dated Nov. 20, 2018 (8 pages).

International Search Report and Written Opinion for PCT Application No. PCT/US2013/021167 dated Mar. 22, 2013.

International Search Report and Written Opinion for PCT Application No. PCT/US2013/037336 dated Jul. 25, 2013.

International Search Report and Written Opinion for PCT Application No. PCT/US2013/037346 dated Aug. 27, 2013.

International Search Report and Written Opinion for PCT Application No. PCT/US2013/037353 dated Aug. 19, 2013.

International Search Report and Written Opinion for PCT Application No. PCT/US2013/039280 dated Aug. 20, 2013.

Iqbal et al., "A guaranteed approach for kinematic analysis of continuum robot based catheter," in Robotics and Biomimetics (ROBIO), 2009 IEEE International Conference on, IEEE, 2009, pp. 1573-1578.

Ishiyama et al., "Magnetic micromachines for medical applications," Journal of Magnetism and Magnetic Materials, 2002, vol. 242-245, pp. 41-46.

Ivanescu et al., "A variable structure controller for a tentacle manipulator," in Proceedings of 1995 IEEE International Conference on Robotics and Automation, 1995, vol. 3, pp. 3155-3160.

Iyer et al., "An eye model for practicing vitreoretinal membrane peeling," Arch. Ophthalmol., 2006, vol. 124, No. 1, pp. 108-110.

James et al., "Preservation of residual hearing with cochlear implantation: how and why," Acta Otolaryngol, 2005, vol. 125, pp. 481-491.

Jayender et al., "Robot-assisted Active Catheter Insertion: Algorithms and Experiments," Int. J. Robot. Res., 2009, vol. 28, No. 9, pp. 1101-1117.

Jazayeri et al., "Distal digital replantation," Plast. Reconstr. Surg., 2013, vol. 132, No. 5, pp. 1207-1217.

Jensen et al., "Toward robot-assisted vascular microsurgery in the retina," Graefes Arch Clin Exp Ophthalmol, 1997, vol. 235, pp. 696-701.

Jerjes et al., "In vitro examination of suspicious oral lesions using optical coherence tomography.," Br. J. Oral Maxillofac. Surg., 2010, vol. 48, No. 1, pp. 18-25.

Jones et al., "A New Approach to Jacobian Formulation for a Class of Multi-Section Continuum Robots," in IEEE International Conference on Robotics and Automation, 2005, pp. 3268-3273.

Jones et al., "Practical Kinematics for Real-Time Implementation of Continuum Robots," IEEE Trans. Robot., 2006, vol. 22, No. 6, pp. 1087-1099.

Jones, "Kinematics for Multisection Continuum Robots," IEEE Transactions on Robotics, vol. 22, No. 1 (Feb. 2006), 43-57.

Joos et al., "A miniature forward-imaging optical coherence tomography probe," in Proc. SPIE 8209, Ophthalmic Technologies Xxii, 82090Z, 2012, p. 82090Z-82090Z-7.

Joos et al., "Miniature real-time intraoperative forward-imaging optical coherence tomography probe," Biomed. Opt. Express, 2013, vol. 4, No. 8, pp. 1342-1350.

Joos et al., "Preliminary Design and Evaluation of a B-Scan Oct-Guided Needle," Photonics, 2014, vol. 1, No. 3, pp. 260-266.

Kanazawa et al., "Current reconstructive techniques following head and neck cancer resection using microvascular surgery," Ann. Vasc. Dis., 2011, vol. 4, No. 3, pp. 189-195.

Kaouk et al., "Robotic assisted laparoscopic sural nerve grafting during radical prostatectomy: initial experience," J. Urol., 2003, vol. 170, No. 3, pp. 909-912.

Kapadia et al., "Empirical investigation of closed-loop control of extensible continuum manipulators," in 2014 IEEE/RSJ International Conference on Intelligent Robots and Systems, 2014, pp. 329-335.

Kapoor et al., "A Constrained Optimization Approach to Virtual Fixtures for Multi-Handed Tasks," in IEEE International Conference on Robotics and Automation (Pasadena, CA, 2008), pp. 3401-3406.

Kapoor et al., "A System for Speed and Torque Control of DC Motors with Application to Small Snake Robots," 2004.

Kapoor et al., "Constrained control for surgical assistant robots," in IEEE International Conference on Robotics and Automation, 2006, pp. 231-236.

Kapoor et al., "Spatial Motion Constraints for Robot Assisted Suturing using Virtual Fixtures," 2005, vol. 3750, pp. 89-96.

Kapoor et al., "Suturing in Confined Spaces: Constrained Motion Control of a Hybrid 8-DoF Robot", in IEEE Conference on Advanced Robotics, 2005, pp. 452-459.

Kapoor et al., "Telemanipulation of Snake-Like Robots for Minimally Invasive Surgery of the Upper Airway," in MICCAI 2006 workshop on medical robotics, Copenhagen, 2006.

Karger, "Architecture Singular Parallel Manipulators," in Advances in Robot Kinematics: Analysis and Control: Kluwer Academic Publishers, 1998, pp. 445-454.

Kaul et al., "da Vinci-assisted robotic partial nephrectomy: technique and results at a mean of 15 months of follow-up," European urology, 2007, vol. 51, discussion 191-2, pp. 186-191.

Kayalar et al., "Clinical applications of free arterialized venous flaps," J. Plast. Reconstr. Aesthet. Surg., 2014, vol. 67, No. 11, pp. 1548-1556.

Kazanzides et al., "An Integrated System for Cementless Hip Replacement," IEEE Engineering in Medicine and Biology, 1995, vol. 14, pp. 307-313.

Kelly, "Vitreous surgery for idiopathic macular holes: results of a pilot study," Arch Ophthalmol, 1991, vol. 109, pp. 654-659.

Kernt et al., "Indocyanine green increases light-induced oxidative stress, senescence, and matrix metalloproteinases I and 3 in human RPE cells," Acta Ophthalmol, 2012, 90: 571-579.

Kesner et al., "Design and Control of Motion Compensation Cardiac Catheters," In 2010 IEEE International Conference on Robotics and Automation (Anchorage, AK, 2010), pp. 1059-1065.

Kesner et al., "Force Control of Flexible Catheter Robots for Beating Heart Surgery," In 2011 IEEE International Conference on Robotics and Automation (Shanghai, China, Jan. 2011), pp. 1589-1594.

Kesner et al., "Position Control of Motion Compensation Cardiac Catheters," IEEE Transaction on Robotics 27, 6 (2011), 1045-1055.

Ketten et al., "In vivo measures of cochlear length and insertion depth of Nucleus cochlear implant electrode arrays," Ann. Otol. Rhinol. Laryngol., 1998, vol. 107, pp. 1-17.

Kha et al., "Stiffness properties for Nucleus standard straight and contour electrode arrays," Medical Engineering & Physics, 2004, vol. 26, pp. 677-685.

Khatib, "A Unified Approach for Motion and Force Control of Robot Manipulators: The Operational Space Formulation," IEEE Journal of Robotics and Automation 3,1 (1987), 43-53.

Kiefer et al., "Conservation of low-frequency hearing in cochlear implantation," Acta Otolaryngol, 2004, vol. 124, pp. 272-280.

Kienzle et al., "Total Knee Replacement," IEEE Engineering in Medicine and Biology, 1995, vol. 14, pp. 301-306.

(56) References Cited

OTHER PUBLICATIONS

Kim et al., "A physically-based haptic rendering for telemanipulation with visual information: Macro and micro applications," in 2008 IEEE/RSJ International Conference on Intelligent Robots and Systems, 2008, pp. 3489-3494.

Kim et al., "Inchworm-like colonoscopic robot with hollow body and steering device," JSME International Journal Series C Mechanical Systems, Machine Elements and Manufacturing, 2006, vol. 49, No. 1, pp. 205-212.

Knight et al., "Computer-assisted, robot-enhanced open microsurgery in an animal model," J. Laparoendosc. Adv. Surg. Tech. A, 2005, vol. 15, No. 2, pp. 182-185.

Kragic et al., "Human-Machine Collaborative Systems for Microsurgical Applications," The International Journal of Robotics Research 24, 9 (Sep. 2005), 731-741.

Kutz et al., "Neuropsychological testing in the screening for cochlear implant candidacy," Laryngoscope, 2003, vol. 113, pp. 763-766.

Kwartowitz et al., "Toward image-guided robotic surgery: determining intrinsic accuracy of the da Vinci robot," Int. J. Comput. Assist. Radiol. Surg., 2006, vol. 1, No. 3, pp. 157-165.

Kwartowitz et al., "Update: Toward image-guided robotic surgery: determining the intrinsic accuracy of the daVinci-S robot," Int. J. Comput. Assist. Radiol. Surg., 2007, vol. 1, No. 5, pp. 301-304.

Kwartowitz, "Towards Image Guided Robotic Surgery: Multi-Arm Tracking Through Hybrid Localization," Int J Comput Assist Radiol Surg. May 2009;4(3):281-6. Epub Mar. 19, 2009.

Laouri et al., "The burden of disease of retinal vein occlusion: review of the literature," Eye, 2011, 25: 981-988.

Lawson et al., "Transoral robotic surgery for the management of head and neck tumors: learning curve," European archives of oto-rhino-laryngology: official journal of the European Federation of Oto-Rhino-Laryngological Societies (EUFOS): affiliated with the German Society for Oto-Rhino-Laryngology - Head and Neck Surgery 268, 12 (Dec. 2011), 1795-801.

Lazard, "On the Representation of Rigid-Body Motions and Its Application to Generalized Platform Manipulators," Computational kinematics, 1993, pp. 175-181.

Lee et al., "Elimination-Based Solution Method for the Forward Kinematics of the General Stewart-Gough Platform," Computational Kinematics (CK2001), 2001, pp. 259-266.

Lee et al., "Human-guided surgical robot system for spinal fusion surgery: CoRASS," in 2008 IEEE International Conference on Robotics and Automation, ICRA 2008, May 19, 2008-May 23, 2008, Pasadena, CA, United States, 2008, pp. 3881-3887.

Lee et al., "Urgent bedside endoscopy for clinically significant upper gastrointestinal hemorrhage after admission to the intensive care unit," Intensive care medicine, 2003, 29(10): 1723-1728.

Leitner et al., "Computer-Assisted Knee Surgical Total Replacement," in Lecture Notes in Computer Science (LNCS) vol. 1205, J. Troccaz, E. Grimson, and R. Mosges, Eds.: Springer, 1997, 629-638.

Li et al., "Design and Study of a Novel Hyper-Redundant Manipulator," Robotica, 2003, vol. 21, pp. 505-509.

Li et al., "Spatial Motion Constraints in Medical Robot Using Virtual Fixtures Generated by Anatomy," in IEEE International Conference on Robotics & Automation, 2004, pp. 1270-1275.

Li et al., "A miniature B-scan forward-imaging OCT probe to guide real-time laser ablation," in Association for Research in Vision and Ophthalmology (ARVO) Annual Meeting, 2012.

Li et al., "Design of Continuous Backbone, Cable-Driven Robots," 2002, vol. 124, pp. 265-271.

Li et al., "Feasibility study on bonding quality inspection of microfluidic devices by optical coherence tomography," J. Biomed. Opt., 2011, 16(6): 066011, 9 pages.

Li et al., "Miniature forward-imaging B-scan optical coherence tomography probe to guide real-time laser ablation," Lasers Surg. Med., 2014, vol. 46, No. 3, pp. 193-202.

Lim et al., "Future of active catheters," Sensors and Actuators, 1996, vol. 56, pp. 113-121.

Lim et al., "Multi-link active catheter snake-like motion," Robotica, 1996, vol. 14, pp. 499-506.

Lipkin et al., "Hybrid Twist and Wrench Control for a Robotic Manipulator," Transaction of the ASME 110 (1988), 138-144.

Lipska et al., "Anastomotic leakage after lower gastrointestinal anastomosis: men are at a higher risk," Anz J. Surg., 2006, vol. 76, No. 7, pp. 579-585.

Liu et al., "Learning Insertion Task of a Flexible Beam by Virtual Agents," IEEE International Conference on Robotics and Automation, 2002, pp. 3290-3295.

Lock et al., "Friction Modeling in Concentric Tube Robots," In 2011 IEEE International Conference on Robotics and Automation (Shanghai, China, Jan. 2011), pp. 1139-1146.

Lohmeyer et al., "Prospective clinical study on digital nerve repair with collagen nerve conduits and review of literature," J. Reconstr. Microsurg., 2014, vol. 30, pp. 227-234.

Lumelsky et al., "Real-Time Collision Avoidance in Tele-operated Whole-Sensitive Robot Arm Manipulators," IEEE Transactions on Systems, Man, and Cybernetics 23, 1 (1993), 194-203.

Ma et al., "An obstacle avoidance scheme for hyper-redundant manipulators-global motion planning in posture space," In Proceedings of International Conference on Robotics and Automation (1997), vol. 1, IEEE, pp. 161-166.

Ma et al., "Architecture Singularities of Parallel Manipulators," IEEE International Conference on Robotics and Automation, 1991, pp. 1542-1547.

Maden et al., "A review of planar scissor structural mechanisms: geometric principles and design methods," Architectural Science Review, 2011, vol. 54, No. 3, pp. 246-257.

Mader et al., "Ocular war injuries of the Iraqi insurgency," Jan.Sep. 2004. Ophthalmology, 2006, 113:97-104.

Maeda et al., "Active endoscope with SMA (Shape Memory Alloy) coil springs," in Proc. IEEE 9th Int. Workshop Microelectromech. Syst., San Diego, CA, 1996, pp. 290-295.

Maghooa et al., "Tendon and pressure actuation for a bio-inspired manipulator based on an antagonistic principle," in 2015 IEEE International Conference on Robotics and Automation (ICRA), IEEE, 2015, pp. 2556-2561.

Mahvash et al., "Friction Compensation for a Force-Feedback Telerobotic System," In 2006 IEEE International Conference on Robotics and Automation (Orlando, FL, 2006), No. May, pp. 3268-3273.

Mahvash et al., "Mechanics of dynamic needle insertion into a biological material," IEEE transactions on bio-medical engineering 57, 4 (Apr. 2010), 934-43.

Mahvash et al., "Stiffness Control of a Continuum Manipulator in Contact with a Soft Environment," The 2010 IEEE/RSJ International Conference on Intelligent Robots and Systems (Oct. 18-22, 2010).

Mahvash et al., "Stiffness Control of Surgical Continuum Manipulators," IEEE Transaction on Robotics 27, 2 (2011), 334-345.

Malik, "Human development report," United Nations Development Programme: UNDP Report, 2013, 216 pages.

Manolidis et al., "Do the genes that cause otosclerosis reduce susceptibility to otitis media?" Otol Neurotol, 2003, vol. 24, pp. 868-871.

Manolidis et al., "Use of reconstructed, nonorthogonal plane, high-resolution computed tomography of the temporal bone in the planning of temporal bone surgery," ORL J Otorhinolaryngol Relat Spec, 2003, vol. 65, pp. 71-75.

Manolidis et al., "Robotic insertion of cochlear implant electrodes to minimize cochlear trauma." 6th European Congress of Oto—Rhino—Laryngology, Head & Neck Surgery, Vienna, Austria, 2007.

Mason et al., "Sheathotomy to decompress branch retinal vein occlusion: a matched control study," Ophthalmology, 2004, vol. 111, pp. 540-545.

Mason et al., "Robot Hands and the Mechanics of Manipulation," MIT Press, Cambridge, MA, 1985.

Mason, "Compliance and Force Control for Computer Controlled Manipulators," IEEE Transaction on Systems, Vlan, and Cybernetics smc-11, 6 (1981), 418-432.

(56) References Cited

OTHER PUBLICATIONS

Matsumoto et al., "Collision Detection of Manipulator Based on Adaptive Control Law," In 2001 IEEE/ASME International Conference on Advanced Intelligent Mechatronics (Como, Italy, 2001), pp. 177-182.

Matsumura et al., "Microvascular anastomosis at 30-50× magnifications (super-microvascular anastomosis) in neurosurgery," Surg. Neurol. Int., 2011, vol. 2, 6 pages.

Matsunaga et al., "Histopathologic evaluation of the internal limiting membrane surgically excised from eyes with diabetic maculopathy," Retina, 2005, vol. 25, pp. 311-316.

Mcintosh et al., "Interventions for branch retinal vein occlusion: an evidence-based systematic review," Ophthalmology, 2007, vol. 114, pp. 835-854.

Mcmahan et al., "Field trials and testing of the octarm continuum manipulator," in Robotics and Automation, 2006. ICRA 2006. Proceedings 2006 IEEE International Conference on. IEEE, 2006, pp. 2336-2341.

Meeker et al., "Optimal Realization of Arbitrary Forces in a Magnetic Sterotaxis System," IEEE Transactions on Magnetics, 1996, vol. 32, pp. 320-328.

Merlet, "An Initiative for the Kinematic Study of Parallel Manipulators," Proceedings of the Workshop on Fundamental Issues and Future Research Directions for Parallel Mechanisms and Manipulators, 2002, 8 pages.

Merlet, "Kinematics is Not Dead!" IEEE International Conference on Robotics and Automation, 2000, pp. 1-6.

Merlet, "Parallel manipulators: state of the art and perspective," Journal of Robotics Society of Japan, 1992, vol. 10, pp. 57-62.

Merlet, "Parallel Robots: Open Problems," 9th International Symposium of Robotics Research, Snowbird, 1999, pp. 23-28.

Merlet, "Singular configurations of parallel manipulators and Grassmann geometry," in Geometry and Robotics, vol. LNCS 391, B. J-D. and J-P.Laumond, Eds., 1989, pp. 194-212.

Merlet, "Singular configurations of parallel manipulators and Grassmann geometry," Int. J. of Robotics Research, 1989, vol. 8, pp. 45-56.

Merzouki et al., "Compensation of friction and backlash effects in an electrical actuator," J. Syst. Cont. Eng., 2004, vol. 218, No. 2, 10 pages.

Mester et al., "Vitrectomy with aiteriovenous decompression and internal limiting membrane dissection in branch retinal vein occlusion," Retina, 2002, vol. 22, pp. 740-746.

Mikhail et al., "Robotic-assisted laparoscopic prostatectomy: first 100 patients with one year of follow-up.," Urology, 2006, vol. 68, No. 6, pp. 1275-1279.

Mineta, "Batch fabricated flat meandering shape memory alloy actuator for active catheter," Sensors and Actuators A, 2001, vol. 88, pp. 112-120.

Mochiyama et al., "Direct Kinematics of Manipulators with Hyper Degrees of Freedom and Fernet-Serret Formula," International Conference on Robotics and Automation, 1998, pp. 1653-1658.

Mochiyama et al., "Shape Correspondence between a Spatial Curve and a Manipulator with Hyper Degrees of Freedom," IEEE/RSJ International conference on Intelligent Robots and Systems (IROS), 1998, pp. 161-166.

Mochiyama et al., "The Shape Jacobian of a Manipulator with Hyper Degrees of Freedom," IEEE International Conference on Robotics and Automation, 1999, pp. 2837-2842.

Mochiyama et al., "Shape Control of Manipulators with Hyper Degrees of Freedom," Int. J. Robot. Res., 1999, vol. 18, No. 6, pp. 584-600.

Moll et al., "Path Planning for Variable Resolution Minimal-Energy Curves of Constant Length," IEEE International Conference on Robotics and Automation, Barcelona, Spain, 2005, pp. 2130-2135.

Möller, "Grobner Bases and Numerical Analysis," in Gröbner Bases and Applications, Lecture Note Series 251—London Mathematical Society, B. Buchberger and F. Winkler, Eds., 1998, pp. 159-178.

Montesi et al., "An SMA-base flexible active endoscope for minimal invasive surgery," Journal of Micromechanics and Microengineering, 1995, vol. 5, pp. 180-182.

Nagatsu et al., "Macro-micro bilateral control using Kalman filter based state observer for noise reduction and decoupling of modal space," in IECON 2013—39th Annual Conference of the IEEE Industrial Electronics Society, 2013, pp. 4192-4197.

Nakagaki et al., "Study of insertion Task of a Flexible Beam into a Hole," IEEE International Conference on Robotics and Automation, 1995, pp. 330-335.

Nakagaki et al., "Study of Insertion Task of a Flexible Wire into a Hole by Using Visual Tracking Observed by Stereo Vision," IEEE International Conference on Robotics and Automation, 1996, pp. 3209-3214.

Nakamura et al., "A robotic neurosurgery system with autofocusing motion control for mid-infrared laser ablation," in MICCAI'2006 workshop on medical robotics, Copenhagen, Denmark, 2006, pp. 108-115.

Nakamura et al., "Inverse Kinematic Solutions With Singularity Robustness for Robot Manipulator Control," J. Dyn. Syst. Meas. Control, 1986, vol. 108, No. 3, p. 163-171.

Nakamura, "Advanced Robotics: Redundancy and Optimization," Addison-Wesley Longman Publishing Co., Inc., Boston, MA, USA, 1990.

Nguyen et al., "A tendon-driven continuum robot with extensible sections," in Intelligent Robots and Systems (IROS), 2015 IEEE/RSJ International Conference on. IEEE, 2015, pp. 2130-2135.

NIDCD, "Presbycusis according to NIDCD," 2016, <https://www.nidcd.nih.gov/sites/default/files/Content%20Images/presbycusis.pdf>.

Nielsen et al., "Solving the Input/Output Problem for Planar Mechanisms," ASME J. of Mechanical Design, 1999, vol. 121, pp. 206-211.

Noh et al., "A continuum body force sensor designed for flexible surgical robotics devices," in 2014 36th Annual International Conference of the IEEE Engineering in Medicine and Biology Society, IEEE, 2014, pp. 3711-3714.

Noh et al., "A three-axial body force sensor for flexible manipulators," in 2014 IEEE International Conference on Robotics and Automation (ICRA), IEEE, 2014, pp. 6388-6393.

Nukherjee, "Design of holonomic loops for repeatability in redundant manipulators," in Proceedings of 1995 IEEE International Conference on Robotics and Automation, vol. 3, pp. 2785-2790.

O'Brien et al., "3d force control system design for a hydraulic parallel bellows continuum actuator," in Robotics and Automation, 2001. Proceedings 2001 ICRA. IEEE International Conference on, IEEE, vol. 3, 2001, pp. 2375-2380.

Obstein et al., "Sa1665 ultra low-cost endoscopy for gastric cancer screening in low resource settings," Gastrointestinal Endoscopy, 2014, vol. 79, No. 5, AB293.

Oghalai et al., "Neonatal hearing loss in the indigent," Laryngoscope, 2002, vol. 112, pp. 281-286.

Oh et al., "Long-term visual outcome of arteriovenous adventitial sheathotomy on branch retinal vein occlusion induced macular edema," Korean J Ophthalmol, 2008, vol. 22, pp. 1-5.

Okie, "Traumatic brain injury in the war zone," N Engl J Med, 2005, 352(20):2043-2047.

Olsson et al., "Friction Models and Friction Compensation," European Journal of Control, 1998, vol. 4, No. 3, pp. 176-195.

O'Malley et al., "Robotic Anterior and Midline Skull Base Surgery: Preclinical Investigations," Int. J. Radiation Oncology Biol. Phys., 2007, vol. 69, pp. 2125-2128.

Opremcak, "Surgical decompression of branch retinal vein occlusion via arteriovenous crossing sheathotomy: a prospective review of 15 cases," Retina, 1999, vol. 19, pp. 1-5.

Osterloh, "Surgical decompression of branch retinal vein occlusions," Arch Ophthalmol., 1988, vol. 106, pp. 1469-1471.

Osuka et al., "Development of Mobile Inspection Robot for Rescue Activities: MIORA," IEEE/RSJ International Conference on Intelligent Robots and Systems, 2003, pp. 3373-3377.

Ota et al., "A Novel Highly Articulated Robotic Surgical System for Epicardial Ablation," in 30th Annual International IEEE EMBS Conference, Vancouver, British Colombia, Canada, 2008, pp. 250-253.

(56) References Cited

OTHER PUBLICATIONS

Paljug et al., "The JPL Serpentine Robot: a 12 DOF System for Inspection," IEEE Int. Conf. on Robotics and Automation, 1995, pp. 3143-3148.
Pantuck et al., "A Novel Resectoscope for Transurethral Resection of Bladder Tumprs and the Prostate," The Journal of Urology, 2007, vol. 178, 2331-2336.
Park et al., "A multilink active catheter with polyimide-based integrated CMOS interface circuits," Journal of Micromechanical Systems, 1999, pp. 349-357.
Park et al., "Macular hole surgery with internal-limiting membrane peeling and intravitreous air," Ophthalmology, 1999, vol. 106(7), pp. 1392-1397.
Park et al., "Robot Multiple Contact Control," Robotica 26, 05 (2008), 667-677.
Patel et al., "Evaluation of a novel flexible snake robot for endoluminal surgery," Surgical endoscopy, 2015, vol. 29, No. 11, pp. 3349-3355.
Patrick et al., "Characterization of mechanical properties of single electrodes and multi-electrodes," Annals of Otology, Rhinology and Laryngologyment, 1987, vol. 96, pp. 46-48.
Patronik et al., "Crawling on the heart: a mobile robotics device for minimally invasive cardiac interventions," in MICCAI 2004 (7th International Conference on Medical Image Computing and Computer-Assisted Intervention), 2004, pp. 9-16.
Peersman et al., "Prolonged operative time correlates with increased infection rate after total knee arthroplasty," HSS J., 2006, vol. 2, No. 1, pp. 70-72.
Peirs et al., "Design of an Advanced Tool Guiding System for Robotic Surgery," in 2003 IEEE International Conference on Robotics and Automation, 2003, pp. 2651-2656.
Penning et al., "Towards Closed Loop Control of a Continuum Robotic Manipulator for Medical Applications," In 2011 IEEE International Conference on Robotics and Automation (Shanghai, China 2011), pp. 4822-4827.
Petrovskays et al., "Probabilistic Estimation of Whole Body Contacts for Multi-Contact Robot Control," In 2007 IEEE International Conference on Robotics and Automation (Rome, 2007), No. c, pp. 568-573.
Phee et al., "Analysis and Development of Locomotion Devices for the Gastrointestinal Tract," IEEE Transactions on Biomedical Engineering, 2002, vol. 49, pp. 613-616.
Phee et al., "Robotic system for no-scar gastrointestinal surgery," The international journal of medical robotics + computer assisted surgery: MRCAS 4, 1 (Mar. 2008), 15-22.
Phelan et al., "Laparoscopic partial nephrectomy and minimally invasive nephron-sparing surgery," Current urology reports, 2003, vol. 4, pp. 13-20.
Phillips et al., "Closed globe macular injuries after blasts in combat," Retina, 2013, 33(2):371-9.
Piccigallo et al., "Design of a Novel Bimanual Robotic System for Single-Port Laparoscopy," IEEE/ASME Transaction on Mechatronics 15, 6 (2010), 871-878.
Pickens et al., "Preliminary Testing of a Transurethral Dexterous Robotic System for Bladder Resection," In 27th EUS Annual Meeting, pp. 65. Atlanta, GA 2012.
Pickens et al., "A Pilot Ex-Vivo Evaluation of a Telerobotic System for Transurethral Intervention and Surveillance," J. Endourol., 2015, 29(2): 231-234.
Pile et al., "Algorithms and Design Considerations for Robot Assisted Insertion of Perimodiolar Electrode Arrays," In 2011 IEEE International Conference on Robotics and Automation. Shanghai, China 2011.
Pile et al., "Characterization of Friction and Speed Effects and Methods for Detection of Cochlear Implant Electrode Tip Foldover," In Accepted for publication in IEEE International Conference on Robotics and Automation (ICRA'2013).
Pile et al., "Speed Dependence of Insertion Forces During Ci Electrode Insertion," In Presented at the 12th Annual Conference on Cochlear Implants and other Implantable Auditory Technologies CI'2012, Baltimore, MD, May 3-5, 2012.
Piltan et al., "Design Gradient Descent Optimal Sliding Mode Control of Continuum Robots," IAES Int. J. Robot. Autom., 2012, vol. 1, No. 4, pp. 175-189.
Popov et al., "Towards variable stiffness control of antagonistic twisted string actuators," In Intelligent Robots and Systems (IROS 2014), 2014 IEEE/RSJ International Conference, 2014, pp. 2789-2794.
Porpiglia, "Editorial comments to da Vinci-assisted robotic partial nephrectomy: technique and results at a mean of 15 months of follow-up," European urology, 2007, vol. 51, p. 191.
Portman et al., "Rigid 6-DOF parallel platform for precision 3-D micromanipulation," Int. J. Mach. Tools Manuf., 2001, vol. 41, No. 9, pp. 1229-1250.
Prasad et al., "Surgical robotics: impact of motion scaling on task performance," J. Am. Coll. Surg., 2004, vol. 199, No. 6, pp. 863-868.
Pritts et al., "Design of an artificial muscle continuum robot," in Robotics and Automation, 2004. Proceedings. ICRA'04. 2004 IEEE International Conference on, vol. 5. IEEE, 2004, pp. 4742-4746.
Quiram et al., "Outcomes of vitrectomy with inferior retinectomy in patients with recurrent rhegmatogenous retinal detachments and proliferative vitreoretinopathy," Ophthalmology, 2006, 113:2041-2047.
Raghavan et al., "Solving Polynomial Systems for the Kinematic Analysis and Synthesis of Mechanisms and Robot Manipulators," ASME J. of Mechanical Design, 1995, vol. 117, pp. 71-79.
Raghavan, "The Stewart Platform of General Geometry Has 40 Configurations," ASME J. of Mechanical Design, 1993, vol. 115, pp. 277-282.
Raibert et al., "Hybrid Position/Force Control of Manipulators," Journal of Dynamic Systems, Measurement, and Control 103, 2 (1981), 126.
Rehak, "Branch retinal vein occlusion: pathogenesis, visual prognosis, and treatment modalities," Curr Eye Res, 2008, vol. 33, pp. 111-131.
Reichert et al., "Robotic insertion of cochlear implant electrodes to minimize cochlear trauma," In 6th European Congress of Oto-Rhino-Laryngology, Head and Neck Surgery., Vienna, Austria, Jun. 2007.
Reiter et al., "A Learning Algorithm for Visual Pose Estimation of Continuum Robots," In 2011 IEEE/RSJ International Conference on Intelligent Robots and Systems (San Francisco, CA, USA, 2011), pp. 2390-2396.
Reiter et al., "Learning-Based Configuration Estimation of a Multi-Segment Continuum Robot," In the Fourth IEEE RAS/EMBS International Conference on Biomedical Robotics and Biomechatronics (Roma, Italy, 2012), p. accepted.
Reynaerts et al., "Shape memory micro-actuation for a gastro-intestinal intervention system," Sensors and Actuators, vol. 77, pp. 157-166, 1999.
Rhode, "Large Deflections of Cantilever Beam with Uniformly Distributed Load," Q. Appl. Math., 1953, vol. 11, pp. 337-338.
Rivera-Serrano et al., "A transoral highly flexible robot: Novel technology and application," The Laryngoscope 122, 5 (May 2012), 1067-71.
Roberts et al., "A comparison of two methods for choosing repeatable control strategies for kinematically redundant manipulators," in Proceedings 1992 IEEE International Conference on Robotics and Automation, 1992, pp. 514-519.
Robinson et al., "Continuum robots—a state of the art," In 1999 IEEE International Conference on Robotics and Automation (Detroit, MI, USA, 1999), vol. 4, IEEE, pp. 2849-2854.
Rodanant et al., "Sheathotomy without separation of venule overlying arteriole at occlusion site in uncommon branch retinal vein occlusion," J Med Assoc Thai., 2005, vol. 88, pp. 143-150.
Rogers et al., "Robotic partial nephrectomy for renal hilar tumors: a multi-institutional analysis," The Journal of urology, 2008, vol. 180, discussion 2356, pp. 2353-2356.
Rogers et al., "Robotic partial nephrectomy: the real benefit," Current opinion in urology, 2011, vol. 21, pp. 60-64.
Rogers et al., "The prevalence of retinal vein occlusion: pooled data from population studies from the United States, Europe, Asia, and Australia," Ophthalmology, 2010, vol. 117, pp. 313-319.

(56) References Cited

OTHER PUBLICATIONS

Roland et al., "Progress Towards a Robotically Inserted Cochlear Implant Electrode," In 12th Symposium on Cochlear Implants in Children, Seattle 2009.
Roland, "A model for cochlear implant electrode insertion and force evaluation: results with a new electrode design and insertion technique," The Laryngeoscope, 2005, vol. 115, pp. 1325-1339.
Rone et al., "Continuum Manipulator Statics Based on the Principle of Virtual Work," in vol. 4: Dynamics, Control and Uncertainty, Parts A and B, 2012, 8 pages.
Rosenberg, "Virtual fixtures: Perceptual tools for telerobotic manipulation," in Proceedings of IEEE Virtual Reality Annual International Symposium, 1993, pp. 76-82.
Roth, "Computation in Kinematics," Computational Kinematics, 1993, pp. 3-14.
Roy et al., "Investigation of effects of dynamics on intrinsic wrench sensing in continuum robots," in Robotics and Automation (ICRA), 2016 IEEE International Conference on. IEEE, 2016, pp. 2052-2059.
Rucker et al., "Deflection-Based Force Sensing for Continuum Robots: A Probabilistic Approach," In 2011 IEEE/RSJ International Conference on Intelligent Robots and Systems (2011), pp. 3764-3769.
Rucker et al., "Geometrically Exact Model for Externally Loaded Concentric-Tube Continuum Robots," IEEE Transaction on Robotics 26, 5 (2010), 769-780.
Rucker et al., "Statics and Dynamics of Continuum Robots With General Tendon Routing and External Loading," IEEE Trans. Robot., 2011, vol. 27, No. 6, pp. 1033-1044.
Rul et al., "A Novel Tool Using SMA Actuator for cell puncturing," in SICE Annual Conference 2007, 2007, pp. 254-258.
Russo et al., "A Novel Robotic Platform for Laser Assisted Transurethral Surgery of the Prostate," IEEE Trans. Biomed. Eng., vol. 9294, No. c, pp. 1-12, 2014.
Safarik, "Editorial comments to da Vinci-assisted robotic partial nephrectomy: technique and results at a mean of 15 months of follow-up," European urology, 2007, vol. 51, p. 192.
Saito, "Transurethral en bloc resection of bladder tumors," The Journal of Urology 166,6 (Dec. 2001), 2148-50.
Salerno et al., "Design Considerations for a Minimally Invasive High-Throughput Automation System for Radiation Biodosimetry," In IEEE Conference on Automation Science and Engineering, pp. 846-852. Scottsdale, AZ, USA 2007.
Salisbury et al., "Preliminary design of a whole-arm manipulation system (WAMS)," in Proc. IEEE Int. Conf. Robot. Autom., Philadelphia, PA, 1988, pp. 254-260.
Salisbury, Active stiffness control of a manipulator in cartesian coordinates. In 1980 19th IEEE Conference on Decision and Control including the Symposium on Adaptive Processes (1980), pp. 95-100.
Sanchez et al., "New master arm for transurethral resection with a robot," Arch. Españoles Urol., 2002, vol. 55, No. 10, pp. 1247-1250.
Saraf, "Robotic Assisted Microsurgery (RAMS): Application in Plastic Surgery," in Medical Robotics, V. Bozovic, Ed. 2008, pp. 364-376.
Sareh et al., "Bio-inspired tactile sensor sleeve for surgical soft manipulators," in 2014 IEEE International Conference on Robotics and Automation (ICRA), IEEE, 2014, pp. 1454-1459.
Schnider et al., "PADyC: a Synergetic Robot for Cardiac Puncturing," in IEEE International Conference on Robotics and Automation, San Francisco, CA, 2000, pp. 2883-2888.
Scholkopf et al., "New support vector algorithms," Neural Comput., 2000, vol. 12, No. 5, pp. 1207-1245.
Schriber, "Volvo Chooses Spine Robot for Spray Operations," in Robotics Today, 1984, pp. 28.
Schurzig et al., "A force sensing Automated Insertion Tool for cochlear electrode implantation," in IEEE International Conference on Robotics and Automation, 2010, pp. 3674-3679.
Scott et al., "A randomized trial comparing the efficacy and safety of intravitreal triamcinolone with standard care to treat vision loss associated with macular Edema secondary to branch retinal vein occlusion: the Standard Care vs Corticosteroid for Retinal Vein Occlusion (SCORE) study report 6," Arch Ophthalmol, 2009, vol. 127, pp. 1115-1128.
Sears et al., "Inverse Kinematics of Concentric Tube Steerable Needles," 2007, pp. 1887-1892.
Seibold et al., "Prototype of Instrument for Minimally Invasive Surgery with 6-Axis Force Sensing Capability," In Proceedings of the 2005 IEEE International Conference on Robotics and Automation (Barcelona, Spain, 2005), 496-501, Ed., IEEE, pp. 496-501.
Sen et al., "Enabling technologies for natural orifice transluminal endoscopic surgery (N.O.T.E.S) using robotically guided elasticity imaging," In Proceeding of SPIE Medical Imaging 2012, pp. 83161Y1-83161Y8.
Sentis et al., "Compliant Control of Multicontact and Center-of-Mass Behaviors in Humanoid Robots," IEEE Transactions on Robotics 26, 3 (Jun. 2010), 483-501.
Shah et al., "Adventitial sheathotomy for treatment of macular edema associated with branch retinal vein occlusion," Curr Opin Ophthalmol, 2000, vol. 11, pp. 171-174.
Shahinpoor et al., "Ionic Polymer-Metal Composites (IPMC) as biomimetic sensors and actuators," Proc. SPIE's 5th Int'l Symp. on Smart Structures and Materials, 1998, pp. 251-267.
Shamir et al., "Repeatability of redundant manipulators: mathematical solution of the problem," IEEE Trans. Automat. Contr., 1988, vol. 33, No. 11, pp. 1004-1009.
Shamir, "An overview on the global behavior of kinematically redundant robotic manipulators," in Eighteenth Convention of Electrical and Electronics Engineers in Israel, 1995, pp. 2.3.1/1-2.3.1/6.
Shamir, "Remarks on some dynamical problems of controlling redundant manipulators," IEEE Trans. Automat. Contr., 1990, vol. 35, No. 3, pp. 341-344.
Shen et al., "A Robotic-controlled Intraocular OCT Probe," In 2013 The Association for Research in Vision and Ophthalmology Annual Conference (ARVO'2013).
Shen et al., "An intraocular OCT probe," in Association for Research in Vision and Ophthalmology (ARVO) Annual Meeting, 2011.
Shen et al., "Comparison of imaging a retinal mimicking phantom through air and vitreous substitutes with a 25-gauge B-scan OCT endoprobe versus an 18 mm telecentric OCT probe," in Association for Research in Vision and Ophthalmology (ARVO) Annual Meeting, 2014.
Shen et al., "Management of gastric cancer in Asia: Resource-stratified guidelines," The lancet oncology, 2013, vol. 14, No. 12, e535-e547.
Shiakolas et al., "On the Accuracy, Repeatability, and Degree of Influence of Kinematics Parameters for Industrial Robots," Int. J. Model. Simul., 2002, vol. 22, No. 3, 10 pages.
Shiva et al., "Tendon-based stiffening for a pneumatically actuated soft manipulator," IEEE Robotics and Automation Letters, 2016, vol. 1, No. 2, pp. 632-637.
Shoham et al., "Bone-Mounted Miniature Robot for Surgical Procedures: Concept and Clinical Applications," IEEE Transactions on Robotics and Automation, 2003, vol. 19, pp. 893-901.
Shoham et al., "Robot Construction for Surgery," First Israeli Symposium on Computer-Aided Surgery, Medical Robotics, and Medical Imaging (ISRACAS'98), Technion City, Haifa, Israel, 1998.
Siciliano et al., "Robotics: Modelling, Planning, and Control," 2009.
Simaan et al., "A Dexterous System for Laryngeal Surgery—Multi-Backbone Bending Snake-like Slaves for Teleoperated Dexterous Surgical Tool Manipulation." pp. 351-357, 2004.
Simaan et al., "A Dual-Arm Workstation for Intraocular Dexterity-Enhanced Microsurgery of the Eye and In-Organ Dexterity Enhancement and Manipulation of Suspended Organs," 2006.
Simaan et al., "Design and Integration of a Telerobotic System for Minimally Invasive Surgery of the Throat," International Journal of Robotics Research (IJRR) special issue on medical robotics. doi: 10.1177/0278364908104278, vol. 28, No. 9, 1134-1153 , 2009.
Simaan et al., "Design Considerations of New Six Degrees-Of-Freedom Parallel Robots," In IEEE International Conference on Robotics and Automation (ICRA'1998), pp. 1327-1333.

(56) References Cited

OTHER PUBLICATIONS

Simaan et al., "Geometric Interpretation of the Derivatives of Parallel Robot's Jacobian Matrix with Application to Stiffness Control" ASME Journal of Mechanical Design, vol. 125, pp. 33-42., doi: 10.1115/1.1539514, 2003.
Simaan et al., "High Dexterity Snake-like Robotic Slaves for Minimally Invasive Telesurgery of the Upper Airway," MICCAI 2004 (7th International Conference on Medical Image Computing and Computer-Assisted Intervention), pp. 17-24, vol. 2, Saint Malo, France, Sep. 26-30, 2004.
Simaan et al., "Inroads towards a robotically inserted CI electrode development," In 9th European Symposium of Paediatric Cochlear Implantation, 2009.
Simaan et al., "Lessons learned using the insertable robotic effector platform (IREP) for single port access surgery," Journal of Robotic Surgery, Apr. 2013.
Simaan et al., "Minimally Invasive Surgery of the Upper Airways: Addressing the Challenges of Dexterity Enhancement in Confined Spaces," Nova Scien, R. Faust, Ed. 2007, pp. 261-280.
Simaan et al., "Remarks on Hidden Lines in Parallel Robots," 7th International Symposium on Advances in Robot Kinematics (ARK 2000), Piran-Portoroz, Slovenia, 2000.
Simaan et al., "Robot Construction for Surgical Applications," The 1st IFAC Conference on Mechatronic Systems, Darmstadt, Germany, 2000, pp. 553-558.
Simaan et al., "Robotic Study Shows that Insertion Speed Affects cochlear Implant Electrode Insertion Forces," In the 11th International Conference on Cochlear Implants and other Implantable Auditory Technologies, Stockholm, Sweden, Jun. 30-Jul. 3, 2010.
Simaan et al., "Robotic System for Steerable Cochlear Implant Insertion," In 2011 National Congress of the Italian Society of Audiology & Phoniatrics in Bari, Italy 2011.
Simaan et al., "Singularity Analysis of a Class of Composite Serial In-Parallel Robots," IEEE transactions on Robotics and Automation, vol. 17, No. 3, pp. 301-311, doi:10.1109/70.938387 Jun. 2001.
Simaan et al., "Steerable Continuum Robot Design for Cochlear Implant Surgery," In IEEE International Conference on Robotics and Automation Workshop on Snakes, Worms and Catheters: Continuum and Serpentine Robots for Minimally Invasive Surgery, May 3, 2010.
Simaan et al., "Stiffness Synthesis of a Variable Geometry Planar Robot," Advances in Robot Kinematics: Theory and Applications, 2002, pp. 463-472.
Simaan et al., "Stiffness Synthesis of a Variable Geometry Six Degrees-of-Freedom Double Planar Parallel Robot," International Journal of Robotics Research (IJRR), vol. 22, No. 9, pp. 757-775, doi: 10.1177/02783649030229005, Sep. 2003.
Simaan, "Analysis and Synthesis of Parallel Robots for Medical Applications," Master Thesis. Technion-Israel Institute of Technology, Haifa, Israel, 1999.
Simaan, "Design Considerations and Lessons Learned in Developing Systems for Single Port Access Surgery and Natural Orifice Surgery," In 34th international Conference on Engineering in Medicine and Biology Society (mini-symposium on Robotic Single-Port Surgery and Notes). San Diego, Aug. 27-31, 2012.
Simaan, "Snake-Like Units Using Flexible Backbones and Actuation Redundancy for Enhanced Miniaturization," In 2005 IEEE International Conference on Robotics and Automation (Barcelona, Spain, 2005), IEEE, pp. 3023-3028.
Simaan, "Task-Based Design and Synthesis of Variable Geometry Parallel Robots," (2002). Phd Thesis, Technion-Israel Institute of Technology, Haifa, Israel.
Slutsky, "The management of digital nerve injuries," J. Hand Surg. Am., 2014, vol. 39, pp. 1208-1215.
Smiddy et al., "Internal limiting membrane peeling in macular hole surgery," Ophthalmology, 2001, vol. 108(8), pp. 1471-1476.
Smiddy, "Economic Considerations of Macular Edema Therapies," Ophthalmology, 2011, pp. 1827-1833.
Soper et al., "Surface mosaics of the bladder reconstructed from endoscopic video for automated surveillance," IEEE Trans. Biomed. Eng., 2012, vol. 59, No. 6, pp. 1670-1680.
Stetter, "Multivariate Polynomial Equations as Matrix Eigenproblems," Contributions in Numerical Mathematics, World Scientific Series in Applicable Analysis (WSSIAA), 1993, pp. 355-371.
Stewart et al., "World cancer report 2014," World Health Organization, 2014, 630 pages.
Stewart, "A Platform With Six Degrees-of-Freedom," The Institution of Mechanical Engineers, Proceedings 1965-66, 1965, 180(15): 371-386.
Stilli et al., "Shrinkable, stiffness-controllable soft manipulator based on a bio-inspired antagonistic actuation principle," in 2014 IEEE/RSJ International Conference on Intelligent Robots and Systems, IEEE, 2014, pp. 2476-2481.
Sturges et al., "A flexible, tendon-controlled device for endoscopy," 1991, vol. 3, pp. 2582-2591.
Su et al., "A MRI-Guided Concentric Tube Continuum Robot with Piezoelectric Actuation: A Feasibility Study," In 2012 IEEE International Conference on Robotics and Automation, pp. 1939-1945.
Su et al., "Augmented Reality During Robot-assisted Laparoscopic Partial Nephrectomy: Toward Real-Time 3D-CT to Stereoscopic Video Registration," Urology, 2009, vol. 73, pp. 896-900.
Sung et al., "Robotic Laparoscopic Surgery: a Comparison of the DA Vinci and Zeus Systems," Urology, 2001, vol. 58, pp. 893-898.
Suthakorn et al., "A New Inverse Kinematics Algorithm for Binary Manipulators with Many Actuators," Advanced Robotics, 2001, vol. 15, pp. 225-244.
Suzumori et al., "A Miniature Inspection Robot Negotiating Pipes of Widely Varying Diameter," IEEE International Conference on Robotics and Automation, 2003, pp. 2735-2740.
Suzumori et al., "Applying a Flexible Microactuator to Robotic Mechanisms," EEE robotics and Automation Magazine, 1992, vol. I, pp. 21-27.
Suzumori et al., "Development of Flexible Microactuators and Its Applications to Robotic Mechanisms," IEEE International Conference on Robotics and Automation, 1991, pp. 1622-1627.
Suzumori et al., "Flexible Microactuator for Miniature Robots," IEEE International Conference on Robotics and Automation, 1991, pp. 204-209.
Takahashi et al., "The development of an in-pipe microrobot applying the motion of an earthworm," 5th International Symposium on Micro Machine and Human Science, 1994, pp. 35-40.
Tatlicioglu et al., "Dynamic Modelling for Planar Extensible Continuum Robot Manipulators," in Proc. IEEE Int. Conf. Robot. Autom., 2007, pp. 1357-1362.
Taylor et al., "An image-directed robotic system for precise Orthopedic surgery," IEEE Transactions on Robotics and Automation, 1994, vol. 10, pp. 261-275.
Taylor et al., "Steady-hand robotic system for microsurgical augmentation," International Journal of Robotics Research, vol. 18, No. 12, pp. 1201-1210, 1999.
Thorne et al., "Chechlear Fluid Space Dimensions for Six Species Derived From Reconstructions of Three-Dimensional Magnetic Resonance Images," The Laryngeoscope, 1999, vol. 109, pp. 1661-1668.
Tonini et al., "Auditory steady-state response audiometry in profound SNHL: the impact of abnormal middle ear function," Ear Nose Throat J, 2005, vol. 84, pp. 282, 284-286, 288.
Torres et al., Motion Planning for Concentric Tube Robots Using Mechanics-based Models. In 2011 IEEE/RSJ International Conference on Intelligent Robots and Systems (San Francisco, CA, USA, 2011), pp. 5153-5159.
Trejos et al., "Port placement for endoscopic cardiac surgery based on robot dexterity optimization," Barcelona, Spain, 2005, pp. 912-917.
Trivedi et al., "Model-Based Shape Estimation for Soft Robotic Manipulators: The Planar Case," J. Mech. Robot., 2014, vol. 6, No. 2, pp. 021005-1-021005-11.
Tsai et al., "Solving the Kinematics of the Most General Six-and Five-Degrees-ofFreedom Manipulators by Continuation Methods," ASME Transactions on of Mechanisms, Transmissions, and Automation in Design, 1985, vol. 107, pp. 189-200.

(56) References Cited

OTHER PUBLICATIONS

Tsukagoshi et al., "Active hose: an artificial elephant's nose with maneuverability for rescue operation," in Proc. IEEE Int. Conf. Robot. Autom., Seoul, Korea, 2001, pp. 2454-2459.
Tully et al., "Constrained Filtering with Contact Detection Data for the Localization and Registration of Continuum Robots in Flexible Environments," In 2012 IEEE International Conference on Robotics and Automation (St. Paul, MI USA, 2012).
U.S. Office action for U.S. Appl. No. 13/891,389 dated Jan. 2, 2015.
U.S. Office action for U.S. Appl. No. 14/271,418 dated May 20, 2015.
Ueta et al., "Robot-assisted vitreoretinal surgery: development of a prototype and feasibility studies in an animal model," Ophthalmology, 2009, vol. 116, pp. 1538-1543.
Ukai et al., "A new technique for transurethral resection of superficial bladder tumor in 1 piece.," The Journal of Urology 2 163, 3 (2000), 878-879.
Valdastri et al., "Integration of a miniaturised triaxial force sensor in a minimally invasive surgical tool," IEEE transactions on biomedical engineering 53, 11 (Nov. 2006), 2397-400.
Van Den Heuvel et al., "Robotic assistance in microvascular surgery," in Medical Robotics, V. Bozovic, Ed. 2008, pp. 471-480.
Wagner et al., The Benefits of Force Feedback in Surgery: Examination of Blunt Dissection. Presence: Teleoperators and Virtual Environments 16, 3 (2007), 252-262.
Wakahara et al., "A Computer Aided Manipulation System for a Multijoint Inspection Robot," Proceedings of the 32nd Conference on Remote System Technology, 1984, pp. 33-38.
Wakamatsu et al., "Modeling of Linear objects Considering Bend, Twist, and Extensional Deformation," IEEE International Conference on Robotics and Automation, 1995, pp. 433-438.
Wakamatsu et al., "Static Analysis of Deformable Object Grasping Based on Bounded Force Closure," IEEE International Conference on Robotics and Automation, 1996, pp. 3324-3329.
Wakamatsu et al., "Static Modeling of Deformation Based on Differential Geometry," International Journal of Robotics Research, 2004, vol. 23, pp. 293-311.
Walker et al., "A Novel "Elephant's Trunk" Robot," Proceedings of the 1999 IEEE/ASME International Conference on Advanced Intelligent Mechatronics, 1999, pp. 410-415.
Walker et al., "Some Issues in Creating 'Invertebrate' Robots," In the Proceedings of the International Symposium on Adaptive Motion of Animals and Machines, Montreal, Canada, 2000, 6 pages.
Wampler et al., "Numerical Continuation Methods for Solving Polynomial Systems Arising in Kinematics," ASME Journal of Mechanical Design, 1990, vol. 112, pp. 59-68.
Wampler et al., "Manipulator Inverse Kinematic Solutions Based on Vector Formulations and Damped Least-Squares Methods," IEEE Trans. Syst. Man. Cybern., 1986, vol. 16, No. 1, pp. 93-101.
Wampler, "Solving the Kinematics of Planar Mechanisms by Dixon Determinant and a ComplexPlane Formulation," ASME J. of Mechanical Design, 2001, vol. 123, pp. 382-387.
Wang et al., "Conceptual design and dimensional synthesis of MicroHand," Mechanism and Machine Theory, 2008, vol. 43, No. 9, pp. 1186-1197.
Wang et al., "Investigation of Error Propagation in Multi-Backbone Continuum Robots," in Advances in Robot Kinematics, 2014, pp. 385-394.
Wardrop et al., "A temporal bone study of insertion trauma and intracochlear position of cochlear implant electrodes I: comparison of Nucleus banded and Nucleus Contour electrodes," Hearing Research, 2005, vol. 203, pp. 54-67.
Wardrop et al., "A temporal bone study of insertion trauma and intracochlear position of cochlear implant electrodes II: comparison of spiral clariontrade mark and HiFocus Iltrade mark electrodes banded and Nucleus Contour electrodes," Hearing Research, 2005, vol. 203, pp. 68-79.
Watson et al., "In vivo time-serial multi-modality optical imaging in a mouse model of ovarian tumorigenesis," Cancer Biol. Ther., 2014, vol. 15, No. 1, pp. 42-60.
Webster,III et al., "Design and Kinematic Modeling of Constant Curvature Continuum Robots: A Review," The International Journal of Robotics Research (Jun. 2010).
Webster,III et al., "Mechanics of Precurved-Tube Continuum Robots," IEEE Transaction on Robotics 25, 1 (2009), 67-78.
Wei et al., "A compact Two-armed Slave Manipulator for Minimally Invasive Surgery of the Throat," in IEEE RAS/EMBS International Conference on Biomedical Robotics and Biomechatronics, 2006, pp. 769-774.
Wei et al., "A Pilot Study on Using a Flexible Cannula Robot for Micro-Vascular Stenting," In IEEE International Conference on Robotics and Automation Workshop on Snakes, Worms and Catheters: Continuum and Serpentine Robots for Minimally Invasive Surgery, IEEE International Conference on Robotics and 4utomation, May 3, 2010.
Wei et al., "An Intelligent Hand-Held Microsurgical Instrument for Improved Accuracy," In 23rd Annual International Conference of the IEEE Engineering in Medicine and Biology Society (Istanbul, Turkey, 2001), pp. 25-28.
Wei et al., "Design and Dexterity Evaluation for a Dual-Arm Micro-Surgical Robotic System for Orbital Manipulation and Intraocular Dexterity," IEEE Transactions on Robotics, vol. 25, No. 1, pp. 147-157, 2009.
Wei et al., "Design and Theoretical Evaluation of Micro-Surgical Manipulators for Orbital Manipulation and Intraocular Dexterity," in 2007 IEEE International Conference on Robotics and Automation, pp. 3389-3395. Roma, Italy.
Wei et al., "Design of Planar Parallel Robots With Preloaded Flexures for Guaranteed Backlash Prevention," ASME Journal of Mechanisms and Robotics (JMR), doi:10.1115/1.4000522, vol. 2, No. 1, pp. 011012-1 to 011012-10, 2010.
Wei et al., "Enabling Technology for Micro-Vascular Stenting in Ophthalmic Surgery," ASME Journal of Medical Devices (JMED), vol. 4, Issue 1, 014503 (6 pages) doi:10.1115/1.4001193, 2010.
Wei et al., "Modeling, Force Sensing, and Control of Flexible Cannulas for Microstent Delivery," Journal of Dynamic Systems, Measurement, and Control 134, 4 (2012), 041004.
Wei et al., "Performance Evaluation for Multi-Arm Manipulation of Hollow Suspended Organs," IEEE Transactions on Robotics, vol. 25, No. 1, pp. 147-157, doi 10.1109/TRO.2008.2006865, 2009.
Wei, "Design and Implementation of High-Precision Hybrid Robotic Systems with Application for Ophthalmic Micro-Surgery," Phd Thesis, Department of Mechanical Engineering, Columbia University, New York City, NY 2010.
Weichel et al., "Chorioretinectomy for perforating or severe intraocular foreign body injuries," Graefes Arch Clin Exp Ophthalmol., 2010, 248(3):319-30.
Weichel et al., "Traumatic macular holes secondary to combat ocular trauma," Retina, 2009, 29(3):349-54.
Weinstein et al., "Transoral robotic surgery: A multicenter study to assess feasibility, safety, and surgical margins," The Laryngoscope (Jul. 2012), 1-7.
Whitney, "Force Feedback Control of Manipulator Fine Motions," Journal of Dynamic Systems, Measurement, and Control 99, 2 (1977), 91.
Whitney, "Resolved Motion Rate Control of Manipulators and Human Prostheses," IEEE Transaction on Man-Machine Systems MMS-10, 2 (Jun. 1969), 47-53.
Widran, "Video transurethral resection using controlled continuous flow resectoscope," Urology, 1988, 31(5):382-6.
Williams, "Macular holes: the latest in current management," Retina, 2006, vol. 26(6 Suppl), pp. S9-S12.
Wolf et al., "A Mobile Hyper Redundant Mechanism for Search and Rescue Tasks," IEEE/RSJ International Conference on Intelligent Robots and Systems, 2003, pp. 2889-2895.
Wolf et al., "MBARS: Mini bone attached robotic system for joint arthroplasty," Pisa, Italy, 2006, pp. 1053-1058.
Wurdemann et al., "Embedded electro-conductive yarn for shape sensing of soft robotic manipulators," in 2015 37th Annual International Conference of the IEEE Engineering in Medicine and Biology Society (EMBC), IEEE, 2015, pp. 8026-8029.

(56) References Cited

OTHER PUBLICATIONS

Xu et al., "A Pilot Investigation of Continuum Robots as a Design Alternative for Upper Extremity Exoskeletons," In IEEE International Conference on Robotics and Biomimetics (ROBIO'2011), pp. 656-662.
Xu et al., "Actuation Compensation for Flexible Surgical Snake-like Robots with Redundant Remote Actuation," in IEEE International Conference on Robotics and Automation, 2006, pp. 4148-4154.
Xu et al., "An Investigation of the Intrinsic Force Sensing Capabilities of Continuum Robots," IEEE Transactions on Robotics (TRO), vol. 23, No. 3 (Jun. 2008).
Xu et al., "Analytic Formulation for Kinematics, Statics and Shape Restoration of Multibackbone Continuum Robots via Elliptic Integrals," ASME Journal of Mechanisms and Robotics (JMR), vol. 2, pp. 11006-11013, 2010.
Xu et al., "Intrinsic Wrench Estimation and Its Performance Index for Multisegment Continuum Robots," IEEE Transactions on Robotics, vol. 26, No. 3, pp. 555-561, Jun. 2010.
Xu et al., "System Design of an Insertable Robotic Effector Platform for Single Port Access (SPA) Surgery," in IEEE/RSJ International Conference on Intelligent Robots and Systems, 2009, pp. 5546-5552.
Xu, "Design, Modeling and Analysis of Continuum Robots as Surgical Assistants with Intrinsic Sensory Capabilities," Phd Thesis, Columbia University 2009.
Yamamoto et al., "Vitrectomy with or without arteriovenous adventitial sheathotomy for macular edema associated with branch retinal vein occlusion," Am J Ophthalmol, 2004, vol. 138, pp. 907-914.
Yamashita et al., "Handheld Laparoscopic Forceps manipulator Using Multi-slider Linkage Mechanisms," in MICCAI 2004 (7th International Conference on Medical Image Computing and Computer-Assisted Intervention), 2004, pp. 121-128.
Yoo et al., "Three-Dimensional Modeling and Visualization of the Cochlea on the internet," IEEE Transactions on Information Technology in Biomedicine, 2000, vol. 4, pp. 144-151.
Yoon et al., "A 4-dof flexible continuum robot using a spring backbone," in 2009 International Conference on Mechatronics and Automation, Aug. 2009, pp. 1249-1254.
Yoon et al., "Development of an Automated Steering Mechanism for Bladder Urothelium Surveillance," J. Med. Device., 2009, vol. 3, No. 1, p. 011004-1-011004-9.
Yoshikawa, "Force Control of Robot Manipulators," In 2000 IEEE International Conference on Robotics and Automation (San Francisco, CA, USA, 2000), No. Apr., pp. 220-226.
Yu et al., "Design, Calibration and Preliminary Testing of a Robotic Telemanipulator for OCT guided Retinal Surgery," In Accepted for publication in IEEE International Conference on Robotics and Automation (ICRA2013).
Yu et al., "Evaluation of microsurgical tasks with OCT-guided and/or robot-assisted ophthalmic forceps," Biomed. Opt. Express, 2015, vol. 6, No. 2, p. 457-472.
Yun et al., "A novel design and analysis of a 3-DOF parallel manipulator for micro/nano manipulation," in 2008 IEEE Workshop on Advanced robotics and Its Social Impacts, 2008, pp. 1-6.
Zanganeh et al., "The inverse kinematics of hyper-redundant manipulators using splines," Proc. 1995 IEEE Int. Conf. Robot. Autom., 1995, vol. 3, pp. 2797-2802.
Zghal et al., "Efficient gradient projection optimization for manipulators with multiple degrees of redundancy," in Robotics and Automation, 1990. Proceedings., 1990 IEEE International Conference on. IEEE, 1990, pp. 1006-1011.
Zhang et al., "A Pilot Study of Robot-Assisted Cochlear Implant Surgery Using Steerable Electrode Arrays," in International Conference on Medical Image Computing and Computer-Assisted Intervention (MICCAI '06), 2006, pp. 33-40.
Zhang et al., "Inroads towards Robot-Assisted Cochlear Implant Surgery using Steerable Electrode Arrays," Otology & Neurology special issue on Cochlear Implants, doi: 1097/MAO.0b013e3181e7117e, 2010.
Zhang et al., "Model and Parameter Identification of Friction During Robotic Insertion of Cochlear-Implant Electrode Arrays," in IEEE International Conference on Robotics and Automation, 2009, pp. 3859-3864.
International Search Report and Written Opinion for PCT Application No. PCT/US18/50948 dated Nov. 20, 2018 (8 pages).
Zhang et al., "Optimal Path Planning for Robotic Insertion of Steerable Electrode Arrays in Cochlear Implant Surgery," ASME Journal of Medical Devices, vol. 3, No. 1, 2009.
Zhang et al., "Path Planning and Workspace Determination for Robot-Assisted Insertion of Steerable Electrode Arrays for Cochlear Implant Surgery," Med Image Comput Comput Assist Interv. 2008;11(Pt 2):692-700.
Zhang, "Design of Steerable Electrode Arrays and Optimal Insertion Path Planning for Robot-Assisted Cochlear Implant Surgeries," Phd Thesis, Department of Mechanical Engineering, Columbia University, New York City, NY 2010.
Zhang, "Design of Underactuated Steerable Electrode Arrays for Optimal Insertions," J. Mech. Robot., vol. 5, No. 1, p. 011008, Jan. 2013.
Zhang, "Flexible camera calibration by viewing a plane from unknown orientations," Proc. Seventh IEEE Int. Conf. Comput. Vis., vol. 1, 1999, 8 pages.
Zheng et al., "Use of a distal ulnar artery perforator-based bilobed free flap for repairing complex digital defects," J. Hand Surg. Am., 2014, vol. 39, No. 11, pp. 2235-2242.
Zheng et al., Strategies for Automatic Assembly of Deformable Objects, IEEE International Conference on Robotics and Automation, 1991, pp. 2598-2603.
Zhou et al., "Linear Velocity and Acceleration Estimation of 3 DOF Haptic Interface," In IEEE International Workshop on Haptic Audio Visual Environments and their Application (HAVE 2008) (Ottawa, Canada, 2008), pp. 137-142.
Zlatanov et al., "A Unifying Framework for Classification and Interpretation of Mechanism Singularities," ASME J. of Mechanical Design, 1995, vol. 117, pp. 566-572.
Zlatanov et al., "Mechanical Design and Kinematic Analysis of a Three-Legged Six Degree-of-Freedom Parallel Manipulator," Robotics, Spatial Mechanisms, and Mechanical Systems DE, 1992, vol. 45, pp. 529-536.
Chiaverini et al., "Redundancy resolution for the human-arm-like manipulator", Robotics and Autonomous Systems 8, 1991, pp. 239-250.
Conrad et al., "Interleaved Continuum-Rigid Manipulation: An Augmented Approach for Robotic Minimally-Invasive Flexible Catheter-based Procedures", IEEE International Conference on Robotics and Automation, 2013, pp. 718-724.
Costello et al., Anatomical Studies of the neurovascular bundle and cavernosal nerves, BJU International, vol. 94, 2004, pp. 1071-1076.
Kim et al., "Interposition Sural Nerve Grafting During Radical Retropubic Prostatectomy", Urology, vol. 57, 2001, pp. 211-216.
Takenaka et al., "Anatomical Analysis of the Neurovascular Bundle Supplying Penile Cavernous Tissue to Ensure a Reliable Nerve Graft After Radical Prostatectomy", The Journal of Urology, vol. 172, 2004, pp. 1032-1035.
Turk et al., "Sural nerve graft during laparoscopic radical prostatectomy initial experience", Urologic Oncology, vol. 7, 2002, pp. 191-194.

\* cited by examiner

Algorithm 1 Nonlinear LS Estimate

Require: $\mathcal{D}\{(\bar{x}_j, \psi_j, q_{s_j})\}, j=1,...,N; k_{\lambda_0}, (\beta, \eta) > 0$ 1: START Initialize: $k_i \leftarrow k_{\lambda_0}, M_{i-1} \leftarrow 1, M_i \leftarrow 100$ 2: while $\frac{\|M_{\lambda_i} - M_{\lambda_{i-1}}\|}{M_{\lambda_{i-1}}} \geq \beta$ do

3: $\quad M_{\lambda_{i-1}} \leftarrow M_{\lambda_i}, \quad \tilde{c}_\rho = \tilde{c}_\lambda(k_i), \quad M_{\lambda_i} = M_{\lambda_i}(k_i),$ 4: $\quad J_{c_\lambda} = J_{c_\lambda}(k_i)$ 5: $\quad$ Update $k_{i+1}$:

$$k_{i+1} = k_i - H\left(\eta\left(J_{c_\lambda}\right)^+ \tilde{c}_\lambda\right), \eta \in (0, 1]$$

$$\left(J_{c_\lambda}\right)^+ = \left((J_{c_\lambda})^T W J_{c_\lambda}\right)^{-1} (J_{c_\lambda})^T W$$

6: end while

7: $k^* \leftarrow k_i$

Ensure: $k^*$

*FIG. 9*

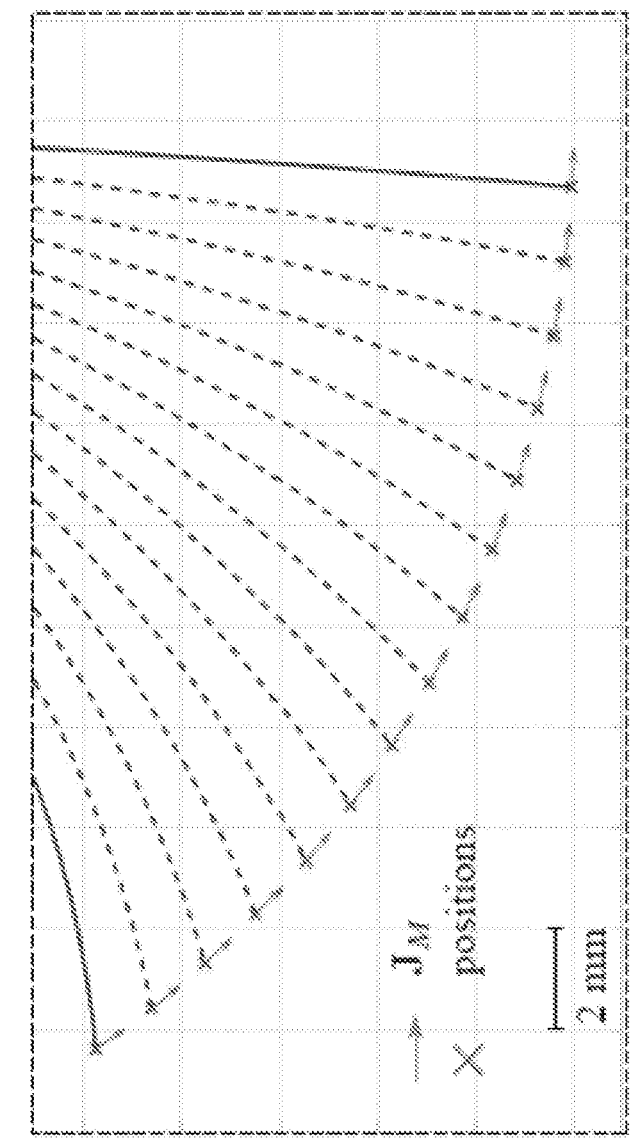
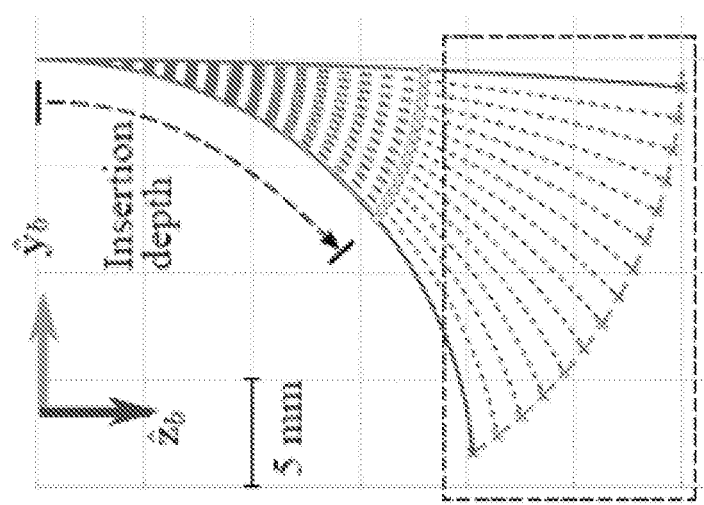
FIG. 11

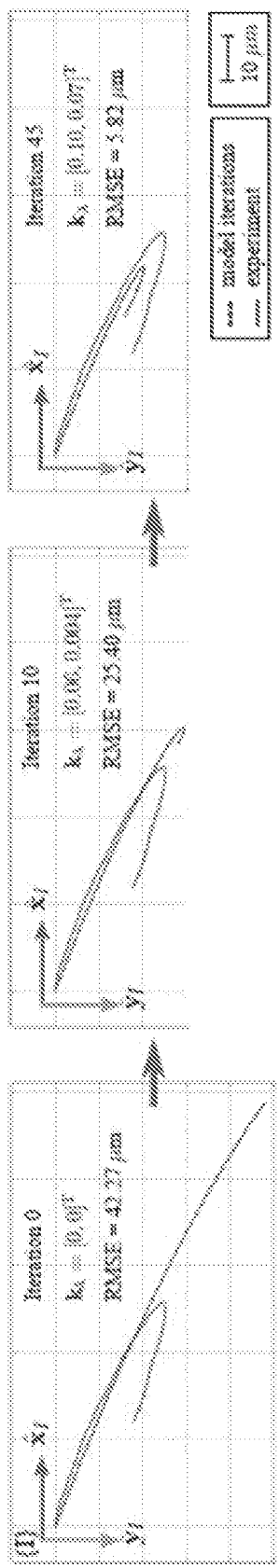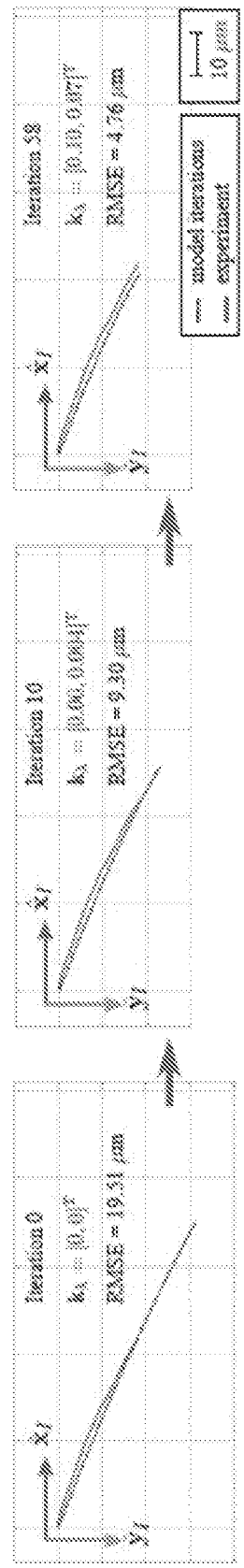
FIG. 15A
FIG. 15B

US 10,967,504 B2

CONTINUUM ROBOTS WITH MULTI-SCALE MOTION THROUGH EQUILIBRIUM MODULATION

RELATED APPLICATIONS

This patent application is the U.S. national stage entry, under 35 U.S.C. § 371, of International Application Number PCT/US2018/050948 filed Sep. 13, 2018, which claims priority to U.S. Provisional Application No. 62/557,969, filed Sep. 13, 2017, entitled "CONTINUUM ROBOTS WITH MULTI-SCALE MOTION THROUGH EQUILIBRIUM MODULATION," the entire contents of each of which are hereby incorporated by reference.

STATEMENT REGARDING FEDERALLY SPONSORED RESEARCH OR DEVELOPMENT

This invention was made with government support under grant CMMI-1537659 from the National Science Foundation (NSF). The government has certain rights in the invention.

BACKGROUND

The present invention relates to systems and methods for controlling the movement and positioning of a robotic device. In some particular implementations, the present invention relates to systems and methods for controlling the movement and positioning of a bending robotic device such as, for example, a continuum robot.

SUMMARY

In one embodiment, the invention provides a robotic system that includes at least one hollow tube backbone and an equilibrium modulation wire at least partially positioned within the backbone. The robotic system is configured to adjust a position of an end effector by bending the hollow tube and to further adjust the position of the robotic device by adjusting a linear insertion position of the equilibrium modulation wire inside the hollow tube, wherein adjusting the linear insertion position of the equilibrium modulation wire changes a flexural rigidity of the hollow tube resulting in a change in the resulting bending angle of the robotic device.

In other embodiments, the invention provides a robotic system configured to adjust a position of a robotic device by bending a backbone structure of a dexterous arm of the robotic device and to further adjust the position of the robotic device by adjusting a linear insertion position of an equilibrium modulation wire. The equilibrium modulation wire is coupled to the backbone structure of the dexterous arm at least partially along a length of the backbone structure such that adjusting the linear insertion position of the equilibrium modulation wire changes the flexural rigidity along the length of the backbone structure resulting in a change in the resulting bending angle of the robotic device. In some embodiments, the equilibrium modulation wire is coupled to the backbone structure by positioning the equilibrium modulation wire at least partially within an internal channel of the backbone structure. In other embodiments, the equilibrium modulation wire is coupled to the backbone structure by slidably constraining the equilibrium modulation wire along a side of the backbone structure.

In another embodiments, the invention provides a continuum robot system including a plurality of segments, each segment including an end disk, a base disk, a central backbone fixedly attached to the end disk, and a plurality of secondary backbones fixedly attached to the end disk. A bending angle and a bending plane of a first segment is controlled by adjusting a set of linear forces applied to the secondary backbones of the first segment and further modulated by adjusting an internal stored energy of at least one of the secondary backbones that causes a change in the flexural rigidity of the secondary backbone resulting in a change in the resulting bending angle of the first segment achieved by the set of linear forces applied to the secondary backbones of the first segment. In some embodiments, the central backbone is also fixedly attached to the base disk of the segment while, in other embodiments, the central backbone is slidably coupled to the base disk.

Other aspects of the invention will become apparent by consideration of the detailed description and accompanying drawings.

BRIEF DESCRIPTION OF THE DRAWINGS

FIG. 9 is a flowchart of an algorithm for a nonlinear LS estimation.

FIG. 11 is a graph illustrating a macro motion simulation and the micro motnio Jacobian computed during the simulation.

FIG. 15A is a series of graphs illustrating experimental data and model iterations during parameter estimation for iterations of calibration that use full micro motion trajectory.

FIG. 15B is a series of graphs illustrating experimental data and model iterations during parameter estimation for iterations of calibration that use partial micro motion trajectory.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
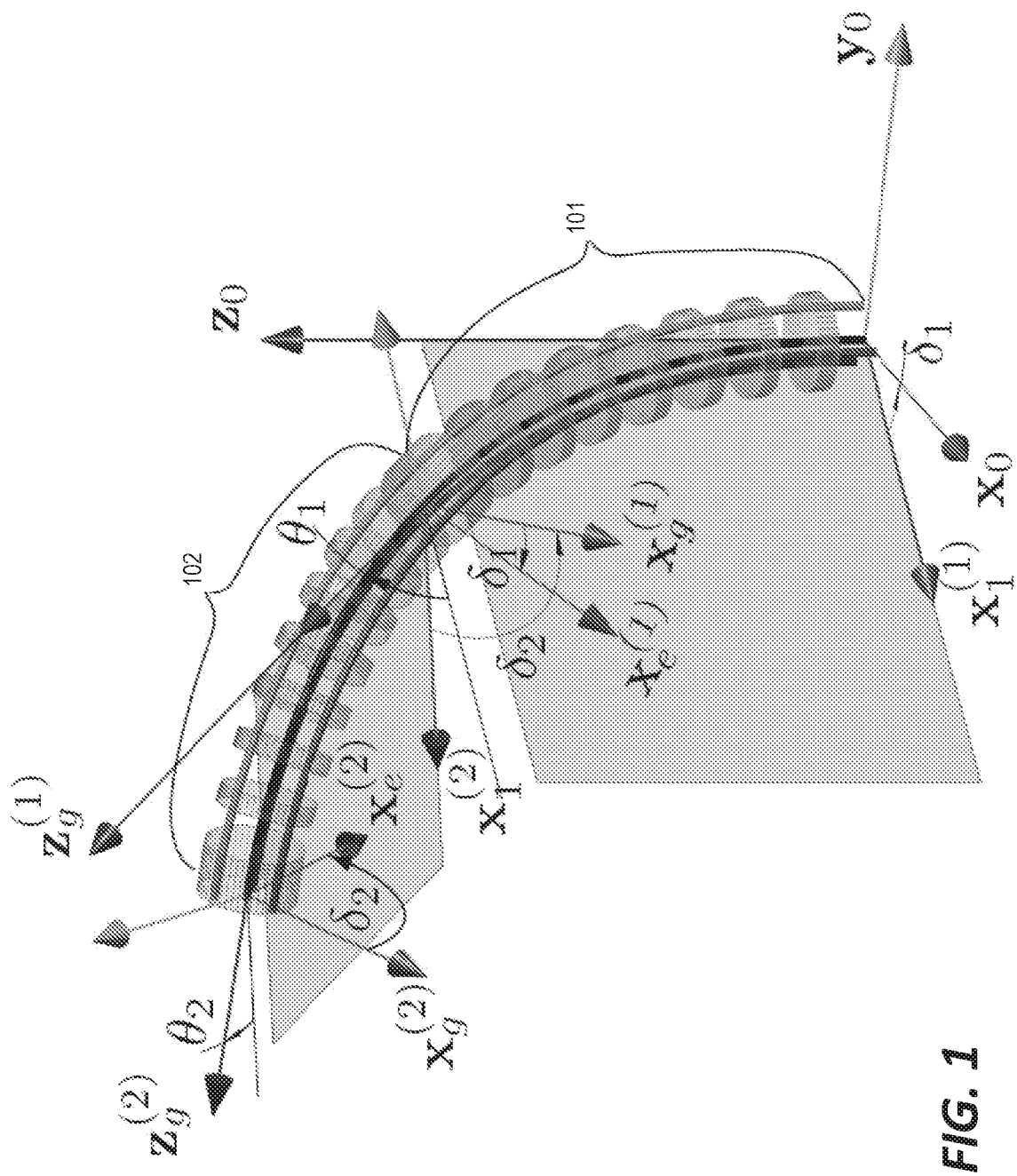
FIG. 1 is a perspective view of a two-segment continuum robot according to one embodiment.

FIG. 1 illustrates an example of a continuum robot that includes a controllably bendable, snake-like body. The pose and position of the snake-like body of the continuum robot is controllably adjusted, for example, to position and operate a working tool mounted on the distal end of the snake-like body and can be controlled to reach target locations inside a cavity. For example, in surgical robot systems, a continuum robot may be used to move a working tool through a body cavity, orifice, or incision to a target site and to perform a surgical procedure at the target site. For example, a gripper, a camera-system, or, as described in further detail below, an optical coherence tomography (OCT) probe may be coupled to the distal end of the continuum robot's snake-like body for use in a medical procedure.

Examples of continuum robots and systems and methods for the control and operation of a continuum robot are described in detail in U.S. Publication No. 2014/0316434 to Simaan et al. and U.S. Publication No. 2014/0330432 to Simaan et al., the entire contents of which are incorporated herein by reference.

FIG. 1 shows an example of a continuum robot with multiple controllable segments. Although the example of FIG. 1 shows only two segments of a continuum robot (segment 101 and segment 102), a continuum robot can be implemented with any number of segments. The bending of each segment is controlled by a plurality of secondary backbones which control the bending angle of the segment and the plane in which the segment bends.

Figure 2:
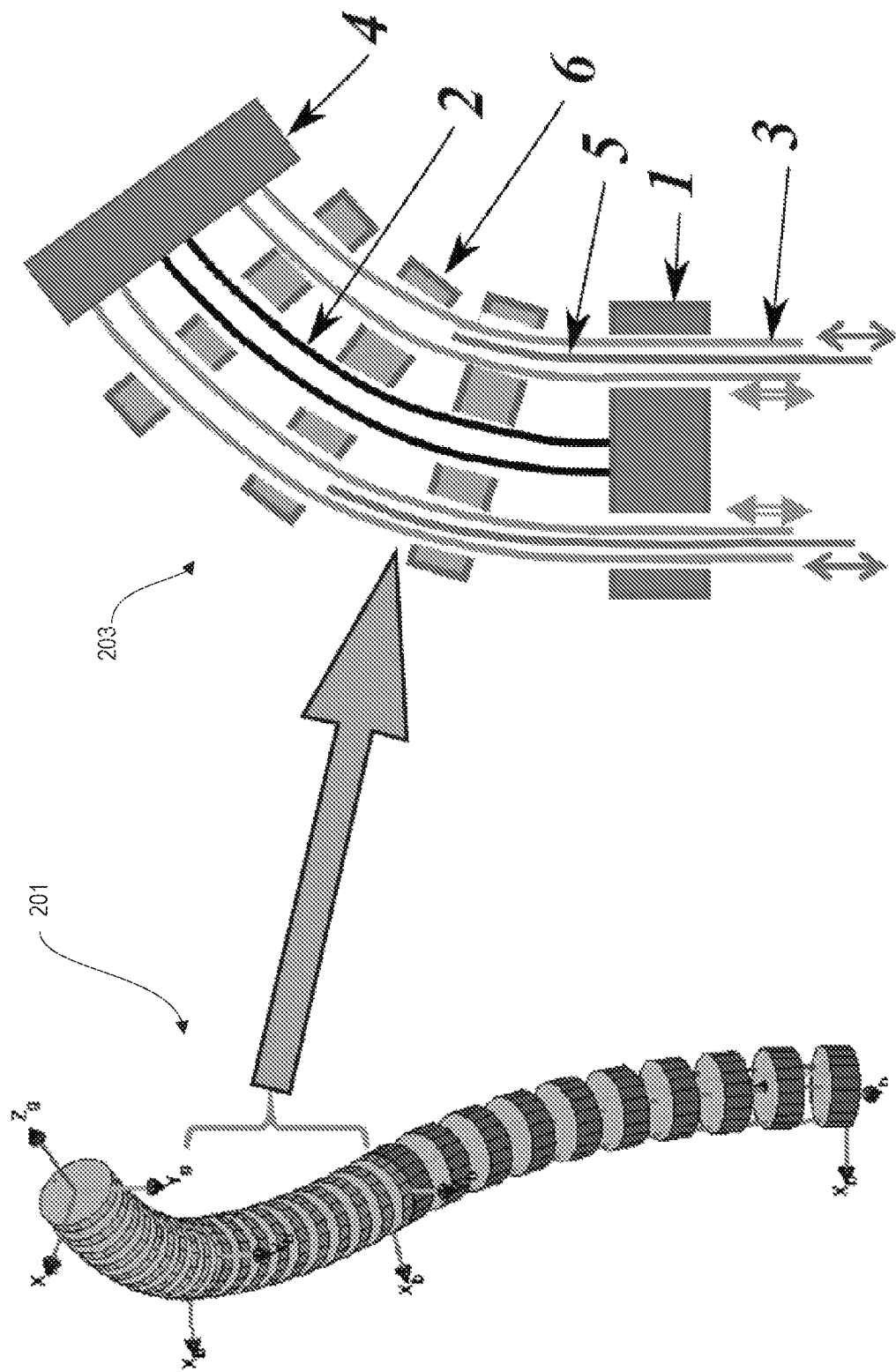
FIG. 2 is another perspective view of a three segment continuum robot of similar design as in FIG. 1 with a cross-sectional detailed view inset illustrating the macro- and micro-scale motion control mechanisms.

FIG. 2 illustrates the structure and control mechanism of the continuum robot 201 in further detail. As shown in the inset in FIG. 2, each individual segment 203 of the continuum robot 201 includes a base disk 1, a central backbone 2, a plurality of secondary backbones 3, an end disk 4, an equilibrium modulation wire 5 for each secondary backbone, and a plurality of spacer disks 6. The ends of the central backbone 2 are affixed to the base disk 1 and the end disk 4, respectively. In some implementations, the base disk 1 of one segment also serves as the end disk 4 of an adjacent segment. Furthermore, in some implementations, a single central backbone 2 runs through the entire length of the continuum robot 201 with a plurality of end disks/base disks affixed at locations along the central backbone 2. In some implementations, the spacer disks 6 are also fixed to locations along the central backbone 2.

Although, in the perspective of the inset illustrated in FIG. 2, only two secondary backbones 3 are visible, the example of FIG. 2 includes three secondary backbones 3 for each segment and other implementations may include more or fewer secondary backbones in each segment. The distal end of each secondary backbone 3 for the segment is affixed to the end disk 4 for that segment, but is not affixed to the spacer disks 6 or the base disk 1. Accordingly, the bending angle and the bending plane of the segment can be controlled by coordinated linear movement of the secondary backbones 3 for the segment. As shown in the inset of FIG. 2, when the secondary backbone 3 on the right side is pulled toward the proximal end of the continuum robot and the secondary backbone 3 on the left side is pushed toward the distal end of the continuum robot, the segment 203 bends to the right. By pulling and pushing on the secondary backbones, the continuum robot segment can be controllably bent to orient the end disk in two degrees of freedom. In this example, the central backbone 2 and all of the secondary backbones 3 are constructed of superelastic nickel titanium (NiTi) and the base disk and spacer disk maintain a constant spacing distance between the central backbone 2 and the secondary backbones 3.

In the example of FIG. 2, each secondary backbone 3 is formed as a hollow tube with an equilibrium modulation wire 5 positioned inside each secondary backbone 3. The equilibrium modulation wire 5 in this example is also constructed of superelastic NiTi and are controlled to slide inside the tubular secondary backbones 3. By changing the inserted length of these equilibrium wires 5, the distribution of flexural rigidity along the length of the continuum robot segment is altered—thereby resulting in indirect actuation of the end effector by a resulting change in its static equilibrium pose.

Figure 3B:
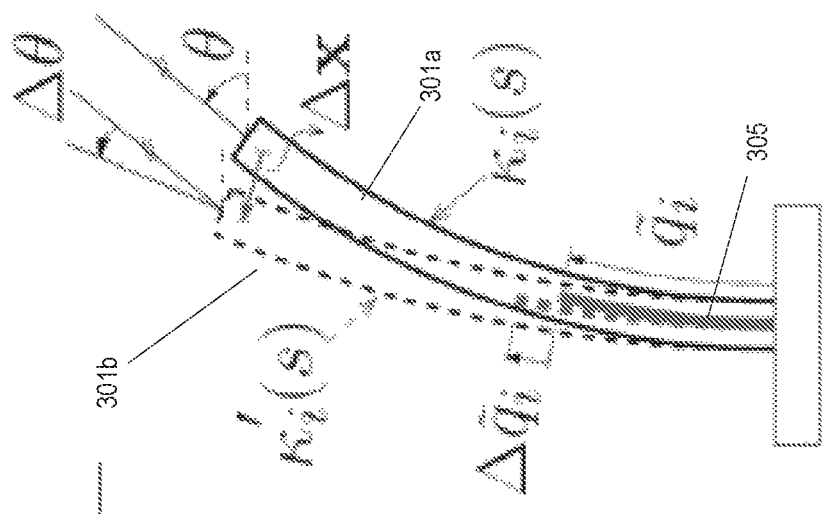
FIG. 3B is a detailed schematic view of the effect of equilibrium modulation in movement control of one secondary backbone of the continuum robot of FIG. 3A.
Figure 3A:
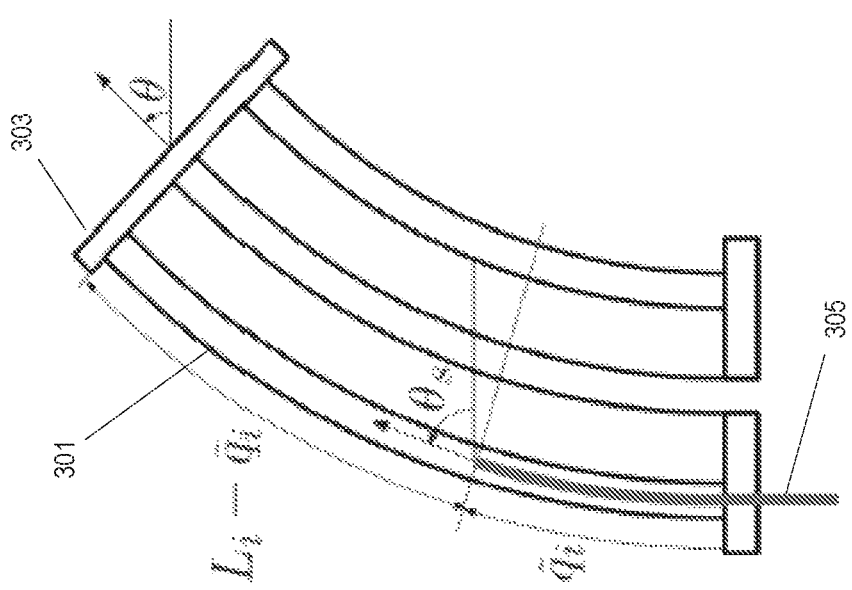
FIG. 3A is a schematic view of the continuum robot of FIG. 2 showing equilibrium modulation according to one embodiment.

FIGS. 1, 3A, and 3B further illustrate and explain how rigidity and equilibrium of the backbones affects the pose and control of the continuum robot. As discussed above, the bending of each segment of the continuum robot is controlled by a plurality of secondary backbones as described further below. For each segment, two angles $\theta$ and $\delta$ characterize the bending angle and the plane in which the segment bends. The vector $\Psi=[\theta, \delta]^T$ is used to designate the configuration of the segment. The pose (position orientation) of the end effector is represented by the vector x.

In the following sections we will use $q \in R^n$ to designate the active joint values responsible for macro motion control. The vector $\tilde{q} \in R^p$ is used to designate the micro-motion joint values responsible for equilibrium modulation. The mechanical energy of the continuum segment is given predominantly by its elastic energy because gravitational energy effects are negligible for small robots of the size in this example. Assuming n backbones in a continuum segment and using index i=0 to refer to its central backbone, the elastic potential energy is given by:

$$u = \tfrac{1}{2}\Sigma_{i=0}^n \int_0^{L_i} E_i I_i K_i(s)^2 ds \qquad (1)$$

where $K_i$, $E_i$, $I_i$, and $L_i$ designate curvature, Young's modulus, bending moment of inertia, and the length of the i'th backbone, respectively. The variable s stand for the arc-length parameters $s \in [0, L_i]$. We also note that the length of the i'th secondary backbones is given as a function of the joint variables $L_i = L_0 + q$, $i \in [1, n]$.

The shape of the continuum segment is given by $k_o(s)$ since the shapes of the secondary backbones as given by $k_i(s)$, $i \in [1, n]$ are geometrically constrained to obey constant distance from the primary backbone. This shape is given as a solution to a variational problem minimizing the total elastic energy of the segment. In general, this shape is very close to circular (i.e., $k_0$ is approximately constant). An exact shape can be obtained using an elliptic-integral constrained optimization formulation.

The macro-motion direct kinematics (DK) of the robot illustrates in the examples of FIGS. 1 through 3B relates the active joint values with the corresponding end effector pose according to the equation:

$$x = f(\psi(q)) \qquad (2)$$

The instantaneous direct kinematics (IDK) relates the macro motion joint speeds with end effector twist according to the equation:

$$\dot{x} = g(\dot{\psi}(q, \dot{q})) \qquad (3)$$

In both cases the transition from joint space to task space variables is achieved by using the configuration space coordinates $\psi$ and the configuration space speeds $\dot{\psi}$. Specifically, two Jacobian matrices are calculated in closed-form such that:

$$\dot{x} = J_{x\psi}\dot{\psi} \qquad (4)$$

$$\dot{q} = J_{q\psi}\dot{\psi} \qquad (5)$$

In macro actuation mode, the macro-motion actuator control q while the micro-motion actuators maintain $\tilde{q}$ fixed. For a given value of $\tilde{q}$ the minimum energy bending shape of the continuum segment is given by minimizing the following equation:

$$u = \frac{1}{2} [\Sigma_{i=0}^n \int_0^{L_0+q_i} E_i I_i K_i(s_i) ds_i + \Sigma_{i=0}^n \int_0^{\tilde{q}_i} \tilde{E}_i \tilde{I}_i \tilde{K}_i(s_i)^2 ds_i] \qquad (6)$$

where $k_i(s)$ designates the local curvature of the i'th backbone of the bent segment, $E_i$, $I_i$, and $\tilde{E}_i$, $\tilde{I}_i$ are the Young's moduli and bending moments of inertia of the outer tube (macro-motion backbone) and the equivalent Young's modulus of the $\tilde{n}$ micro-motion backbones in the portions where they overlap $(s_i = 0 \ldots \tilde{q}_i)$.

To solve the problem of finding the equilibrium shape we will initialize our solution using the circular shape determined by the nominal solution of the inverse kinematics mapping. In addition, the solution must satisfy geometric and static equilibrium constraints leading to a constrained nonlinear minimization formulation:

$$\text{minimize } u = \frac{1}{2}[\Sigma_{i=0}^n \int_0^{L_0+q_i} E_i I_i K_i(s_i) ds_i + \Sigma_{i=0}^n \int_0^{\tilde{q}_i} \tilde{E}_i \tilde{I}_i K_i (s_i)^2 ds_i] \qquad (7)$$

Subject to: $g(k) = 0$, where $k = [k_1, \ldots k_n]^T$.

where the constraint $g(k)$ is the boundary constraints specific to the robot architecture and materials. A constrained non-linear minimization algorithm can be used to find the approximate solution for $k(s)$. The Augmented Lagrangian method or Active Set sequential programming method might also be used for the numerical solution by assuming a modal representation of $k(s)$ such that:

$$K_i(s_i) = \begin{cases} \tilde{c}_i^T \eta(s_i) & \text{for } s_i \leq \tilde{q}_i \\ c_i^T \eta(s_i) & \text{for } \tilde{q}_i \leq s_i \leq L_i \end{cases} \qquad (8)$$

The outcome optimization algorithm will result in the modal coefficients $\tilde{c}_i$ and $c_i$ which define the curvature $k_i(s_i)$. Given the curvature $k_i(s_i)$, we will use differential geometry to define the Jacobians which will be used for resolved rates control according to equations (4) and (5) above.

In micro-motion control mode, the macro-motion joints q are locked while the micro-motion joints $\tilde{q}$ are used to change the elastic energy and thereby change the equilibrium pose of the robot. Equation (6) shows that $u = u(q, \tilde{q})$. The complete differential u becomes:

$$du = (\nabla_q u)^T dq + (\nabla_{\tilde{q}} u)^T d\tilde{q} = (\nabla_{\tilde{q}} u)^T d\tilde{q} \qquad (9)$$

Equation (9) shows that, in micro motion mode, the change in elastic energy depends on the gradient of the energy with respect to the micro-motion degrees of freedom.

To capture the change in the shape of the backbones when $\tilde{q}$ is changed, we use the modal representation in equation (8) and we express the unknown coefficients $c_i$ and $\tilde{c}_i$ as a function of $\tilde{q}$ using the modal representation $c_i = \Lambda \Phi(\tilde{q})$ where $\Lambda \in \mathbb{R}^{x \times y}$ and $\Phi(\tilde{q}) \in \mathbb{R}^y$. This representation results in expressing the curvature as:

$$K_i(s_i) = \begin{cases} \tilde{\Phi}^T \tilde{\Lambda}_i^T \eta(s_i) & \text{for } s \leq \tilde{q}_i \\ \Phi^T \Lambda_i^T \eta(s_i) & \text{for } \tilde{q}_i \leq s \leq L_i \end{cases} \qquad (10)$$

The solution to the constrained energy minimization problem will give the modal coefficients $\Lambda_i$ and $k_i(s_i)$. Given the curvature $k_i(s_i)$, the Jacobians that define the micro-motion kinematics can be defined using differential geometry.

To summarize, the degree of bending of the segment caused by linear movement is related to the rigidity of the central backbone, the secondary backbones, and the equilibrium modulation wires positioned inside the secondary backbones. As illustrated in FIG. 3A, when forces are applied to the secondary backbones 301, the segment and its corresponding end disk 303 bend until reaching an equilibrium position under the given set of applied forces. However, the degree to which the equilibrium modulation wire 305 is inserted and/or withdrawn from the secondary backbone affects the rigidity of the secondary backbone and, accordingly, the equilibrium pose of the segment. As illustrated in FIG. 3B, as the equilibrium modulation wire 305 is inserted or withdrawn into the secondary backbone 301, the equilibrium pose for the segment under the same set of applied forces will also change.

In the example of FIG. 3B, when the equilibrium modulation wire 305 is inserted into the secondary backbone at a depth indicated by the solid line, the applied forces cause the secondary backbone to be positioned at a first equilibrium pose 301a. However, as the equilibrium modulation wire is further inserted into the secondary backbone (as indicated by the dotted line), the rigidity of the secondary backbone increases causing the secondary backbone (and the segment of the continuum robot) to move from the first equilibrium pose 301a to a second equilibrium pose 301b.

Accordingly, in some implementations, macro-motion control is used as a primary mechanism for adjusting the pose of the continuum robot and/or an individual continuum robot segment by applying a linear force to push and/or pull the secondary backbones of a given segment. However, macro-motion control is limited in terms of resolution and precision. Therefore, micro-motion control is used to adjust the rigidity of one or more of the secondary backbones by advancing/retracting the equilibrium modulation wires causing the segment of the continuum robot to move from a first equilibrium pose into a second equilibrium pose. By adjusting the rigidity and the equilibrium of the continuum robot segment, the micro-motion control provides for fine tuning adjustments and control of the continuum robot and an increased level of position control and resolution for the continuum robot. Furthermore, just as the forces applied to the secondary backbones during macro-scale motion control are adjusted in coordination to achieve a target bending angle and bending plane for the segment, the linear positions of the equilibrium modulation wires in each of the secondary backbones are also controlled and adjusted in coordination to achieve a target bending angle adjustment and bending plane adjustment under micro-motion control.

Figure 4:
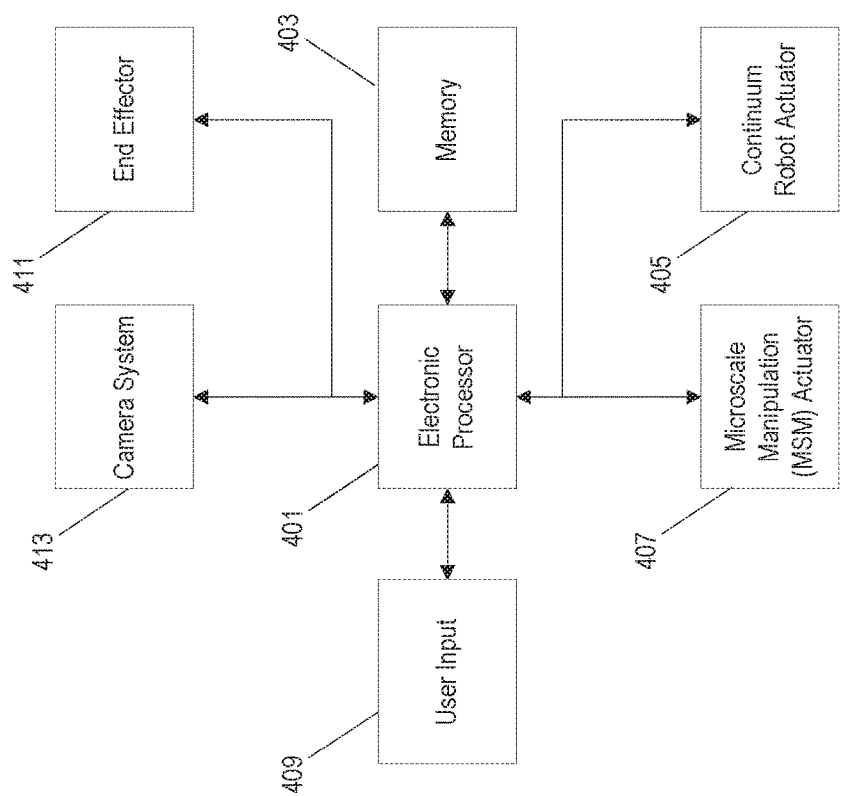
FIG. 4 is a block diagram of a control system for the continuum robot of FIG. 2 according to one embodiment.

FIG. 4 illustrates an example of a control system for implementing the macro/micro motion and pose control described above. The control system includes an electronic processor 401 and a memory 403 storing data and instructions that are executed by the electronic processor 401 to control the operation of the control system. The electronic processor 401 is also communicatively coupled to a continuum robot actuator 405 (i.e., the macro-scale motion actuator), a microscale manipulation (MSM) actuator 407, a user input control 409, an end effector 411, and, in some implementations, a camera system 413.

The macro-scale motion actuator 405 includes a plurality of linear slide actuators that each apply a linear force to a respective one of the secondary backbones based on an output instruction/signal from the electronic processor 401. The micro-scale manipulation actuator 407 also includes a series of linear slide actuators that are each coupled to a respective one of the equilibrium modulation wires based on an output instruction/signal from the electronic processor 401. The electronic processor 401 is configured to generate the output instruction/signals to the macro-scale motion actuator 405 and to the micro-scale manipulation actuator 407 based in part on a user adjustment of the user input control 409 (e.g., a joystick or other input device).

As discussed above, the continuum robot can be equipped with a working tool at its distal end. Accordingly, the end-effector 411 can include, for example, a gripper, a laser device, or an imaging device such as an OCT probe. In some implementations, the continuum robot may be equipped with a camera system positioned at its distal end in addition to or instead of an end-effector 411/working tool.

Figure 5:
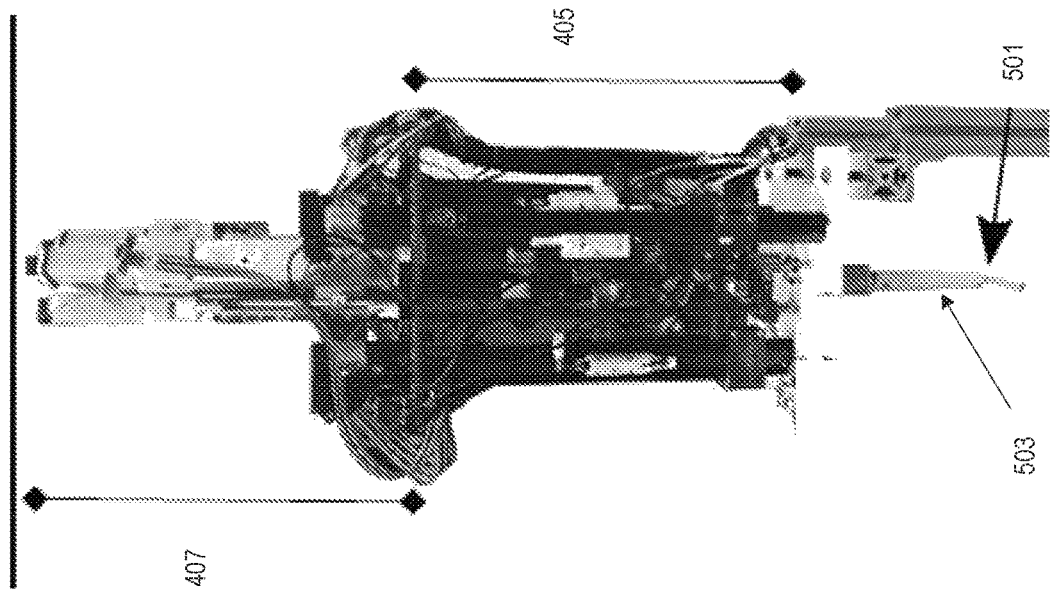
FIG. 5 is an elevation view of a continuum robot and an actuator system for the continuum robot utilizing the control system of FIG. 4.

FIG. 5 illustrates an example of a continuum robot 501 equipped with the actuators and control system of FIG. 4. The continuum robot 501 is shown extending from an endoscope 503. The macro-scale motion actuator 405 is coupled to the continuum robot at the proximal end of the endoscope 503. The micro-scale manipulation actuator 407 is positioned on the opposite end of the macro-scale motion actuator 405 and, accordingly, is configured to retract or extend the equilibrium modulation wires into the secondary backbones of the continuum robot 501 through the macro-scale motion actuator 405, which is configured to adjust the linear forces applied to the secondary backbones.

In this example, the micro-scale manipulation actuator 407 includes three automated linear slides. The linear slides in this example are VELMEX A1506B-S 1.5 linear slides equipped with a 4.5" 20 turns/inch travel lead screw and are driven by a Maxon Motor RE16 4.5 W equipped with planetary gearhead GP16A 19:1 and an MR encoder with 256 counts per turn.

Figure 6:
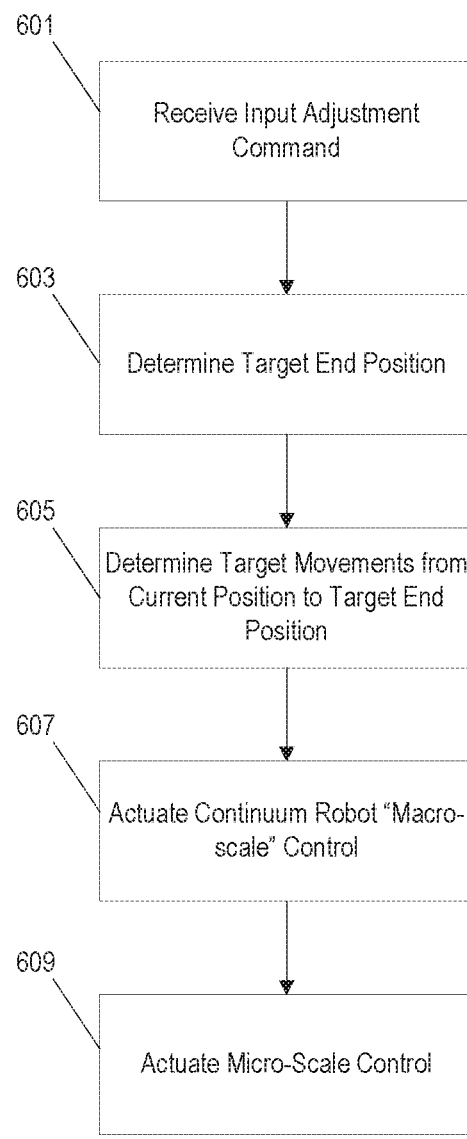
FIG. 6 is a flowchart of a method for adjusting the position and controlling movement of a continuum robot using macro-scale and micro-scale movement control.

FIG. 6 illustrates an example of a method implemented by the control system of FIG. 4 for controllably adjusting the pose and motion of the continuum robot of FIG. 2. The electronic processor 401 monitors an input signal from a user control 409 indicative of an input adjustment command (step 601). In response to receiving an input adjustment command, the control system determines a target end pose for the continuum robot based on the current pose of the continuum robot and the input adjustment command (step 603). The control system then determines target movements for the continuum robot to move from its current position to the target end position (step 605). In some implementations, this includes determining a range of fine-tuning adjustments of the pose that can be achieved by micro-scale manipulation (i.e., further inserting or retracting the equilibrium modulation wires). The system then determines a target pose for the continuum robot that can be achieved with macro-scale control and that is within the determined range of fine-tuning available through micro-scale manipulation. The system then determines (1) the linear movements of the secondary backbones that will cause the segment of the continuum robot to move into the target macro-scale pose and (2) the linear position of the equilibrium modulation wires that would then cause the segment of the continuum robot to move from its "macro-scale" target into its final target pose.

After the position adjustments for the secondary backbones and the linear position adjustments for the equilibrium modulation wires are determined, the electronic processor 401 actuates the macro-scale motion control of the continuum robot by causing the macro-scale motion actuator 405 to apply the determined set of forces to the secondary backbones (step 607). Once the macro-scale adjustment is complete, the electronic processor 401 actuates the micro-scale motion control by causing the micro-scale manipulation actuator 407 to adjust the linear positions of the equilibrium modulation wires (step 609).

In the example of FIG. 6, macro-scale control and micro-scale control are performed as two separate steps (first, macro-motion control and then micro-motion control only after the macro-scale adjustment). However, in other implementations, the control system may be configured to concurrently adjust the forces applied to the secondary backbones and the linear positioning of the equilibrium modulation wires.

In some implementations, the system is configured to move adjust the pose of the continuum robot using macro-scale motion control until the system determines that the pose of the continuum robot is close enough to the target pose that the target pose can be achieved by micro-scale control. In some such implementations, this check is performed between step 607 and step 609 in the example of FIG. 6.

In still other implementations, the control system may be configured to perform the micro-scale motion control based on feedback after the macro-scale motion adjustment is performed. For example, instead of determining target adjustments to the linear position of the equilibrium modulation wires before applied the macro-scale adjustment, the control system may be configured to first apply the macro-scale motion adjustment and then determine an error between the macro-scale adjusted pose and the actual target pose (using, for example, feedback from a camera system 413 or other position sensors). The control system would be configured to then further adjust the pose of the continuum robot using micro-scale control based on the determined position error until the error is reduced to below a defined acceptable threshold. In some implementations, the system is configured to use data collected by one or more sensors coupled to the distal end of the continuum robot for the feedback mechanism including, for example, image data from an OCT probe or other vision/camera sensor.

Finally, although the examples discussed above include equilibrium modulation wires in each of the secondary backbones, other implementations may include more or fewer equilibrium modulation wires. For example, a system that includes 6 secondary backbones for each segment may only include equilibrium modulation wires in three of the six secondary backbones. Conversely, some implementations may be configured to include an equilibrium modulation wire in the central backbone to adjust the rigidity of the continuum robot in addition to or instead of the equilibrium modulation wires in the secondary backbones.

Furthermore, although the examples described above achieve micro-scale motion control through equilibrium modulation by adjusting a linear position of an equilibrium modulation wire within an internal channel of a backbone structure, other mechanisms can be implemented to attain equilibrium modulation by adjusting the stored energy of the system in other implementations. For example, in some implementations, the equilibrium modulation wire can be slidably coupled to the side of a backbone and moved linearly to adjust the flexure rigidity. In other implementations, the system may be configured to apply thermal energy (e.g., heat) to the backbone structure to adjust its rigidity and the resulting equilibrium position. In still other implementations, the system may be configured to adjust a pressure of a fluid or gaseous medium within an internal chamber along the length of the backbone structure to adjust its rigidity and the resulting equilibrium position.

As discussed above, a continuum robot with macro/micro scale motion control can be integrated into a medical imaging system such as, for example, an OCT system. For example, a B-mode OCT probe may be coupled to the distal end of the continuum robot's "snake-like" body. For example, an OCT probe may be constructed with an outer diameter of 0.66 mm and configured to fit through the central backbone of the continuum robot. The OCT system may also include, for example, a spectral-domain optical coherence tomography system (e.g., a 870 nm system by Bioptigen, Inc., Morrisville, N.C.) coupled to the OCT probe and used to generate a synchronization signal, for image acquisition, and for generation of the B-mode images.

In some B-mode OCT systems, the probe is configured to perform lateral scanning by pivoting a mirror. However, lateral scanning can be performed without a pivoting mirror by instead using an OCT probe coupled to the distal end of a continuum robot with macro/micro scale motion control as described above. For example, lateral scanning for OCT can be achieved with sufficient speed and positioning control by bending a segment (e.g., the distal segment) of the continuum robot using macro-scale control and then adjusting the bend angle while capturing data with the OCT probe by adjusting the linear position of the equilibrium modulation wire(s). As discussed above, the change in equilibrium will cause small, precision-controlled movements of the distal end of the continuum robot that are suitable for OCT scanning.

In some implementations, the system may be configured to provide back-and-forth reciprocating movements of the distal end of the continuum robot (e.g., for OCT image data capture or other procedures using other end effectors/working tools) by alternatingly inserting and withdrawing one or more of the equilibrium modulation wires between two defined linear positions.

The examples described above present the concept of continuum robot equilibrium modulation (CREM) and provide a visual measurement solution to observe macro-motion. The examples below outline a modeling approach that can explain the experimental observations and that can be used for control and identification purposes. These examples present a simplified kinematic modeling framework that captures the micro-motion achieved by the equilibrium modulation of continuum robots and develop a calibration approach to capture the model parameters. The concept of "moment coupling effect" is presented as a simplified approach to describe the equilibrium modulation behavior and, therefore, both direct kinematics and instantaneous kinematics are formulated for control purposes. To account for errors potentially caused by the simplistic modeling assumptions, a modeling uncertainty term is introduced, and the identification Jacobian along with a calibration framework to capture the parameterization is developed. Using the multi-backbone continuum robot design as a validation platform, we validate the kinematic model and model calibration experimentally while augmenting these results with additional simulation validations.

This section presents the bending shape equilibrium modeling in the case where the Equilibrium Modulation Backbone (EMB) insertion is at a given depth $q_s$. When the EMBs are not inserted and for proper design parameters (e.g. small spacing between the spacer disks) the continuum segment bends in a constant curvature. We use this assumption to create a simplistic equilibrium model which lends itself to fast realtime computation. Since we have to account for modeling uncertainties due to friction and material parameter uncertainties, we later lump the error of the simplified model in an uncertainty term $\lambda$ that will be used to produce an updated CREM model.

Figure 7B:
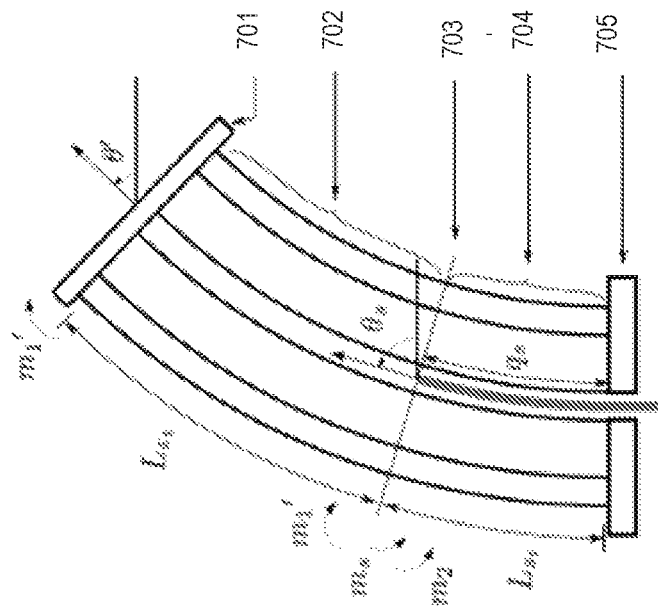
FIG. 7B is a schematic diagram of the bent snake segment of FIG. 7A with the equilibrium modulating wire inserted to a depth $q_s$.
Figure 7A:
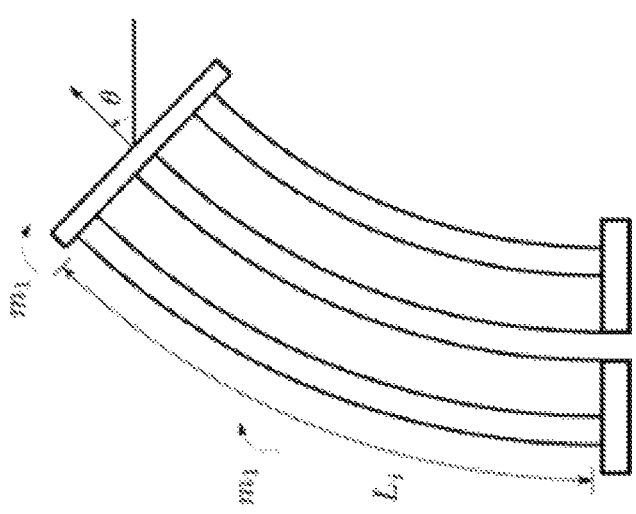
FIG. 7A is a schematic diagram of a bent snake segment of a continuum robot with an equilibrium modulating wire retracted from the backbone.

FIGS. 7A and 7B shows the free body diagram of a continuum segment with and without an inserted EMB. In this example, the continuum segment includes an end disk 701, an empty subsegment 702, a separation plane at EMB insertion depth $q_s$ 703, an inserted subsegment 704, and a base disk 705.

In FIG. 7B, a separation plane 703 is defined at the insertion depth $q_s$, dividing the segment into two subsegment—Inserted and Empty. Though not accurate, the two subsegments are both assumed to have constant but different curvatures. The angles $\theta'$ and $\theta_s$ denote the bending angles of the end-disk and at the insertion depth, respectively, when the EMB is inserted. The angle $\theta$ denotes the nominal bending angle when the EMB is not inserted. The angle $\theta_0 = \pi/2$ denotes the angle at the base of the segment.

We first consider the resultant moment $m_1$ that the backbones apply on any imaginary cross section of the continuum segment when no EMB is inserted (FIG. 7A):

$$m_1 = E_p I_p \frac{\theta - \theta_0}{L} + \sum_i E_i I_i \frac{\theta - \theta_0}{L_i} \qquad (11)$$

where $E_p$, $E_i$ and $I_p$, $I_i$ denote the Young's moduli and cross-sectional bending moments of inertia of the central backbone and the $i^{th}$ secondary backbone, respectively. Also L and $L_i$ denote the lengths of the central backbone and the $i^{th}$ secondary backbone.

We also consider the moment $m_1'$ along the empty subsegment in the case of EMB being inserted (FIG. 7B):

$$m'_1 = E_p I_p \frac{\theta' - \theta_s}{L - q_s} + \sum_i E_i I_i \frac{\theta' - \theta_s}{L_{\varepsilon_i}} \quad (12)$$

where $L_{\varepsilon_i}$ denotes the $i^{th}$ backbone length portion that belongs to the empty subsegment (this is the arc-length from the separation plane until the end-disk).

The radial distance between the secondary backbones and the primary backbone is denoted r. When r is projected onto the plane in which a segment bends, we obtain the projected radial distance $\Delta_i$:

$$\Delta_i = r\cos(\sigma_i), \sigma_i = \delta + (i-1)\beta \quad (13)$$

where $\sigma_i$ designates the angular coordinate of the $i^{th}$ backbone relative to the bending plane. The angular coordinate of the first backbone relative to the bending plane is $\delta$ and the angular separation between secondary backbones is $$\beta = \frac{2\pi}{n}$$

where n is the number of secondary backbones.

The length of the $i^{th}$ backbone, $L_i$ is derived using the fixed radial offset between the backbones:

$$L_i = L + \Delta_i(\theta - \theta_i) \quad (14)$$

Using similar rationale, we calculate the empty length portion $L_{\varepsilon_i}$ and the inserted length portion of the $i^{th}$ secondary backbone $L_{s_i}$:

$$L_{s_i} = q_s + \Delta_i(\theta_s - \theta_0) \quad (15)$$

$$L_{\varepsilon_i} = (L - q_s) + \Delta_i(\theta' - \theta_s) = L_i - L_{s_i} \quad (16)$$

In both FIGS. 7A and 7B, the static equilibrium at the end-disk is determined by the geometric constraints and the backbone loading forces at the end-disk. For example, coordinated pulling and pushing on all secondary backbones are assumed to form a force couple that generates only a moment at the end-disk.

We next use a simplifying assumption that the effect of EMB wire insertion on changes in the bending curvatures of the un-inserted subsegment backbones is negligible, hence:

$$m_1 = m_1' \quad (17)$$

Next, we consider $m_2$ and $m_s$, the moments that the secondary backbones and the EMB apply on the separation plane as shown in FIG. 7B:

$$m_2 = -\left\{ E_p I_p \frac{\theta_s - \theta_0}{q_s} + \sum_i E_i I_i \frac{\theta_s - \theta_0}{L_{s_i}} \right\} \quad (18)$$

$$m_s = -E_s I_s \frac{\theta_s - \theta_0}{q_s} \quad (19)$$

where $E_s$ and $I_s$ denote the Young's modulus and cross-sectional bending moment of inertia of the EMB.

Substituting equations (11, 12) into (17), results in one equation having two unknowns $\theta'$ and $\theta_s$ as illustrated in FIG. 7B. To obtain the second equation necessary for solving for these two unknowns, we use the moment balance on the separation plane:

$$m'_1 + m_2 + m_s = 0 \quad (20)$$

To solve equations (20) and (17) for the unknowns $\theta'$ and $\theta_s$ we explicitly express the backbone moments using the beam equation m=EIk where k designates the radius of curvature and EI designates the bending cross sectional stiffness of a beam. In doing so, we note that the curvature of a beam bent in a circular shape satisfies $$k = \frac{\theta}{L}$$

where $\theta$ is the deflection angle and L is the beam length. Since the backbone lengths are a function of the unknowns, we will rewrite the moment equation for a beam as $$m = \frac{EI}{L}\theta$$

and, by defining the beam angular deflection stiffness $$k_\theta \triangleq \frac{EI}{L}$$

we obtain a simple equation for the moment $m = k_\theta \theta$.

Using the above definition for beam angular deflection stiffness, we rewrite the moment equations for each beam as:

$$m_1 = k_{\theta_0}(\theta - \theta_0), k_{\theta_0} = \frac{E_p I_p}{L} + \sum_i \frac{E_i I_i}{L_i} \quad (21)$$

$$m'_1 = k_{\theta_1}(\theta' - \theta_s), k_{\theta_1} = \frac{E_p I_p}{L - q_s} + \sum_i \frac{E_i I_i}{L_{\varepsilon_i}} \quad (22)$$

$$m_2 = -k_{\theta_2}(\theta_s - \theta_0), k_{\theta_2} = \frac{E_p I_p}{q_s} + \sum_i \frac{E_i I_i}{L_{s_i}} \quad (23)$$

$$m_s = -k_{\theta_s}(\theta_s - \theta_0), k_{\theta_s} = \frac{E_s I_s}{q_s} \quad (24)$$

Substituting equation (22)-(24) in equation (20) results in:

$$\theta_s = \frac{k_{\theta_1}\theta' + k_{\theta_2}\theta_0 + k_{\theta_s}\theta_0}{k_{\theta_1} + k_{\theta_2} + k_{\theta_s}} \quad (25)$$

Substituting equation (21) and (22) in equation (17) results in:

$$\theta' = \frac{k_0}{k_1}(\theta - \theta_0) + \theta_s = f_{\theta'}(\theta_s) \quad (26)$$

As a final step in the solution, we substitute the result in equation (26) in equation (25), thereby obtaining $\theta_s$ and subsequently $\theta'$.

Equations (25) and (26) present the solution to the simplistic modeling approach that is fundamentally based on Eq. (17) and Eq. (20). In addition to the simplified assumption, the current model also neglects modeling uncertainties due to frictional effects and material property uncertainties. These uncertainties include friction and strain along the actuation lines, non-uniformly distributed load on backbones that causes shape deviations from constant-curvature bending, deviations in the cross section of the backbones during bending, and uncertainties in the properties of the NiTi backbones.

To account for the modeling uncertainties caused by friction, material uncertainty, and our simplistic model, we introduce an uncertainty term $\lambda$ to equation (20):

$$m'_1 + m_2 + m_s = \lambda(q_s, \theta, k_\lambda) \quad (27)$$

The uncertainty term $\lambda$ captures effects of EMB insertion offset, bending angle uncertainty and a fixed offset:

$$\lambda(q_s, \theta, k_\lambda) = k_{\lambda_0} + k_{\lambda_\theta}\theta + k_{\lambda_q}q_s; k_\lambda \triangleq [k_{\lambda_0} k_{\lambda_q} k_{\lambda_\theta}]^T \quad (28)$$

The solution in equation (25) is also updated to:

$$\theta_s = \frac{k_1\theta' + k_2\theta_0 + k_s\theta_0 - \lambda}{k_1 + k_2 + k_s} \quad (29)$$

Having obtained the solutions to the equilibrium tip bending angle $\theta'$ and the bending angle at the separation plane $\theta_s$, we introduce an equilibrium configuration space variable vector $\Phi$ to combine them. With the purpose of preparing for kinematic derivations in later sections when we break a single continuum segment down to two subsegments, the vector $\Phi$ is defined as:

$$\phi \triangleq [\theta_s, \theta_\varepsilon]^T, \theta_\varepsilon \triangleq \theta' + \left(\frac{\pi}{2} - \theta_s\right) \quad (30)$$

where $\theta_\varepsilon$ represents the bending angle of the empty subsegment.

We define the configuration space variable $\psi$ as the nominal bending angle $\theta$ and the bending plane angle $\delta$:

$$\psi \triangleq [\theta, \delta]^T \quad (31)$$

Finally, the solution to equilibrium modeling problem is presented as a mapping $\mathfrak{F}_{eqm}$ which is used in deriving the Jacobian matrices in the following sections:

$$\phi = \mathfrak{F}_{eqm}(\psi, q_s, k_\lambda), \phi \in \mathbb{R}^2, \psi \in \mathbb{R}^2, k_\lambda \in \mathbb{R}^3 \quad (32)$$

Equation (32) provides the end disk equilibrium angle for a combination of any given EMB insertion length $q_s$, nominal bending angle $\theta$, and bending plane angle $\delta$.

Kinematic modeling of CREM includes the mapping of configuration space to task space and its differential kinematics. The differential kinematics include the instantaneous kinematics and the error propagation.

The instantaneous kinematics is derived for control purpose, and it includes two motion Jacobian matrices that both relate actuation speeds to the robot tip velocity. The macro motion Jacobian $J_M$ is associated with the joint velocities of push/pull on backbones (direct actuation) while the micro motion Jacobian $J_\mu$ is related to the EMB insertion velocity (indirect actuation).

The kinematic error propagation investigates how errors in parameters contribute to errors in kinematic measurements of task space (e.g. measured positions). In this work, we focus on the vector $k_\lambda$ that parameterizes the modeling uncertainty. An identification Jacobian $J_k$ is derived and used in the discussion below to estimate $k_\lambda$ with experimental measurements.

Figure 8:
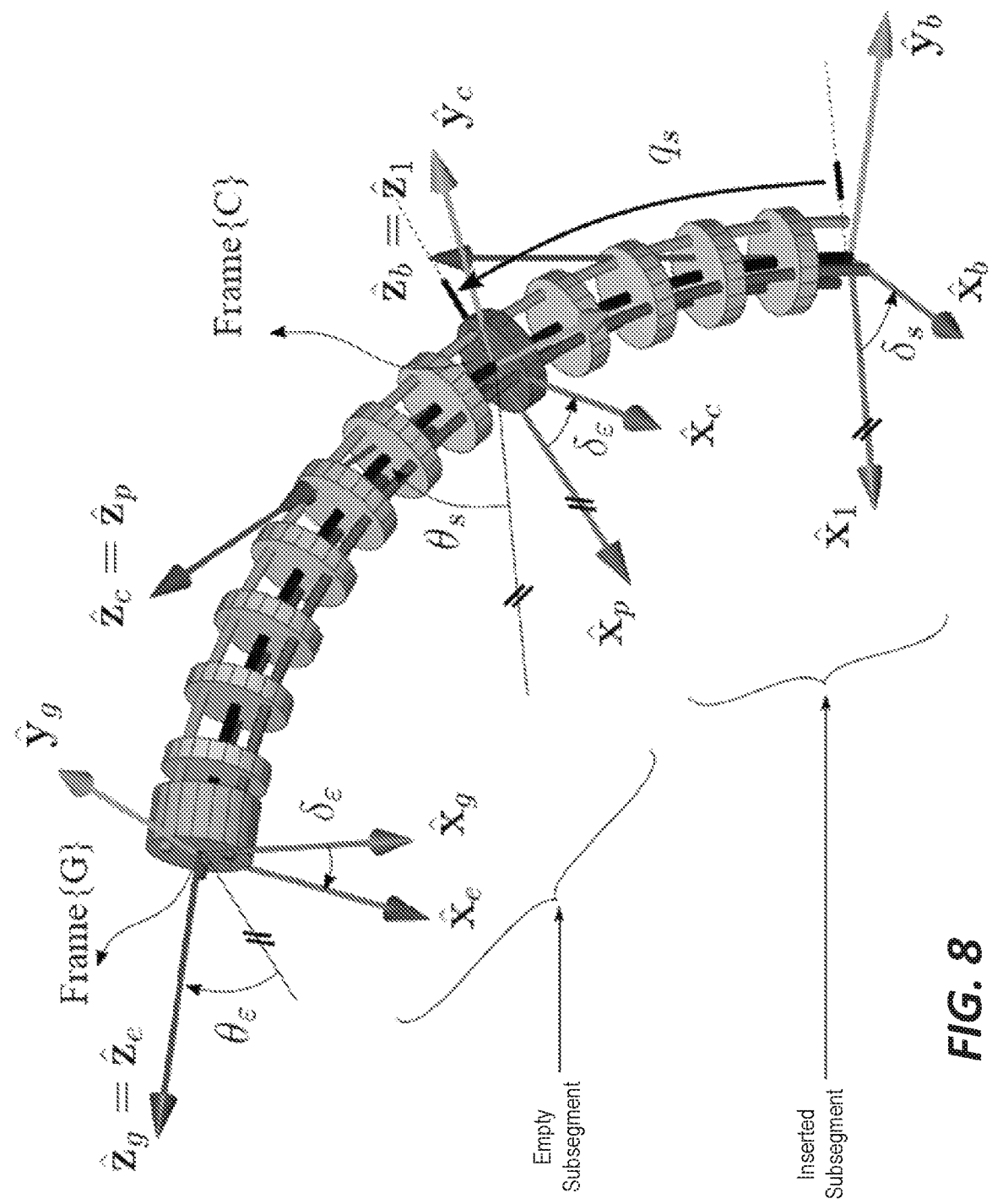
FIG. 8 is a perspective view of a single segment of a continuum robot illustrated as two concatenated subsegments for a given micro-motion wire insertion depth.

With the mapping $\mathfrak{F}_{eqm}$ in equation (32) derived as the result of static equilibrium, the kinematic mapping can be formulated by considering a single continuum segment as two concatenated subsegments—the inserted and the empty, divided at the insertion depth $q_s$. FIG. 8 illustrates our approach to analyzing the two concatenated subsegments. The bending angles of both subsegments were introduced in equation (30), denoted as $\theta_s$, and $\theta_\varepsilon$, for the inserted and the empty subsegment. Since the whole segment is assumed to bend in plane, both subsegments have the equal bending plane angles:

$$\delta_s = \delta_e = \delta \quad (33)$$

The kinematic nomenclature used in FIG. 8 is outlined in Table 1.

TABLE 1

| Symbol | Description |
| --- | --- |
| Frame {F} | Designates a right-handed frame with unit vectors $\hat{x}_f, \hat{y}_f, \hat{z}_f$ and point f as origin. |
| Frame {B} | The base disk frame with b located at the center of the base disk, $\hat{x}_b$ passing through the first secondary backbone and $\hat{z}_b$ perpendicular to the base disk. |
| Frame {1} | Frame of the bending plane having $\hat{z}_1 = \hat{z}_b$ and $\hat{x}_1$ passing through with the project point of the end disk center. The angle $\delta$ is defined as from $\hat{x}_1$ to $\hat{x}_b$ about $\hat{z}_b$ according to right hand rule. |
| Frames {E} & {G} | Frame {E} is defined with $\hat{z}_e$ as the normal to the end disk and $\hat{x}_e$ is the intersection of the bending plane and the end disk top surface. Frame {G} is the gripper frame that has the same $\hat{z}$ as {E}, i.e., $\hat{z}_g = \hat{z}_e$, but $\hat{x}_g$ is passing through the first secondary backbone. It can be obtained by a rotation angle $(-\sigma_{1e})$ about $\hat{z}_e$. |
| Frames {P} & {C} | These frame are defined in a manner similar to the definition of frames {E} and {G} but for a specific arc insertion length $q_s$ as opposed to the full length of the robot segment L. The $\hat{x}_c$-$\hat{y}_c$ plane is the insertion plane as shown in the planar case in FIGS. 7A and 7B. |
| Frame {I} | Designates the microscope image frame having the origin at the corner of the image and having its x-y axes aligned with the width and height directions (FIG. 13A and 13C). |
| Frame {M} | Designates the marker frame that is determined by segmentation of the microscope image (FIG. 13C). |
| Vector $^x p_{a/b}$ | Designates the position of point a relative to point b that is expressed in frame {X}. |

Because the direct kinematics of a single segment have a length $L_x$ and an end disk angle $\theta_x$, the end disk pose (i.e., position and orientation) relative to the base are given by:

$$^{base}p_{end-disk/base} = \frac{L_x}{\theta_x - \pi/2}\begin{bmatrix} \cos\delta_x(\sin\theta_x - 1) \\ -\sin\delta_x(\sin\theta - 1) \\ -\cos\theta_x \end{bmatrix} \quad (34)$$

$$^{base}R_{end-disk} = e^{-\delta_x[\hat{z}^\wedge]}e^{(\frac{\pi}{2}-\theta_x)[\hat{y}^\wedge]}e^{\delta_x[\hat{z}^\wedge]} \quad (35)$$

where $\delta_x$ designates the angle of the bending plane (analogous to $\delta$ in FIG. 8), $[v^\wedge]$ represents the cross-product matrix of vector v and the matrix exponential $e^{\alpha[v^\wedge]}$ represents a rotation matrix about the axis v by an angle $\alpha$.

To obtain the pose of the end disk of the inserted segment is given by $^b p_{c/b}$ and $^b R_c$, we substitute $L_x = q_s$, $\theta_x = \theta_s$, $\delta_x = \delta$ in equations (34), (35). Similarly, the pose of the end disk of the empty segment relative to its base is obtained by substituting $L_x = L - q_s$, $\theta_x = \theta_\varepsilon$, $\delta_x = \delta$ in equations (34), (35) to result in $^c p_{g/c}$ and $^c R_g$.

The pose of the free subsegment end disk relative to the segment base is given by:

$$^b p_{g/b} = ^b p_{c/b} + ^b R_c {}^c p_{g/c} \triangleq \mathcal{F}_g(\phi, \delta, q_s) \tag{36}$$

$$^b R_g = {}^b R_c {}^c R_b = R_g(\phi, \delta) \tag{37}$$

Casting the above two equations in a homogeneous transform format yields:

$$^b T_g = \begin{bmatrix} ^b R_g & ^b p_{g/b} \\ 0 & 1 \end{bmatrix} \triangleq \mathcal{F}_g(\phi, \delta, q_s) \tag{38}$$

With $\Phi$ expressed using mapping $\mathcal{F}_{eqm}(\psi, q_s, k_\lambda)$, the forward kinematics is determined, which can be also written as:

$$^b T_g \triangleq \mathcal{F}_T(\psi, q_s, k_\lambda) \tag{39}$$

The total differential of a homogenous transform $T \in SE(3)$, may be represented as:

$$d\xi \triangleq [(dx)^T, (d\mu)^T]^T, d\xi \in \mathbb{R}^{6\times 1} \tag{40}$$

$$dx \triangleq d\left(^b p_g\right), d\mu \triangleq [d\mu_x, d\mu_y, d\mu_z]^T \tag{41}$$

where $dx$ and $d\mu$ represent translational and rotational differentials in the base frame. The vector $\mu \in \mathbb{R}^{3\times 1}$ represents a chosen orientation parametrization (e.g., Euler angles).

The total differential of $^bT_g$ is obtained by considering differentials on all variables, i.e., $d\Phi$, $d\delta$, and $dq_s$:

$$d\xi = \frac{d\xi}{d\phi}d\phi + \frac{d\xi}{d\delta}d\delta + \frac{d\xi}{dq_s}dq_s \tag{42}$$

Using the nomenclature of a Jacobian $J_{ab}$ such that $\delta_a = J_{ab}\delta_b$, we define the following Jacobian matrices:

$$\frac{d\xi}{d\phi} \triangleq J_{\xi\phi} \in \mathbb{R}^{6\times 2}, \frac{d\xi}{d\delta} \triangleq J_{\xi\delta} \in \mathbb{R}^6, \frac{d\xi}{dq_s} \triangleq J_{\xi q_s} \in \mathbb{R}^6 \tag{43}$$

The Jacobian matrices $J_{\xi\phi}$, $J_{\xi\delta}$, and $J_{\xi q_s}$, respectively, relate the differential on equilibrium configuration space variable $d\phi = [d\theta_s, d\theta_\varepsilon]^T$, the differential on bending plane $d\delta$, and differential on EMB insertion depth $dq_s$, to the corresponding differential contributions on the pose vector $d\xi$. Both $J_{\xi\phi}$ and $J_{\xi\delta}$ can be obtained by treating the inserted and empty subsegments as a concatenated two-segment robot (as discussed further below).

The third Jacobian, $J_{\xi q_s}$, defined as the partial derivative, $d\xi/dq_s$, is derived with the other variables ($\Phi$ and $\delta$) held constant. The end-effector orientation, given by $^bR_g$ in equation (37) is not a function of $q_s$. Therefore, by considering only the translational differential due to $dq_s$, we have:

$$J_{\xi q_s} = \begin{bmatrix} \frac{d^b p_{c/b}}{dq_s} + {}^b R_c \frac{d^c p_{g/c}}{dq_s} \\ 0 \end{bmatrix} \tag{44}$$

where $$\frac{d^b p_{c/b}}{dq_s} \text{ and } \frac{d^c p_{g/c}}{dq_s}$$

are derived from equation (34). It is important to note that $J_{\xi q_s}$ differs from the micro motion Jacobian $J_\mu$ derived later in that $J_{\xi q_s}$ is a contributing part of $J_\mu$–the length "tangential" contribution, while $dq_s$ also propagates $d\Phi$ that also causes change on $d\xi$.

Having derived the above three Jacobian matrices, $J_{\xi\phi}$, $J_{\xi\delta}$, and $J_{\xi q_s}$, we obtain the pose total differential $d\xi$ expressed using differentials $d\Phi$, $d\delta$, and $dq_s$. Further, the differential $d\Phi$ is a result of multiple other differentials, which can be seen from mapping $\mathcal{F}_{eqm}(\psi, q_s, k_\lambda)$. To fully investigate and decouple the contributions of direct (macro) and indirect (micro) actuation, we express $d\Phi$ using differentials on ($\psi, q_s, k_\lambda$). This differential is also motivated by equation (39), where the variables are decoupled as $\psi$ for macro motion, $q_s$ for micro motion, and $k_\lambda$ for micro motion parameters. Such differentiation is derived as:

$$d\phi = \frac{d\phi}{d\psi}d\psi + \frac{d\phi}{dq_s}dq_s + \frac{d\phi}{dk_\lambda}dk_\lambda \tag{45}$$

$$\frac{d\phi}{d\psi} = \left[\frac{d\phi}{d\theta}, \frac{d\phi}{d\delta}\right], \frac{d\phi}{dk_\lambda} = \left[\frac{d\phi}{dk_{\lambda_0}}, \frac{d\phi}{dk_{\lambda_\theta}}, \frac{d\phi}{dk_{\lambda_q}}\right] \tag{46}$$

where the gradient terms are derived, as discussed below, as:

$$\frac{d\phi}{d\theta} = (AS_0 - \Gamma_{\theta_s}S_1)^{-1}\Gamma_\theta \triangleq J_{\phi\theta} \tag{47}$$

$$\frac{d\phi}{d\delta} = (AS_0 - \Gamma_{\theta_s}S_1)^{-1}\Gamma_\delta \triangleq J_{\phi\delta} \tag{48}$$

$$\frac{d\phi}{dq_s} = (AS_0 - \Gamma_{\theta_s}S_1)^{-1}\Gamma_{q_s} \triangleq J_{\phi q_s} \tag{49}$$

$$\frac{d\phi}{dk_{\lambda_i}} = (AS_0 - \Gamma_{\theta_s}S_1)^{-1}B'_{k_{\lambda_i}} \triangleq J_{\phi k_{\lambda_i}}, \frac{d\phi}{dk_\lambda} \triangleq J_{\phi k_\lambda} \tag{50}$$

$$C_\phi \triangleq S_0\phi - C_0, \Gamma_x = B'_x - A'_x C_\phi \tag{51}$$

Matrices $A'_x$ and $B'_x$ are partial derivative matrices with respect to variable "x", and $A$, $S_0$, $B$, $C_0$, and $S_1$ are defined as:

$$A = \begin{bmatrix} k_1 + k_2 + k_s & -k_1 \\ k_1 & -k_1 \end{bmatrix}, S_0 = \begin{bmatrix} 1 & 0 \\ 1 & 1 \end{bmatrix} \tag{52}$$

$$B = \begin{bmatrix} (k_2 + k_s)\theta_0 - \lambda \\ k_0(\theta_0 - \theta) \end{bmatrix}, C_0 = \begin{bmatrix} 0 \\ \theta_0 \end{bmatrix}, S_1 = [1 \; 0] \tag{53}$$

Using equations (47)-(53), $d\Phi$ is fully expressed as equation (45). Substituting $d\Phi$ into the original differentiation in equation (42), we obtain the full differential kinematics that relates differentials on ($\psi, q_s, k_\lambda$) to the pose total differential $d\xi$:

$$d\xi = \frac{d\xi}{d\phi}\frac{d\phi}{d\theta}d\theta + \frac{d\xi}{d\phi}\frac{d\phi}{d\delta}d\delta + \frac{d\xi}{d\phi}\frac{d\phi}{dk_\lambda}dq_s + \frac{d\xi}{d\phi}\frac{d\phi}{dk_\lambda}dk_\lambda + \frac{d\xi}{d\delta}d\delta + \frac{d\xi}{dq_s}dq_s \quad (54)$$

Rewriting equation (55) using the Jacobian definitions:

$$d\xi = J_{\xi\phi}J_{\phi\theta}d\theta + J_{\xi\phi}J_{\phi\delta}d\delta + J_{\xi\delta}d\delta + J_{\xi\phi}J_{\phi q_s}dq_s + J_{\xi q_s}dq_s + J_{\xi\phi}J_{\phi k_\lambda}dk_\lambda \quad (55)$$

Collecting like terms of $d\psi$, $dq_s$, and $dk_\lambda$, we obtain a differentiation that decouples differentials of the macro motion, the micro motion, and the parameters:

$$d\xi = \underbrace{[J_{\xi\phi}J_{\phi\theta}J_{\xi\phi}J_{\phi\delta} + J_{\xi\delta}]}_{\triangleq J_M}d\psi + \underbrace{[J_{\xi\phi}J_{\phi q_s} + J_{\xi q_s}]}_{\triangleq J_\mu}dq_s + \underbrace{J_{\xi\phi}J_{\phi k_\lambda}}_{\triangleq J_k}dk_\lambda \quad (56)$$

The above result completes the mapping from configuration to task space. It clearly delineates the effects of EDM insertion and direct actuation to achieving macro and micro motion. For control purposes, a complete mapping from joint to task space is needed. We therefore consider next the mapping from direct (macro) actuation joint space q to task space $\xi$. Since three secondary backbones are used in our experimental setup as illustrated in FIG. 8, we will define $q \triangleq [q_1, q_2, q_3]^T$ where:

$$q_i \triangleq L_i - L \quad (57)$$

When obtaining this mapping, we consider the nominal segment kinematics for multi-backbone continuum robots.

The Jacobian that relates the differential dq to the differential $d\psi$ is:

$$dq \triangleq J_{q\psi}d\psi, \quad J_{q\psi} = r\begin{bmatrix} c_\delta & (\theta_0 - \theta)s_\delta \\ c_{(\delta+\beta)} & (\theta_0 - \theta)s_{(\delta+\beta)} \\ c_{(\delta+2\beta)} & (\theta_0 - \theta)s_{(\delta+2\beta)} \end{bmatrix} \quad (58)$$

where r denotes the constant radial distance between the central and surrounding backbones, and $\beta = 2\pi/3$ denotes the backbone separation angle. Using equation (58), we substitute $d\psi$ into equation (56), arriving at the final differential kinematics:

$$d\xi = J_M dq + J_\mu dq_s + J_k dk_\lambda \quad (59)$$

Equation (59) fully decouples the end-effector pose differential to contributions of the direct (macro) actuation dq, the indirect (micro) actuation $dq_s$, and the modeling uncertainty $dk_\lambda$. The three Jacobian matrices are obtained from equation (59): $J_M$ defined as the macro motion Jacobian, $J_\mu$ defined as the micro motion Jacobian, and $J_k$ defined as the Identification Jacobian.

$$J_M = [J_{\xi\phi}J_{\phi\theta}J_{\xi\phi}J_{\phi\delta} + J_{\xi\delta}](J_{q\psi})^\dagger, J_M \in \mathbb{R}^{6\times 2} \quad (60)$$

$$J_\mu = J_{\xi\phi}J_{\phi q_s} + J_{\xi q_s}, J_\mu \in \mathbb{R}^{6\times 1} \quad (61)$$

$$J_k = J_{\xi\phi}J_{\phi k_\lambda}, J_k \in \mathbb{R}^{6\times n_k} \quad (62)$$

where $(*)^\dagger$ is the Moore-Penrose pseudo inverse.

The result in equation (59) builds on knowing the Jacobians $J_{\xi\phi} \in \mathbb{R}^{6\times 2}$ and $J_{\xi\delta} \in \mathbb{R}^{6\times 2}$ as mentioned in equations (42) and (43). We now provide a derivation to these two Jacobians. Considering a single-segment CREM as two concatenated subsegments (inserted and empty), we apply the Jacobian formulation for the two-segment multi-backbone continuum robot (MBCR) while assuming that both subsegments share the bending plane angle $\delta$. For ease of adapting formulations, we introduce a vector notation:

$$\delta_v \triangleq \begin{bmatrix} \delta_s \\ \delta_\varepsilon \end{bmatrix} = \begin{bmatrix} 1 \\ 1 \end{bmatrix}\delta, \quad d\delta_v \triangleq \begin{bmatrix} d\delta_s \\ d\delta_\varepsilon \end{bmatrix} = \begin{bmatrix} 1 \\ 1 \end{bmatrix}d\delta \quad (63)$$

We next use the notation of $^{i-1}\xi_{i/i-1}$ to denote the pose of the $i^{th}$ subsegment relative to the $(i-1)^{th}$ subsegment where $i \in \{s, \varepsilon\}$. Using v and $\omega$ to denote linear and angular velocities, we define the corresponding four Jacobian matrices corresponding with the contributions of $d\theta_i$, $d\delta_i$, where $i \in \{s, \varepsilon\}$ to the end-effector twist:

$$\frac{d^{i-1}\xi_{i/i-1}}{d([\theta_i, \delta_i]^T)} \triangleq \begin{bmatrix} J_{v\theta_i} & J_{v\delta_i} \\ J_{\omega\theta_i} & J_{\omega\delta_i} \end{bmatrix} \in \mathbb{R}^{6\times 2}, i \in \{s, \varepsilon\} \quad (64)$$

Details of the derivations of the Jacobians are provided below.

The serial composition of two subsegments using twist transformation results in the end effector twist:

$$J_{\xi\phi} = \frac{d\xi}{d\phi} = \begin{bmatrix} J_{v\theta_s} - [^bR_c\,^cp_{g/c}]^\wedge J_{\omega\theta_s} & ^bR_c J_{v\theta_\varepsilon} \\ J_{\omega\theta_s} & ^bR_c J_{\omega\theta_\varepsilon} \end{bmatrix} \quad (65)$$

$$J_{\xi\delta_v} = \frac{d\xi}{d\delta_v} = \begin{bmatrix} J_{v\delta_s} - [^bR_c\,^cp_{g/c}]^\wedge J_{\omega\delta_s} & ^bR_c J_{v\delta_\varepsilon} \\ J_{\omega\delta_s} & ^bR_c J_{\omega\delta_\varepsilon} \end{bmatrix} \quad (66)$$

These definitions of $J_{\xi\phi}$ and $J_{\xi\delta_v}$ complete the two missing terms needed in equation (59), but with a slight formulation modification. The Jacobian matrix $J_{\xi\delta}$ is slightly different from $J_{\xi\delta_v}$ in equation (66), and using the differentiation chain rule it becomes:

$$J_{\xi\delta} \triangleq \frac{d\xi}{d\delta} = \frac{d\xi}{d\delta_v}\frac{d\delta_v}{d\delta} = J_{\xi\delta_v}\begin{bmatrix} 1 \\ 1 \end{bmatrix} \quad (67)$$

To calibrate the model uncertainty parameters $k_\lambda$, we extract from equation (59) the following relation:

$$\delta\xi(\delta k_\lambda) = J_k\delta k_\lambda \quad (68)$$

Using this error propagation model, we construct an estimation method to estimate $k_\lambda$. Let $\bar{\xi}_j \leftrightarrow [\bar{x}_j, \bar{R}_j]$ designate the measured end-effector pose at the $j^{th}$ robot configuration (insertion depth) where $\bar{x}_j$ and $\bar{R}_j$ designate the measured position and orientation. Let $x_j$ and $R_j$ denote the modeled pose using the direct kinematics for a given $k_\lambda$. The error between the measured and modeled poses are then defined as:

$$c_j \triangleq [(\bar{x}_j - x_j)^T, (\alpha_{e_j}\hat{m}_{e_j})^T]^T, c_j \in \mathbb{R}^6 \quad (69)$$

where $\alpha_{e_j}$ and $\hat{m}_{e_j}$ are the angle and axis parameterizing the orientation error $R_{e_j}$. These parameters are given by:

$$R_{e_j} \triangleq \bar{R}_j R_j^T = e^{\alpha_{e_j}[\hat{m}_{e_j}]^\wedge} \quad (70)$$

$$\alpha_{e_j} = \cos^{-1}\left(\frac{Tr(R_{e_j}) - 1}{2}\right) \quad (71)$$

-continued $$\hat{m}_{e_j} = \frac{1}{2\sin(\alpha_e)}(R_{e_j} - R_{e_j}^T)^\vee \quad (72)$$

where the operator $(*)^V$ designates the vector form of a skew-symmetric matrix.

An aggregated error vector $\tilde{c}_\lambda$ is defined to include errors of all N robot configurations:

$$\tilde{c}_\lambda = [(c_1)^T, \ldots, (C_N)^T]^T \quad (73)$$

The optimization objection function $M_\lambda$ is then defined as:

$$M_\lambda(k_\lambda) = \frac{1}{2N}\tilde{c}_\lambda^T W \tilde{c}_\lambda \quad (74)$$

where W is a weight matrix encoding confidence in the measurements and the measurement unit scaling factors.

The first-order Taylor series approximation of $M_\lambda$ is given:

$$M_\lambda(k_\kappa + k_\kappa) \approx M_\lambda(k_\kappa) + J_{M_\lambda}\delta k_\lambda \quad (75)$$

where the aggregated Jacobian $J_{M_\lambda} \in \mathbb{R}^{1 \times 5}$ is given by:

$$J_{M_A} = \frac{1}{N}(\tilde{c}_\lambda)^T W J_{c_\lambda} \quad (76)$$

$$J_{c_\lambda} = \frac{\partial \tilde{c}_\lambda}{\partial k_\lambda} = -[(J_{k_1})^T, \ldots, (J_{k_N})^T]^T \quad (77)$$

Equation (76) shows that minimizing $M_\lambda$ entails following the gradient descent direction along $d\tilde{c}_\lambda/dk_\lambda$. The parameter $k_\lambda$ is then obtained using an iterative nonlinear least squares estimation shown in algorithm of FIG. 9. In the algorithm of FIG. 9, H is the parameter scaling matrix and the task space variable scaling is achieved by adjusting W.

In the examples below, we present simulations to demonstrate the direct kinematics and differential kinematics. We also verify the differential kinematics through finite-difference simulations. We also carry out simulations to verify the differential kinematics model. In all simulations, we assumed the robot points vertically down at its home (straight) configuration.

Using the model described above, we present the simulated position analysis of the micro motion created by the EMB insertion. In both simulations and the experimental model validations, we sue the parameters as in Table 2. They include the Young's modulus of the superelastic NiTi material used for backbone tubes and EMBs ($E_p$, $E_i$, $E_s$), the diameters of the backbones ($d_p$, $d_i$, $d_s$), and the cross-sectional moment of inertia ($I_p$, $I_i$, $I_s$).

TABLE 2

| | |
|---|---|
| L | 44.3 mm |
| R | 3 mm |
| $E_p$, $E_i$, $E_s$ | 41 GPa |
| $d_p$, $d_i$ | 0.90 mm |
| $d_s$ | 0.38 mm |
| $I_p$, $I_i$ | 0.0312 mm$^4$ |
| $I_s$ | 0.0010 mm$^4$ |

Figure 10B:
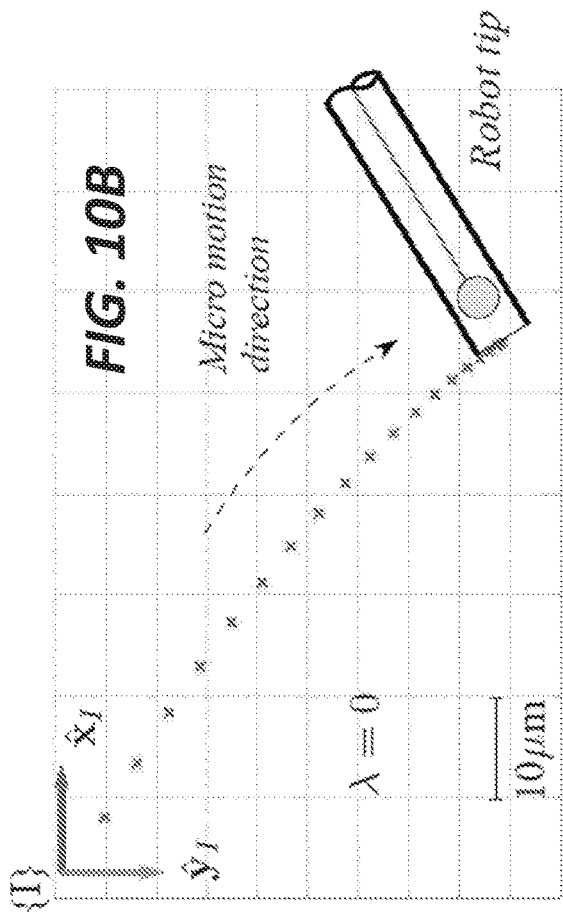
FIG. 10B is a schematic illustration of the tip of the continuum robot of FIG. 10A during micro motion under ideal conditions.
Figure 10C:
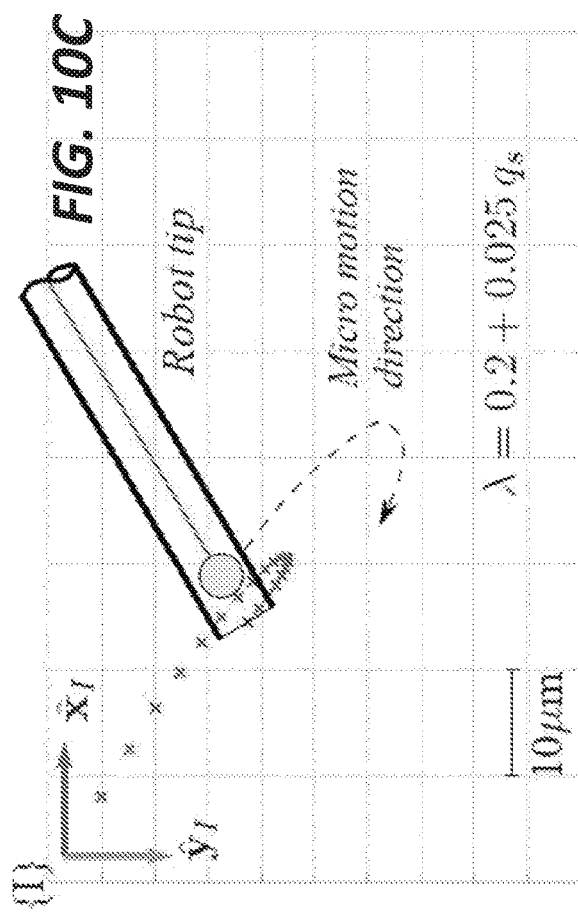
FIG. 10C is a schematic illustration of the tip of the continuum robot of FIG. 10A subject to a linear uncertainty function.
Figure 10A:
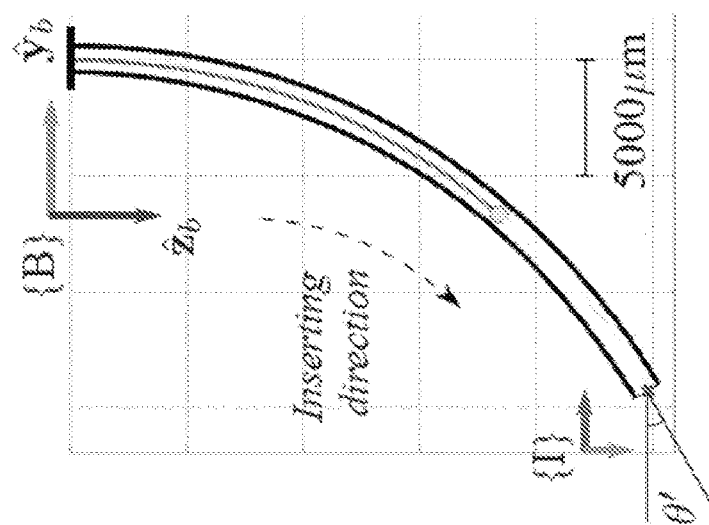
FIG. 10A is a schematic illustration of an entire segment of a continuum robot when an EMB is being inserted.

FIGS. 10A, 10B, and 10C show the simulation results of the micro motion creates by EMB insertion. FIG. 10A shows the continuum segment at its initial bending angle $\theta = 30°$. During simulation, the equilibrium bending angles $\{\theta', \theta_s\}$ were computed at different EMB insertion depths. The resulting tip micro motion is shown in FIG. 10B for the naïve kinematic model (i.e. $\lambda = 0$). FIG. 10C shows the tip motion for an updated model assuming $\lambda = 0.2 + 0.06q_s$. We note that, as expected, in both cases the robot straightens with EMB insertion since the robot body straightens. However, the updated model exhibits a turning point behavior which relates to the combined effect of straightening and change in the end effector angle $\theta'$.

To verify the derivations of instantaneous kinematics and error propagation, we compute Jacobians as described above. Since the simulation case represents the robot motion within a bending plane, the columns of the Jacobians represent 2x1 vectors of induced velocities for unit change in the variables associated with each Jacobian. The following simulations verify the macro motion Jacobian $J_M$, the micro motion Jacobian $J_\mu$, and the identification Jacobian $J_k$ by plotting the Jacobian columns. The verification is carried out visually by verifying that the Jacobian columns induce tip velocity tangent to the trajectory generated by direct kinematics. In addition, each Jacobian has been also verified numerically via finite difference computations.

To verify $J_M$, the EMB insertion depth $q_s$ was fixed and direct actuation of backbones was assumed. Sample tip positions along the trajectory were obtained via direct kinematics and the corresponding Jacobian $J_M$ was computed. FIG. 11 shows the simulation results. These results verify that the computed $J_M$ is tangent to the macro motion trajectory.

Figures 12A, 12B, 12C:
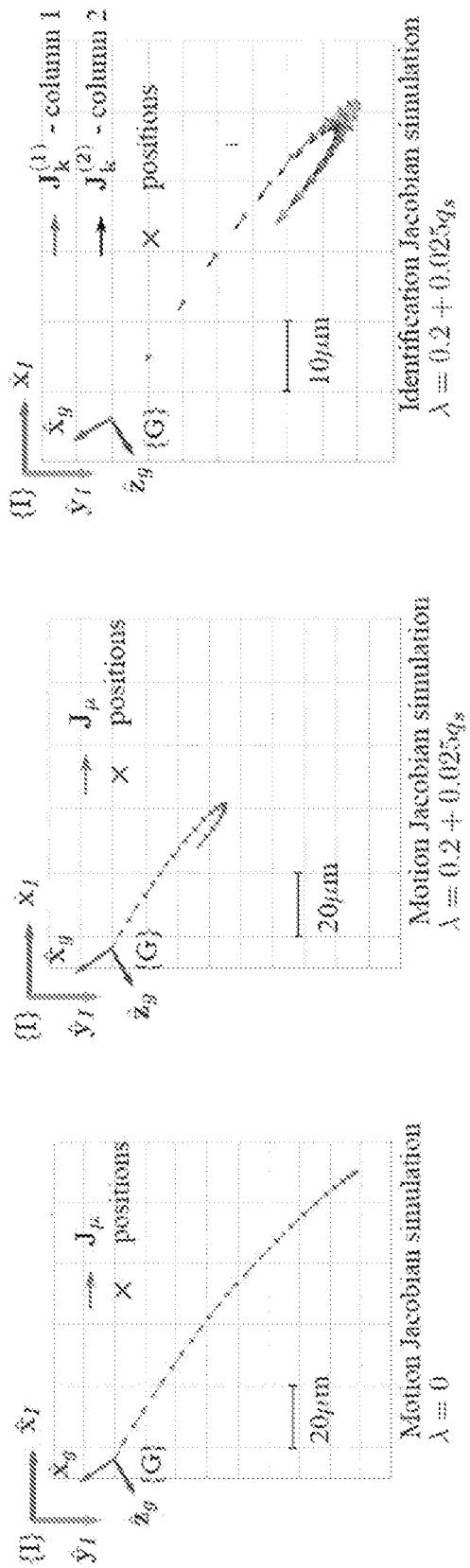
FIG. 12A is a graph illustrating a simulation verifying derivations of the Jacobians under micro motion under ideal conditions.
FIG. 12B is a graph illustrating a simulation verifying derivations of the Jacobians under micro motion subject to a linear uncertainty function.
FIG. 12C is a graph illustrating a simulation verifying derivations of the Jacobians under micro motion with error propagation where perturbations were overlapped in simulated trajectory.

To verify $J_\mu$, the secondary backbones were assumed locked and the EMB insertion depth $q_s$ was varied. The Jacobian $J_\mu$ was computed and plotted for each EMB depth. Two different scenarios of modeling uncertainty were considered: $\lambda = 0$ and $\lambda = 0.2 + 0.06q_s$. The results in FIGS. 12A and 12B verify that $J_\mu$ is tangent to the micro scale trajectory generated by direct kinematics.

FIG. 10C shows the plots of the identification Jacobian $J_k$ for the simulation scenario where $\lambda \neq 0$, revealing how the parameter erros of modeling uncertainty affect the tip positions and hence the shape of the trajectory.

Figure 13B:
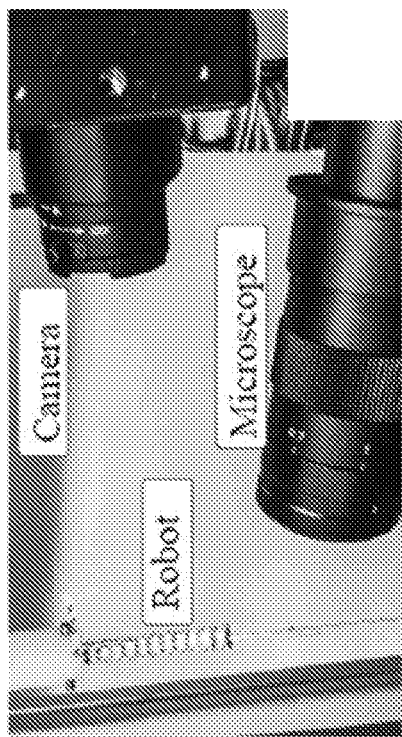
FIG. 13B is a side view of the experimental setup of FIG. 13A.
Figure 13C:
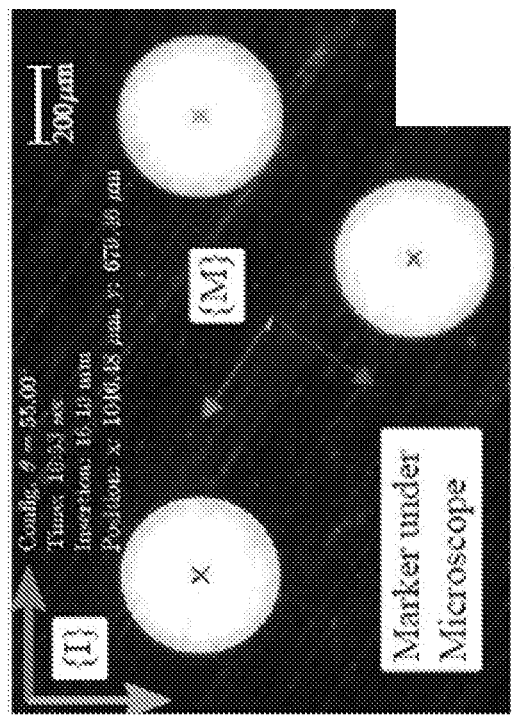
FIG. 13C is a microscope view of a segmented marker used in the experimental setup of FIG. 13A.
Figure 13A:
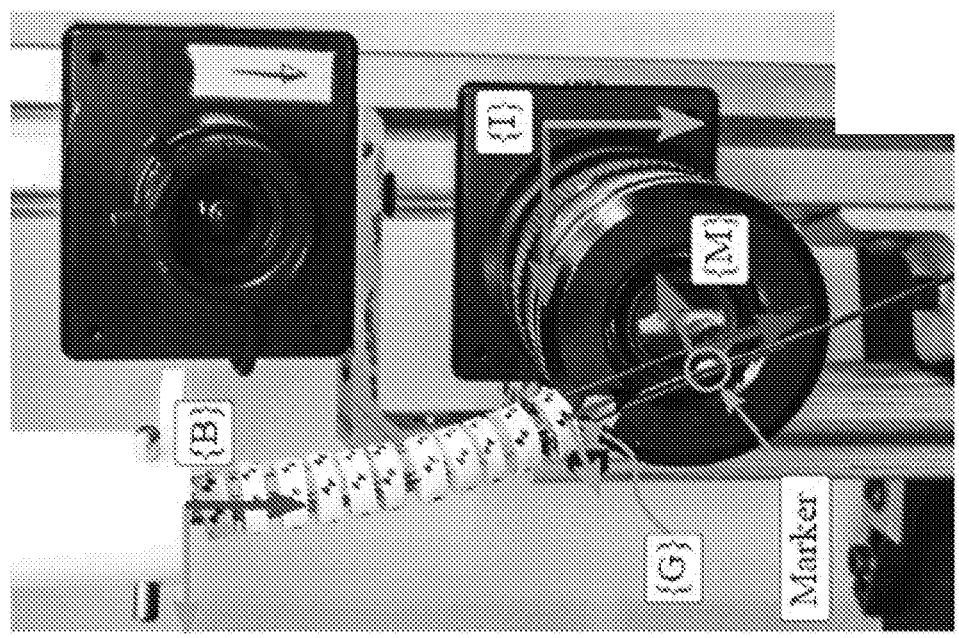
FIG. 13A is a perspective view of a single-segment continuum robot whose motion is captured by two cameras.

The following examples evaluate the ability of our simplified kinematic model to capture the micro-motion behavior, validate the calibration framework, and assess the accuracy of the updated kinematic model in reflecting experimental data. A single-segment continuum robot with EMB insertion actuation was used as the experimental platform as shown in FIGS. 13A, 13B, and 13C. To observe the robot tip motion at different scales, one HD camera (FLIR Dragonfly II®) was used to capture the macro motion and the bending shape while an identical camera mounted on a 22.5x microscope lens to capture the micro motion. Custom "multi-circled" marker was used to track the tip motion under microscope while multiple custom "X" markers were attached to the continuum robot body to observe the bending shape. The vision measurement methods exhibited a micro motion tracking accuracy of better than 2 μm.

FIGS. 13A, 13B, and 13C show the frames used and also previously referred to in FIGS. 10A, 10B, and 10C. The microscope is fixed at a known offset relative to the robot base, and such offset is represented as a constant transformation from the image frame {I} to the robot base frame {B}. The tracked marker frame {M} is placed at a known offset relative to the end disk (gripper frame {G}), and the transformation is represented as a constant transformation between {M} and {G}. The marker position and orientation in the image frame is obtained by the segmentation of the three circles that construct an asymmetric pattern as shown in FIG. 13C.

Figure 14:
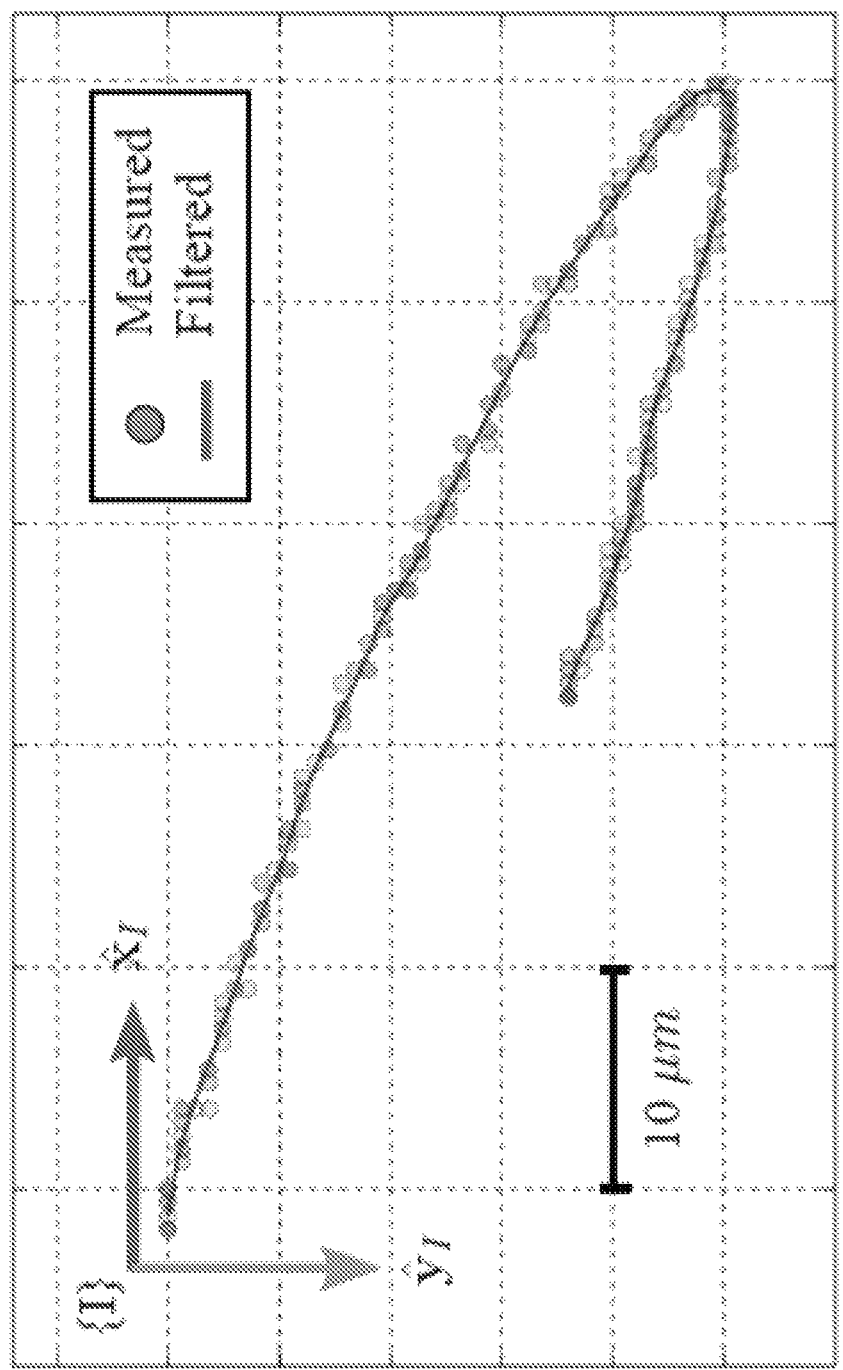
FIG. 14 is a graph of image-segmented tip positions under microscope.

FIG. 14 shows a sample marker frame trajectory during EMB insertion. The marker positions were segmented from microscope images collected at 30 frames per second. Applying a butterworth infinite impulse response filter with the 3-dB frequency as 30 Hz, provided a smooth trajectory for calibration.

Using the calibration method described above, we calibrated the modeling uncertainty parameter vector $k_\lambda$. The parameter vector $k_\lambda$ in equation (28) consists of three elements, a bias term $k_{\lambda_0}$, a coefficient gain $k_{\lambda_\theta}$ that is associated with the nominal bending angle $\theta$, and a coefficient gain $k_{\lambda_q}$ that relates to the EMB insertion depth $q_s$. As a preliminary study, in this paper, we focus on investigating and calibrating $k_{\lambda_0}$ and $k_{\lambda_q}$. Once the characterization of $k_{\lambda_0}$ and $k_{\lambda_q}$ is achieved, one can exhaust the choices of q to investigate the effect of $k_{\lambda_\theta}$.

The algorithm of FIG. 9 was initialized with $k_{\lambda_0}=0$, $k_{\lambda_q}=0$. In each iteration, the modeled positions were computed using the current estimates of the parameters. The aggregated error vector was then calculated between the modeled and experimental positions. For each iteration, both of the current estimates of the parameters and the position root-mean squared errors (RMSE) of all insertion samples (382 in total) were reported. A relative convergence threshold of 0.1% was used to determine the convergence.

For the particular experimental data collection, the parameter estimation (model calibration) went through 46 iterations before converging, where a step size of $\eta=0.1$ was selected. FIG. 15A shows selected iterations during the estimation, and the details of the iterations are reported in Table 3. The estimation started with an initial position RMSE of 44.27 μm, and after its convergence, the position RMSE was reduced to 5.82 μm, showing an improvement of 86.8% in model errors.

TABLE 3

| Iteration | 0 | 5 | 10 | 20 | 30 | 45 | 46 |
|---|---|---|---|---|---|---|---|
| $\dfrac{k_{\lambda_0}}{100}$ | 0 | 4.22 | 6.72 | 9.06 | 9.88 | 10.23 | 10.24 |
| $\dfrac{k_{\lambda_q}}{1000}$ | 0 | 2.7 | 4.3 | 5.7 | 6.3 | 6.5 | 6.5 |
| RMSE [μm] | 42.27 | 15.71 | 25.40 | 7.72 | 6.07 | 5.82 | 5.82 |

By dividing the tip trajectory into two segments, we observe that the current simplistic modeling approach produced bigger errors after the turning point: the RMSEs were reported as 4.87 μm and 6.63 μm for the two segments before and after turning point that had the lengths of 48.11 μm and 38.82 μm, respectively. If one wishes to further improve the model accuracy, a model that only predicts the trajectory before the turning point may be considered. We therefore considered another calibration where only the partial micro motion trajectory before the turning point was used. With the same iteration step size and convergence criterion, the estimation went through 59 iterations to converge, and the updated results are reported in Table 4 and plotted in FIG. 15B. The position RMSE was then further improved to 4.76 μm.

TABLE 4

| Iteration | 0 | 5 | 10 | 20 | 30 | 58 | 59 |
|---|---|---|---|---|---|---|---|
| $\dfrac{k_{\lambda_0}}{100}$ | 0 | 4.22 | 6.72 | 9.06 | 9.88 | 10.30 | 10.30 |
| $\dfrac{k_{\lambda_q}}{1000}$ | 0 | 2.7 | 4.3 | 5.7 | 6.3 | 6.5 | 6.5 |
| RMSE [μm] | 19.51 | 13.01 | 9.30 | 6.12 | 5.17 | 4.76 | 4.76 |

This work focused on creating a simplistic, yet fast model for equilibrium modulation control implementation. The kinematic model traded accurate mechanics modeling (which typically leads to solving nonlinear boundary value problems) with simplicity and speed of computation. Our experimental data showed an unexpected motion behavior manifested by a turning point along the micro-motion trajectory. The model presented in this paper does not offer a physical explanation to this behavior, but can capture this behavior for a given robot. The model calibration results indicate that there is still a potential to improve the model performance by further investigating alternative modeling assumptions and different descriptions of modeling uncertainties. One of the limitations of our approach can be inferred from the simulation shown in FIGS. 12A, 12B, and 12C, where both columns of the identification Jacobian are almost aligned with the tangent to the direct kinematics trajectory. The attainable correction directions that the column-space of $J_k$ affords is therefore limited in reshaping the model trajectory. This was also observed from the experimental validation. Shown from the iterations in FIGS. 15A and 15B, it is difficult to reshape the modeled tip trajectory in the direction that is perpendicular to the trajectory. The other limitation is potentially caused by the choice of linearity in expressing the modeling uncertainty.

This work presented the first modeling attempt for a new class of continuum robots capable of multi-scale motion. These robots achieve macro-scale and micro-scale motions through direct and indirect actuation (equilibrium modulation). Instead of focusing on a high-fidelity mechanics-based model, which typically leads to non-linear boundary value problems not easy to adopt for real-time control or parameter identification. Instead the paper presented a simplified mechanics-based model utilizing moment coupling effects between sub-segments of the continuum robot. This approach generates a differential kinematics model that covers both macro and micro-motion. As a result of unavoidable parameter uncertainty, we presented a model-calibration approach that can compensate for parameter inaccuracy, friction effects and modeling inaccuracies due to the simplistic modeling assumptions. The modeling approach along with the calibration framework was validated experimentally on a multi-backbone continuum robot. The calibrated model reported a positional root-mean-squared error as 5.83 μm if one wishes to use the model for the entire motion profile with the turning point. If one chooses to exclude motions past the turning point, the calibrated model fit the experimental data with an accuracy of 4.76 μm. Future work will focus on investigations on a more sophisticated models capable of incorporating geometric constraints as well as minimizing mechanical energy for improved model accuracy. In addition, effects of direction reversal of EMB insertion can manifest in hysteresis.

As mentioned above, the gradient terms defined in equations (47)-(51) are derived as follows. Rewriting equations (29) and (26) in a matrix form yields:

$$\begin{bmatrix} k_1+k_2+k_s & -k_1 \\ k_1 & -k_1 \end{bmatrix} \begin{bmatrix} \theta_s \\ \theta' \end{bmatrix} = \begin{bmatrix} (k_2+k_s)\theta_0 - \lambda \\ k_0(\theta_0 - \theta) \end{bmatrix} \quad (78)$$

$$\stackrel{\Delta}{=} A(\psi, q_s, \theta_s) \quad \stackrel{\Delta}{=} B(\psi, q_s, k_\lambda, \theta_s)$$

where A and B are defined as functions of $\{\psi, q_s, \theta_s\}$ and $\{\psi, q_s, k_\lambda, \theta_s\}$ respectively. Using the definition of $\phi$, yields:

$$A\left(\underbrace{\begin{bmatrix} 1 & 0 \\ 1 & 1 \end{bmatrix}}_{\stackrel{\Delta}{=}S_0} \underbrace{\begin{bmatrix} \theta_s \\ \theta_\varepsilon \end{bmatrix}}_{\phi} - \underbrace{\begin{bmatrix} 0 \\ \theta_0 \end{bmatrix}}_{\stackrel{\Delta}{=}C_0}\right) = B \quad (79)$$

By introducing two constant matrices in the above equation, $S_0$ and $C_0$, we have obtained the equation to differentiate:

$$A(S_0\phi - C_0) = B, A \in \mathbb{R}^{2\times 2}, B \in \mathbb{R}^2, C_0 \in \mathbb{R}^2 \quad (80)$$

The full differentiation may be expressed as:

$$(dA)(S_0\phi - C_0) + (AS_0)d\phi = dB \quad (81)$$

Using $X'_a$ to denote the partial derivative of matrix X w.r.t the scalar variable a, i.e.

$$X'_a \stackrel{\Delta}{=} \frac{\partial X}{\partial a},$$

then dA and dB may be written as:

$$dA = A'_\theta d\theta + A'_\delta d\delta + A'_{q_s} dq_s + A'_{\theta_s} d\theta_s \quad (82)$$

$$dB = B'_\theta d\theta + B'_\delta d\delta + B'_{q_s} dq_s + B'_{\theta_s} d\theta_s + \sum_i^{n_k} B'_{k_{\lambda_i}} dk_{\lambda_i} \quad (83)$$

Let us define $C_\phi$ and $\Gamma_a$ to provide ease in the derivations:

$$C_\phi \stackrel{\Delta}{=} S_0\phi - C_0, \Gamma_\alpha = B'_\alpha - A'_\alpha C_\phi \quad (84)$$

where the letter $\alpha \in \{\theta, \delta, q_s, \theta_s\}$.

By substituting equation (82) and equation (83) into equation 81, and by using the definitions of $C_\phi$ and $\Gamma_a$, we have:

$$(AS_0)\begin{bmatrix} d\theta_s \\ d\theta_\varepsilon \end{bmatrix} - [\Gamma_{\theta_s}]\begin{bmatrix} d\theta_s \\ d\theta_\varepsilon \end{bmatrix} = \quad (85)$$

$$\Gamma_\theta d\theta + \Gamma_\delta d\delta + \Gamma_{q_s} dq_s + \sum_i^{n_k} B'_{k_{\lambda_i}} dk_{\lambda_i}$$

This equation shows the full differentiation of equation (45) and all the Jacobians can be obtained directly by their definitions, i.e., the expressions of $$\left\{\frac{\partial \phi}{\partial \theta}, \frac{\partial \phi}{\partial \delta}, \frac{\partial \phi}{\partial q_s}, \frac{\partial \phi}{\partial k_{\lambda_i}}\right\} \in \mathbb{R}^{2\times 1}$$

may be written as described above in equations (47), (48), (49), and (50), which $s_1=[1,0]$ is just a selection matrix.

Furthermore, as mentioned above, equations (64), (65), and (66) refer to the Jacobian matrix partitions for the two-segment case where the first segment is the inserted subsegment (indicated by superscript s) and the second segment is the empty subsegment (indicated by subscript ε). The Jacobian partitions represent the effects of differentials on $\theta_i$ and $\delta_i$ that contribute to the end-effector's translational and rotational differential, labeled by subscripts 'v' and 'ω', indicating 'velocity' and 'angular velocity', respectively. The expressions of $\{J_{v\theta_i}, J_{\omega\theta_i}, J_{v\delta_i}, J_{\omega\delta_i}\}$ are extracted as:

$$J_{v\theta_i} = D_i \begin{bmatrix} c_{\delta_i}\chi_{a_i} \\ -s_{\delta_i}\chi_{a_i} \\ \chi_{b_i} \end{bmatrix}, J_{\omega\theta_i} = \begin{bmatrix} -s_{\delta_i} \\ -c_{\delta_i} \\ 0 \end{bmatrix} \quad (86)$$

$$J_{v\delta_i} = D_i \begin{bmatrix} s_{\delta_i}\chi_{c_i} \\ c_{\delta_i}\chi_{c_i} \\ \chi_{b_i} \end{bmatrix}, J_{\omega\delta_i} = \begin{bmatrix} c_{\delta_i}s_{\theta_i} \\ -s_{\delta_i}c_{\theta_i} \\ -1 + s_{\theta_i} \end{bmatrix} \quad (87)$$

Where $c(\cdot)$ and $s(\cdot)$ denote the cosine and sine functions, and $D_i$ represents the length of the subsegment. For the inserted subsegment, $D_s=q_s$; and for the empty subsegment, $D_r=L-q_s$. In addition, the following shorthanded notations are used:

$$\chi_{a_i} = \frac{(\theta_i - \theta_0)c_{\theta_i} - s_{\theta_i} + 1}{(\theta_1 - \theta_0)^2} \quad (88)$$

$$\chi_{b_i} = \frac{(\theta_i - \theta_0)c_{\theta_i} + c_{\theta_i}}{(\theta_1 - \theta_0)^2} \quad (89)$$

$$\chi_{c_i} = \frac{s_{\theta_i} - 1}{\theta_0 - \theta_i} \quad (90)$$

Thus, the invention provides, among other things, a system for multiple-scale motion control of a bending robotic device using equilibrium modulation. Various features and advantages of the invention are set forth in the following claims.

What is claimed is:

1. A continuum robot comprising:
   a control disk;
   a bendable, rigid central backbone fixedly coupled to a center of the control disk;
   a first secondary backbone fixedly coupled the control disk at a defined distance from the center of the control disk, wherein the first secondary backbone is rigid, bendable, and hollow, wherein linear movement of the first secondary backbone relative to a base of the continuum robot causes a bending movement of the central backbone; and
   an equilibrium modulating wire slidably positioned inside the first secondary backbone.

2. The continuum robot of claim 1, further comprising a plurality of control disks, the plurality of control disks including an end disk and at least one spacer disk, wherein the end disk is fixedly coupled to a distal end of the central backbone, and wherein the central backbone is fixedly coupled to a center of the at least one spacer disk.

3. The continuum robot of claim 2, wherein the central backbone is fixedly coupled to the end disk and fixedly coupled to the at least one spacer disk such that, when the central backbone is straight, the control disk is parallel to the at least one spacer disk.

4. The continuum robot of claim 1, further comprising a base disk, wherein the base disk includes a secondary backbone opening, wherein the first secondary backbone is positioned through the secondary backbone opening, wherein the secondary backbone opening limits lateral movement of the first secondary backbone relative to the base disk and allows linear movement of the first secondary backbone relative to the base disk, and wherein linear movement of the first secondary backbone relative to the base disk causes a bending of the central backbone and the first secondary backbone.

5. The continuum robot of claim 4, wherein a first linear movement of the first secondary backbone relative to the base disk causes a first bending movement of the central backbone when the equilibrium modulating wire is inserted inside the first secondary backbone, and
wherein the first linear movement of the first secondary backbone relative to the base disk causes a second bending movement of the central backbone when the equilibrium modulating wire is at least partially retracted from the first secondary backbone, wherein the second bending movement has a greater bending magnitude than the first bending movement.

6. The continuum robot of claim 1, further comprising:
a base disk; and
a plurality of secondary backbones each fixedly coupled to the control disk at locations equidistantly distributed circumferentially around the center of the control disk,
wherein the base disk includes a plurality of secondary backbone opening, wherein each secondary backbone of the plurality of secondary backbones is positioned through a different one of the plurality of secondary backbone openings, wherein each secondary backbone opening limits lateral movement of a corresponding secondary backbone relative to the base disk and allows linear movement of the corresponding secondary backbone relative to the base disk, and
wherein coordinated linear movement of the secondary backbones causes the central backbone to bend to a target pose.

7. The continuum robot of claim 6, wherein each secondary backbone of the plurality of secondary backbones is hollow, the continuum robot further comprising a plurality of equilibrium modulating wires each slidably positioned inside a different one of the plurality of secondary backbones, and wherein linear movement of each equilibrium modulating wire controllably alters a flexural rigidity of a secondary backbone.

8. The continuum robot of claim 1, wherein linear movement of the equilibrium modulating wire relative to the first secondary backbone controllably alters a flexural rigidity of the first secondary backbone.

9. The continuum robot of claim 8, wherein retracting the equilibrium modulating wire from the first secondary backbone reduces the flexural rigidity of the first secondary backbone.

10. The continuum robot of claim 1, further comprising a robot actuator configured to controllably adjust linear movement of the first secondary backbone and to controllably adjust linear movement of the equilibrium modulating wire.

11. The continuum robot of claim 10, further comprising an electronic controller configured to control movement of the central backbone by providing control signals to the robot actuator, wherein the electronic controller is configured to:
determine a target pose for the central backbone;
determine a target linear position of the first secondary backbone relative to a base disk of the continuum robot and a target linear position of the equilibrium modulating wire relative to the first secondary backbone needed to move the central backbone to the target pose; and
operate the robot actuator to move the first secondary backbone and the equilibrium modulating wire based on the determined target linear positions.

12. The continuum robot of claim 10, further comprising an end effector coupled to a distal end of the central backbone; and an electronic controller configured to control movement of the central backbone by providing control signals to the robot actuator, wherein the electronic controller is configured to:
operate the robot actuator under macro-scale control by adjusting a linear position of the first secondary backbone relative to a base disk of the continuum robot until the end effector moves to an intermediate position within a threshold distance of a target position; and
operate the robot actuator under micro-scale control by adjusting a linear position of the equilibrium modulating wire until the end effector moves from the intermediate position to the target position.

13. The continuum robot of claim 1, wherein the equilibrium modulating wire is not fixedly coupled to the control disk and is not fixedly coupled to the base disk.

14. A method of adjustably controlling a pose of a continuum robot, the continuum robot including
a base disk,
a control disk,
a bendable, rigid central backbone fixedly coupled to a center of the control disk,
a first secondary backbone fixedly coupled to the control disk at a defined distance from the center of the control disk, wherein the a first secondary backbone is rigid, bendable, and hollow, wherein linear movement of the first secondary backbone relative to a base of the continuum robot causes a bending movement of the central backbone, and
an equilibrium modulating wire slidably positioned inside the first secondary backbone,
the method comprising:
controlling a bending movement of the central backbone through direct actuation by controllably adjusting a linear position of first secondary backbone relative to the base of the continuum robot; and
controlling the bending movement of the central backbone through indirect actuation by controllably adjusting a linear position of the equilibrium modulating wire relative to the first secondary backbone.

15. The method of claim 14, wherein controlling the bending movement of the central backbone through indirect actuation includes adjusting a flexural rigidity of the first secondary backbone by inserting or retracting the equilibrium modulating wire into a hollow interior of the first secondary backbone.

16. The method of claim 14, further comprising:
determining, by an electronic processor, a target pose for the central backbone; and determining a target linear position of the first secondary backbone and a target linear position of the equilibrium modulating wire needed to move the central backbone to the target pose, wherein controlling the bending movement of the central backbone through direct actuation includes operating a robot actuator to move the first secondary backbone to the determined target linear position of the first secondary backbone, and wherein controlling the bending movement of the central backbone through indirect actuation includes operating the robot actuator to move the equilibrium modulating wire to the determined target linear position of the equilibrium modulating wire.

17. The method of claim 14, wherein controlling the bending movement of the central backbone through direct actuation includes adjusting a linear position of the first secondary backbone until an end effector coupled to a distal end of the central backbone moves to an intermediate position within a threshold distance of a target position, and wherein controlling the bending movement of the central backbone through indirect actuation includes adjusting a linear position of the equilibrium modulating wire until the end effector moves from the intermediate position to the target position.

* * * * *